United States Patent [19]

Inada et al.

[11] Patent Number: 6,088,371
[45] Date of Patent: Jul. 11, 2000

[54] UP-GRADING METHOD FOR TRANSMISSION APPARATUS

[75] Inventors: Manabu Inada; Noriko Itoh; Tetsuya Sugioka, all of Yokohama, Japan

[73] Assignee: Hitachi, Ltd., Tokyo, Japan

[21] Appl. No.: 08/626,999

[22] Filed: Apr. 3, 1996

[30] Foreign Application Priority Data

Apr. 5, 1995 [JP] Japan ...................................... 7-080470

[51] Int. Cl.⁷ ...................................................... H04J 3/02
[52] U.S. Cl. ........................................... 370/537; 370/539
[58] Field of Search ...................................... 370/223, 258, 370/351, 357, 358, 360, 375, 376, 388, 403, 404, 405, 535, 545, 222, 224, 536, 537, 538, 539, 540, 541, 542, 543, 544, 907, 914

[56] References Cited

U.S. PATENT DOCUMENTS

| | | | |
|---|---|---|---|
| 5,185,736 | 2/1993 | Tyrrell et al. | 370/358 |
| 5,283,785 | 2/1994 | Ferguson | 370/535 |
| 5,287,513 | 2/1994 | Ferguson | 370/360 |
| 5,293,376 | 3/1994 | White | 370/258 |
| 5,412,652 | 5/1995 | Lu | 370/223 |
| 5,452,307 | 9/1995 | Koyama | 370/376 |
| 5,515,367 | 5/1996 | Cox, Jr. et al. | 370/404 |
| 5,583,855 | 12/1996 | Ball | 370/376 |
| 5,586,115 | 12/1996 | Nakano et al. | 370/388 |

*Primary Examiner*—Huy D. Vu
*Attorney, Agent, or Firm*—Antonelli, Terry, Stout & Kraus, LLP

[57] ABSTRACT

An up-grading method for a transmission apparatus including at least one low-speed side interface device, at least one high-speed side interface device, and a cross connection or add/drop MUX device which has at least one of a function of multiplexing a signal from the low-speed side interface device to connect the multiplexed signal to the high-speed side interface device, a function of distributing a signal from the high-speed side interface device to the low-speed side interface device, and a function of establishing physical and logical signal paths between any low-speed side and any high-speed side interface devices. When the transmission speed of the high-speed side interface device is to be increased, a high-speed transmission apparatus having thereon an interface device having a higher interface speed, a cross connection or add/drop MUX device, a clock signal distributing device and a control device is newly connected to the cross connection or add/drop MUX device of the existing transmission apparatus, the high-speed side interface device of the existing transmission apparatus is replaced by a low-speed side interface device, the cross connection or add/drop MUX device of the existing transmission apparatus is interconnected to the newly added high-speed transmission apparatus, and the existing transmission apparatus is used as an exclusive apparatus for accommodation of low-speed side interfaces.

13 Claims, 34 Drawing Sheets

UP-GRADING METHOD FOR TRANSMISSION APPARATUS

BACKGROUND OF THE INVENTION

The present invention relates to the construction of a communication system for transmitting information by use of electrical or optical signals, and more particularly to a system construction in which a high-speed transmission signal apparatus is added in a transmission network with a new synchronous optical transmission apparatus or synchronous optical network (SONET) while using the existing low-speed transmission apparatus, thereby improving a transmission speed in the network and a method for structuring such a system construction.

A MUX (multiplex) device of the new synchronous transmission apparatus (hereinafter referred to as SONET transmission apparatus) multiplexes signals from a plurality of low-speed side interface devices, for example, signals from four 155.52 Mbps interface devices to a 622.08 Mbps signal in the MUX device and delivers the multiplexed signal from a high-speed side interface device. On the other hand, when receiving a 622.08 Mbps signal, the MUX device can separate the received signal into, for example, four 155.52 Mbps signals (in the case where four 155.52 Mbps signals are included in the received signal) so that the separate signals are distributed to the 155.52 Mbps interface devices, respectively.

In the case of a SONET apparatus having an add drop MUX device (hereinafter referred to as ADM), there are provided two systems of high-speed side interface devices one of which is called "east" and the other of which is called "west". Each of the east and west high-speed side interfaces uses a system which is provided with one system of transmitting/receiving function or a system which is provided with two systems of transmitting/receiving functions. The former system is called "two-fiber" and the latter system is called "four-fiber".

In the case where a 622.08 Mbps signal received from one of the two high-speed side interface devices includes, for example, four 155.52 Mbps signals, the ADM device can deliver a part of the four 155.52 Mbps signals directly to the other high-speed side interface device while transmitting the remaining 155.52 Mbps signals to low-speed side interface devices. Also, the ADM device can transmit a signal (of, for example, 155.52 Mbps) received from the low-speed side interface device to the high-speed side interface device so that it is multiplexed to a part of a 622.08 Mbps signal.

In a system construction using the above-mentioned ADM device, a signal which is delivered from one of the high-speed side interface devices HSIF directly to the other high-speed side interface device HSIF is called "THROUGH", as exemplified in FIG. 1. A signal which is delivered from the high-speed side interface device HSIF to the low-speed side interface device LSIF is called "DROP". A signal which is delivered from the low-speed side signal device LSIF to the high-speed side signal device HSIF, is called "ADD". A signal received from the low-speed side interface device LSIF or the high-speed side interface device HSIF which is transferred to two or more interface devices at a time is called "BROADCAST".

A signal inputted to the high-speed side interface device HSIF which is outputted from the same high-speed side interface device HSIF which again through no switch SW, is called "LOOP BACK".

A signal inputted to the low-speed side interface device LSIF which is outputted from the same low-speed side interface device LSIF again through no switch SW, is called "HAIR PIN" connection.

In the above-mentioned example, it is possible to transmit and receive a signal of at most 622.08 Mbps as the high-speed signal in the case where the ADM or the MUX device has already been installed.

In the case where an ADM or MUX device as mentioned above has already been installed, there will be generated a need to install low-speed side interface devices additionally. In the case where the additional installation of low-speed side interfaces results in the total capacity of low-speed side interfaces exceeding the transmission capacity of high-speed side interfaces, a high-speed side interface device having a larger capacity will be required. The standard of the speed of a high-speed side interface device possessed by a SONET apparatus is prescribed as 51.84 Mbps, 155.52 Mbps, 622.08 Mbps, 1244.16 Mbps and 2488.32 Mbps. In general, devices having the 51.84 Mbps, 155.52 Mbps, 622.08 Mbps, 1244.16 Mbps and 2488.32 Mbps interface devices on the high-speed sides thereof are called OC-1ADM, OC-3ADM, OC-12ADM, OC-24ADM and OC-48ADM devices, respectively.

In this application, systems having 51.84 Mbps, 155.52 Mbps, 622.08 Mbps, 1244.16 Mbps and 2488.32 Mbps interfaces on the high-speed sides thereof are called OC-1, OC-3, OC-12, OC-24 and OC-48 systems, respectively.

In the prior art, in the case where the additional installation of low-speed side interface devices is required and the transmission capacity of the system is insufficient as a result, there is required, for example, an OC-48 system having a 2488.32 Mbps interface device, as a high-speed interface which has a capacity larger next to 622.08 Mbps. The increase of capacity from the OC-12 system to the OC-48 system was realized in such a manner that when an OC-48ADM device provided with a high-speed side interface device having a capacity larger than 622.08 Mbps is placed (or installed), the high-speed side interfaces of at most four existing OC-12ADM devices are connected to low-speed side interface devices of the OC-48ADM device, and the connection of a transmission path connected to the high-speed side interface device of the OC-12ADM device is changed to the high-speed side interface device of the OC-48ADM device. Therefore, the maximum construction of the whole system requires four OC-12ADM devices and one OC-48ADM device, which is disadvantageous not only in the economical aspect but also in the aspect of installation space.

SUMMARY OF THE INVENTION

A subject of the present invention is to construct a large-capacity transmission apparatus system with a reduced device construction in order to solve the above-mentioned problem. More particularly, there is provided a construction in which low-speed side interfaces for accommodating low-speed signals are placed at positions where high-speed side interface devices of the existing apparatus were placed until now, and a signal from an ADM device of the existing apparatus providing an ADM function is sent directly to an ADM device on the side of an apparatus providing a high-speed and large-capacity transmission path. In the case where an increase in capacity, for example, from an OC-12 system to an OC-48 system is made, this method eliminates the need of high-speed side interfaces which were required in the conventional OC-12 system and the need of those interfaces for OC-12 to be accommodated on the low-speed side of the OC-48 system which are to be connected to the high-speed side interfaces of the conventional OC-12 system.

Another subject of the present invention is to provide a procedure for effecting an increase in transmission capacity in which equipments are added with no interruption of the existing service in the case where adjacent high-speed side interfaces of SONET apparatuses having ADM devices placed thereon are connected to form a ring-like transmission path or a linear network.

In order to solve the above subject, an ADM device of the present invention is constructed with not only the existing ADD function, DROP function and MUX function but also a cross connection function with which any input signal can be connected to any output port with the 1-to-1 or 1-to-n correspondence, and the ADM device of each SONET apparatus is constructed with not only ports for connecting low-speed side interface devices and high-speed side interface devices thereto but also connection ports for allowing the connection to the other SONET apparatus. Further, there is provided a construction by which a low-speed side interface device is substitutionally placed at a position where a high-speed side interface device is accommodated (or mounted). More particularly, there is provided a construction by which the arrangement of connection pins at the high-speed side interface mounting position provides a superordinate compatibility for connection terminals of the low-speed side interfaces.

There is effected a construction which is capable of providing a new service with no exchange of parts of the apparatus in such a manner that a software for controlling the present apparatus is accommodated in an electrically writable and erasable memory or flash PROM and the existing software is overwritten when the apparatus to be controlled is changed.

In the case where the operation is performed with the connection of a transmission path changed from the existing apparatus to a newly added apparatus having a high-speed interface device, the newly added apparatus requires a clock signal which has the same timing as that of a reference clock signal used by the existing apparatus. In order to realize this, a clock signal receiving and distributing device of each apparatus is constructed to have a function of extracting clock components from a signal received from the other apparatus so that a clock signal synchronous with the clock components is distributed into that apparatus.

In the case where the transmission capacity of the existing SONET transmission apparatus is increased, high-speed side interface devices are constructed using only those of a newly added apparatus. Therefore, high-speed side interface devices of the existing apparatus used by the conventional method become unnecessary. In the construction effected, positions where the high-speed side interface devices of the existing apparatus were placed until now are used as positions where low-speed interface devices are to be placed.

For example, in the case where the increase in capacity is made from the existing OC-12 system to an OC-48 system, an OC-12 interface device having been placed in the existing apparatus can be used as a low-speed side interface device in the OC-48 system.

The utilization and reuse of interface devices of the existing SONET apparatus and the space saving of the whole system can be realized by handling the existing interface devices as low-speed side interface devices of a newly added large-capacity transmission system, adding an apparatus having thereon new large-capacity and high-speed interface devices for transmitting higher-speed signals, and using the existing apparatus as an apparatus for accommodating low-speed interfaces.

In the case where the connection of a transmission path (generally, optical fibers) connected to the existing SONET apparatus is changed from a high-speed side interface device of the existing apparatus to a high-speed interface device of a newly added apparatus, the influence of instantaneous cut-off given on a transmission service can be suppressed by use in combination with a system change-over control method incorporated in the SONET apparatus.

DESCRIPTION OF THE PREFERRED EMBODIMENTS

Figure 1:
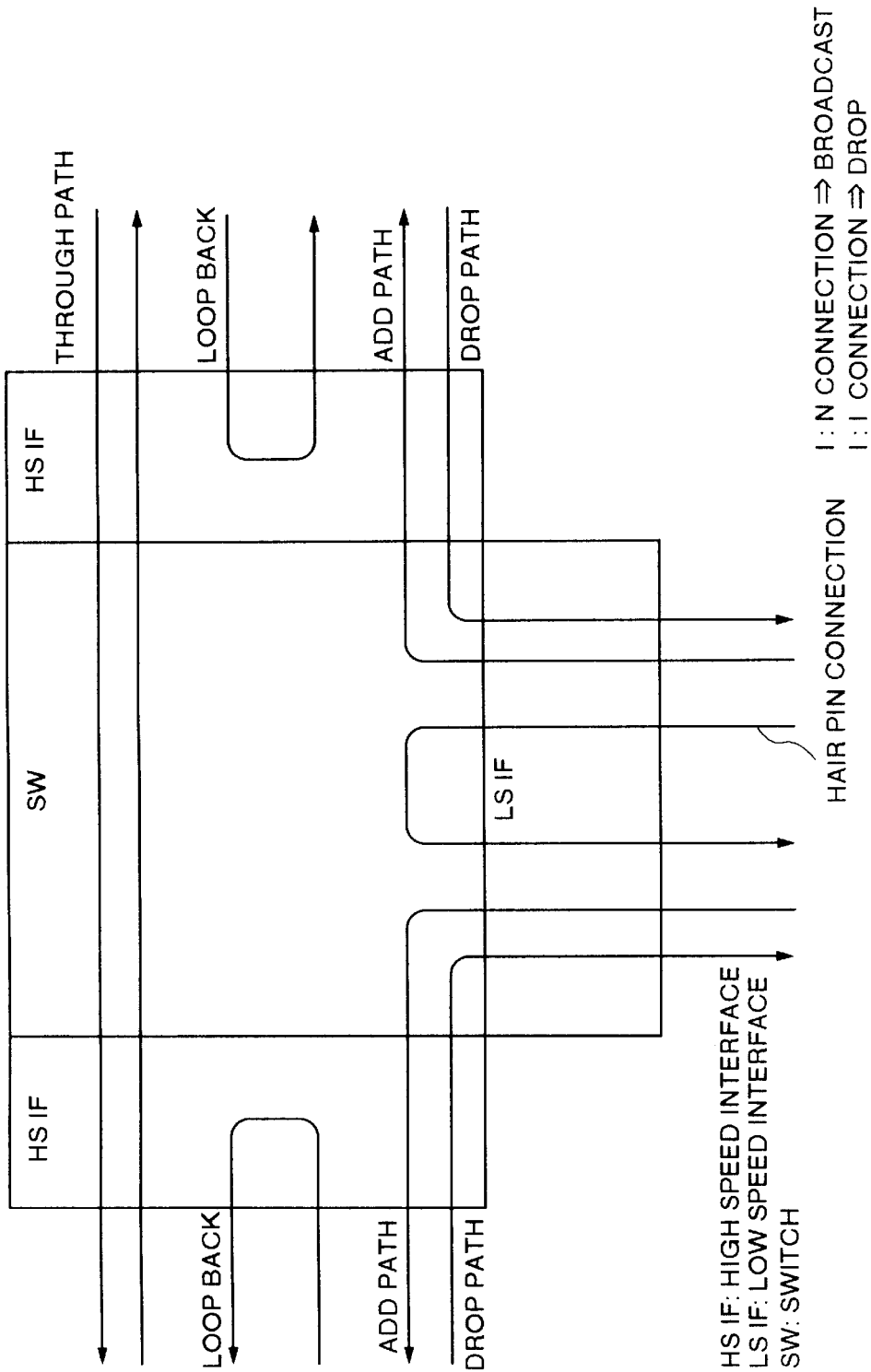
FIG. 1 is a conceptual diagram showing various path connection configurations.
Figure 2:
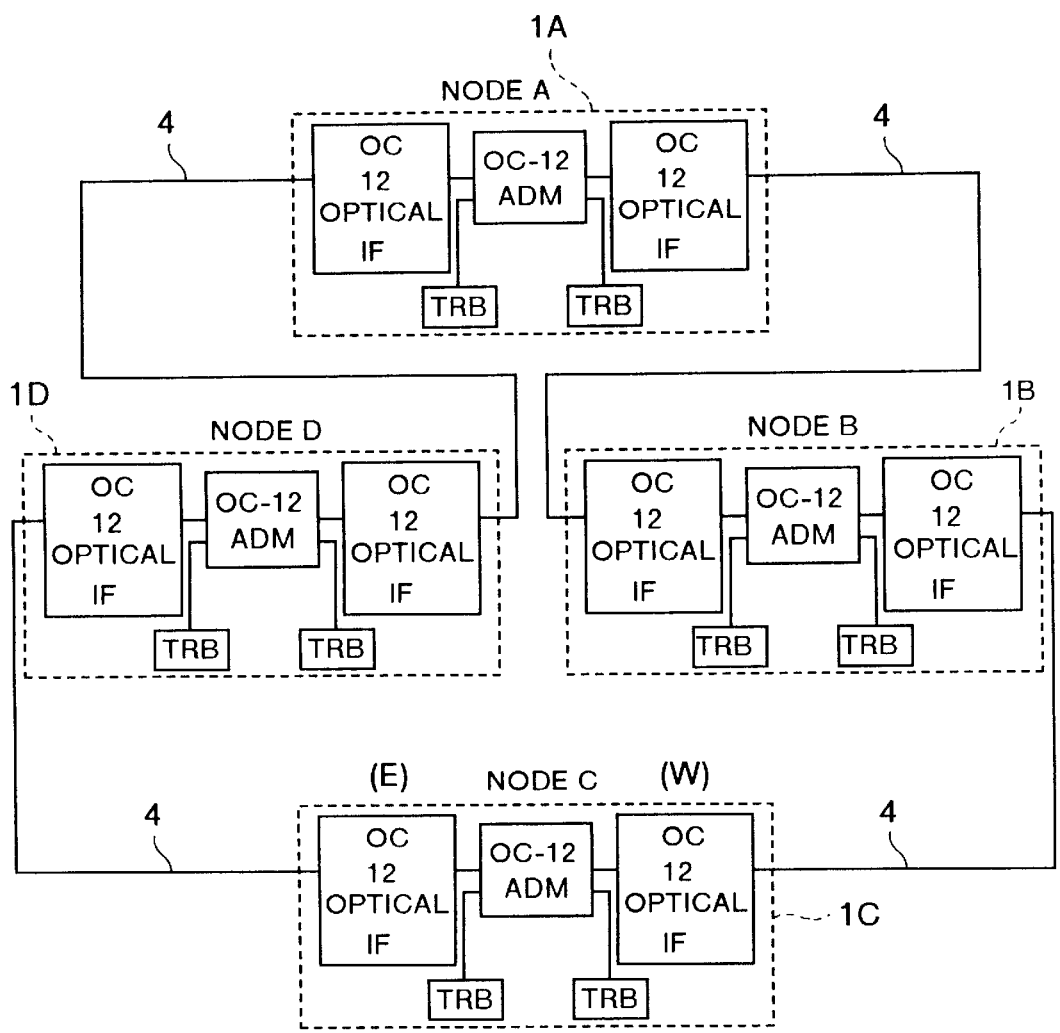
FIG. 2 is a conceptual diagram showing the construction of a network before up-grading.
Figure 3:
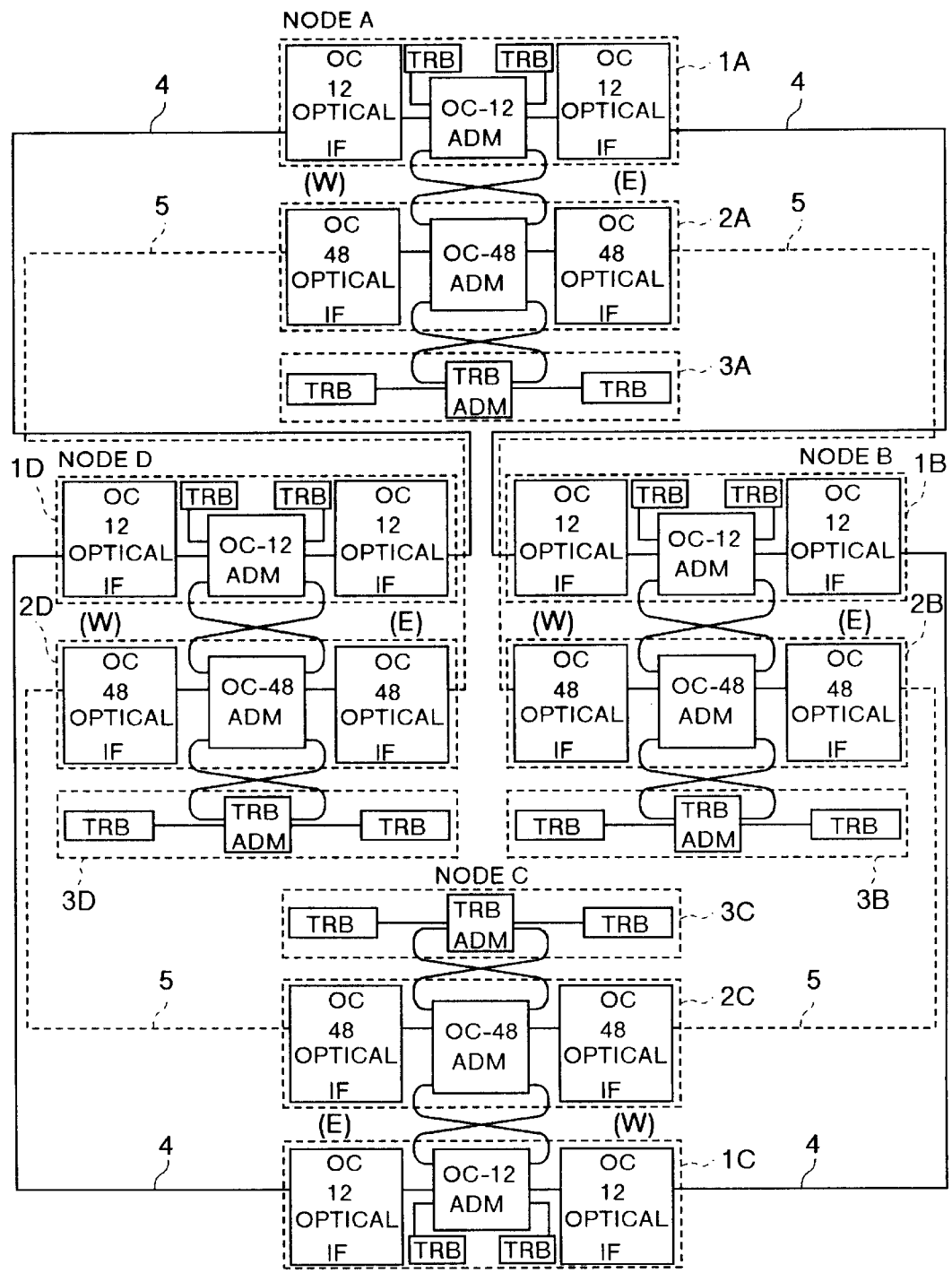
FIG. 3 is a conceptual diagram showing the construction of a network up-graded in accordance with an embodiment of the present invention.

FIG. 2 is a conceptual diagram showing the construction of a network before up-grading, and FIG. 3 is a conceptual diagram showing the construction of the network up-graded in accordance with an embodiment of the present invention.

The existing network before up-grading composed of nodes A, B, C and D includes OC-12ADM devices 1A linked by low-speed transmission paths 4 using optical interfaces for OC-12. The up-graded network is constructed by not only the existing network but also a network which includes OC-48ADM devices 2A provided at the respective nodes and linked by high-speed transmission paths 5 (shown by dotted line) using optical interfaces for OC-48.

Further, low-speed interface devices 3A, 3B, 3C and 3D are provided at the nodes A, B, C and D, respectively.

In the following, a procedure for up-grading will be explained successively.

Figure 4:
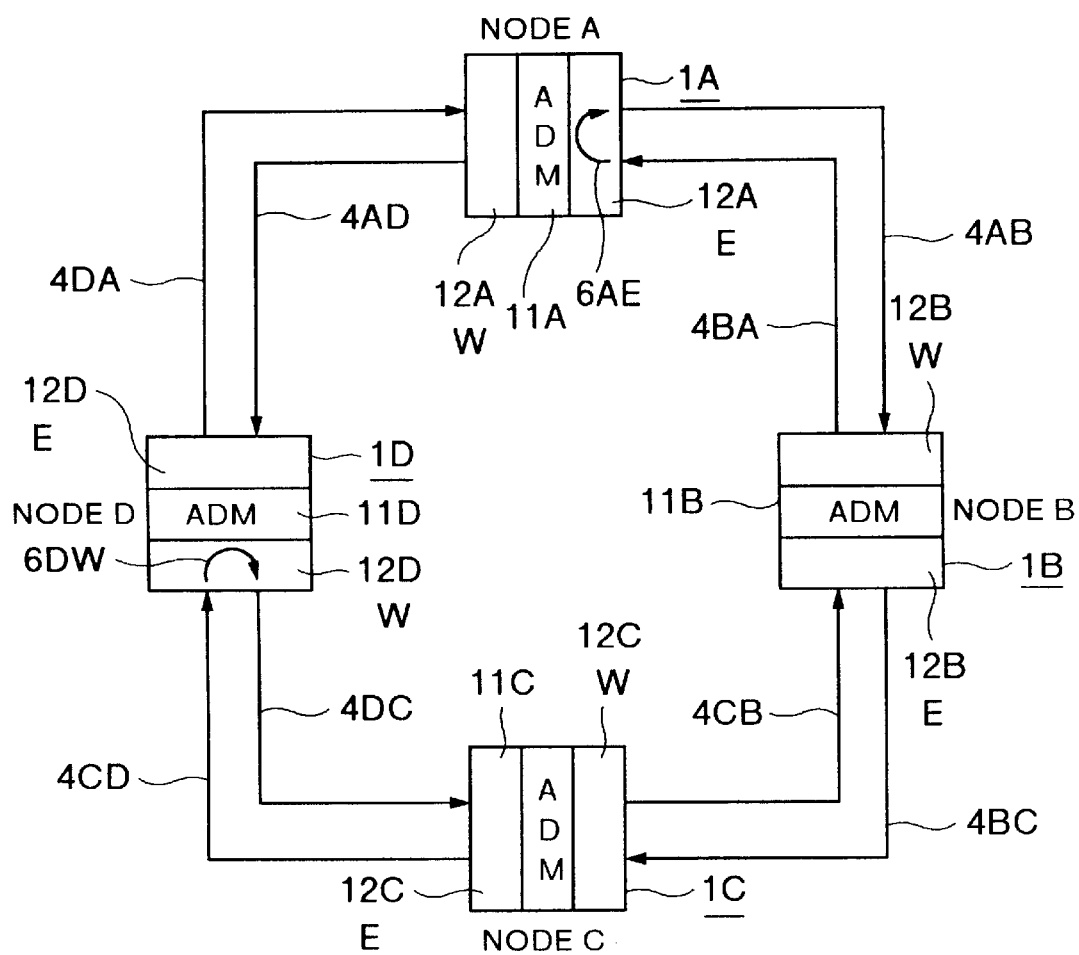
FIG. 4 is a diagram showing the construction of a system before up-grading in a form simplified by signal transmission systems between nodes.

FIG. 4 shows the construction of a system before up-grading in a form simplified by signal transmission systems between the nodes. In this figure and subsequent figures, alphabetical characters A, B, C and D added at the rear of reference numerals denote devices or functions provided at the nodes A, B, C and D, respectively. Also, alphabetical characters E and W denote the east and west sides of the interface, respectively.

The network, to which the up-grading procedure of the present embodiment is applied, includes four OC-12ADM devices 1A, 1B, 1C and 1D provided at the nodes A, B, C and D, respectively. Each ADM device is composed of a cross connection function portion (hereinafter referred to as ADM) 11A, 11B, 11C or 11D and interfaces 12AE and 12AW, 12BE and 12BW, 12CE and 12CW, or 12DE and. 12DW. A ring network system is formed with two optical fibers 4AB and 4BA, 4BC and 4CB, 4CD and 4DC, and 4DA and 4AD used between the east side (hereinafter referred to as E side) 12AE of the interfaces of the node A and the west side (hereinafter referred to as W side) 12BW of the interfaces of the node B, between the E side 12BE of the interfaces of the node B and the W side 12CW of the interfaces of the node C, between the E side 12CE of the interfaces of the node C and the W side 12DW of the interfaces of the node D, and between the E side 12DE of the interfaces of the node D and the W side 12AW of the interfaces of the node A, respectively.

Explanation will now be made of the case where the in-service up-grading (that is, up-grading with service offered) from the OC-12ADM devices 1A, 1B, 1C and 1D to the OC-48ADM devices 2A, 2B, 2C and 2D is made in such a system. The in-service up-grading is an up-grading technique in which the influence of instantaneous cut-off at the time of up-grading on a transmission service is within a negligible range. The instantaneous cut-off allowed in this kind of transmission apparatus is prescribed as being not longer than 50 microseconds.

The present embodiment corresponds to an example of up-grading in which the OC-12ADM devices 1A, 1B, 1C and 1D having been operated with low-speed side interfaces (hereinafter referred to as TRB's) mounted thereon are additionally provided with the low-speed side interfaces 3A, 3B, 3C and 3D and are further added with the OC-48ADM devices 2A, 2B, 2C and 2D. In the following explanation, a procedure for up-grading at the node A will first be shown. Subsequently, a procedure for up-grading at the node D will be shown. Further, the establishment of device-to-device connection and cross connection for up-grading of a ring network between the nodes A and D will be mentioned.

1. PROCEDURE FOR IN-SERVICE UP-GRADING FROM STATE IN WHICH OC-12ADM DEVICE IS BEING USED IN TWO-FIBER APPLICATION TO STATE IN WHICH OC-48ADM DEVICE IS USED IN TWO-FIBER APPLICATION

In FIG. 4, an in-service up-grading work is first performed with the E-side interface 12AE of the OC-12ADM device 1A of the node A and the W-side interface 12DW of the OC-12ADM device 1D of the node D being respectively brought into a LOOP BACK connection 6AE in the device 1A and a LOOP BACK connection 6DW in the device 1D to take a way around a circuit between the nodes A and D.

1.1 PROCEDURE FOR UP-GRADING OF NODE A

Figure 5:
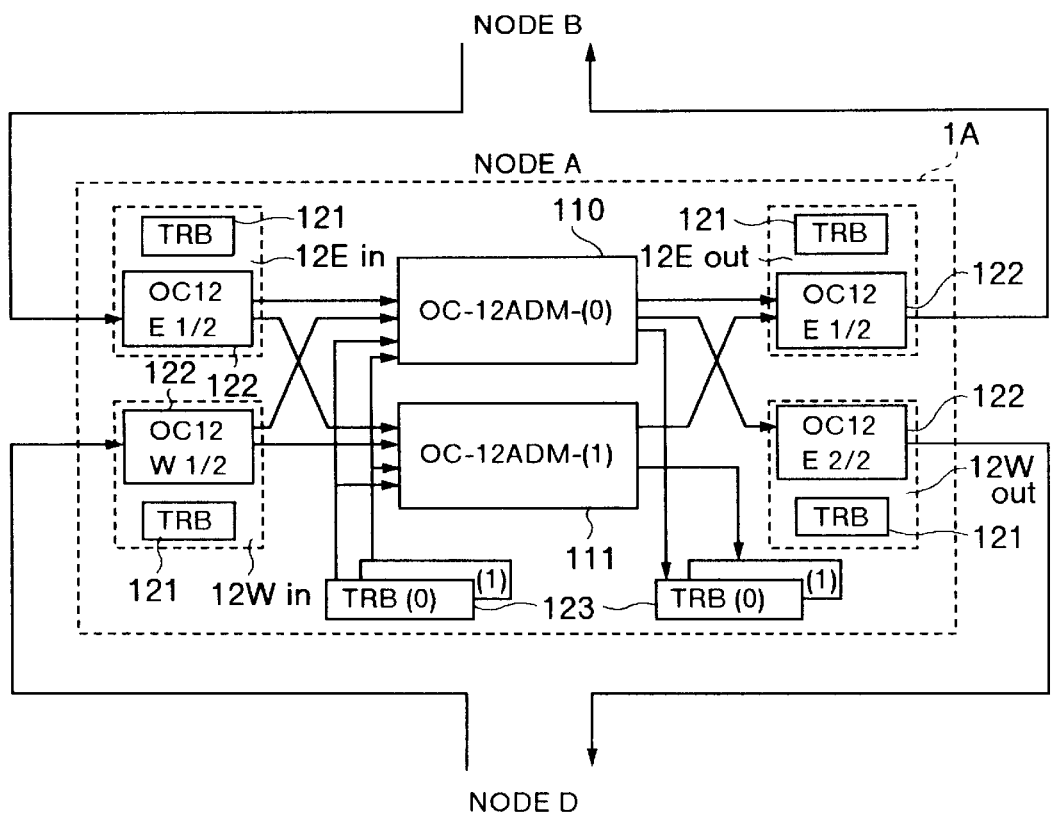
FIG. 5 is a diagram showing a connection state at a node A before up-grading.

FIG. 5 is a connection diagram showing the connecting state of the OC-12ADM device 1A of the node A before up-grading. Before up-grading, the node A uses the OC-12ADM device 1A and is connected to the nodes B and D by the low-speed interfaces (TRB) 121. The OC-12ADM device 1A is composed of two ADM's including a current system ADM 110 and a spare system ADM 111, E-side low-speed side interfaces 12E connected to the node B, W-side low-speed side interfaces 12W connected to the node D, and low-speed interfaces (TRB) 123 for ADD/DROP.

Figure 6:
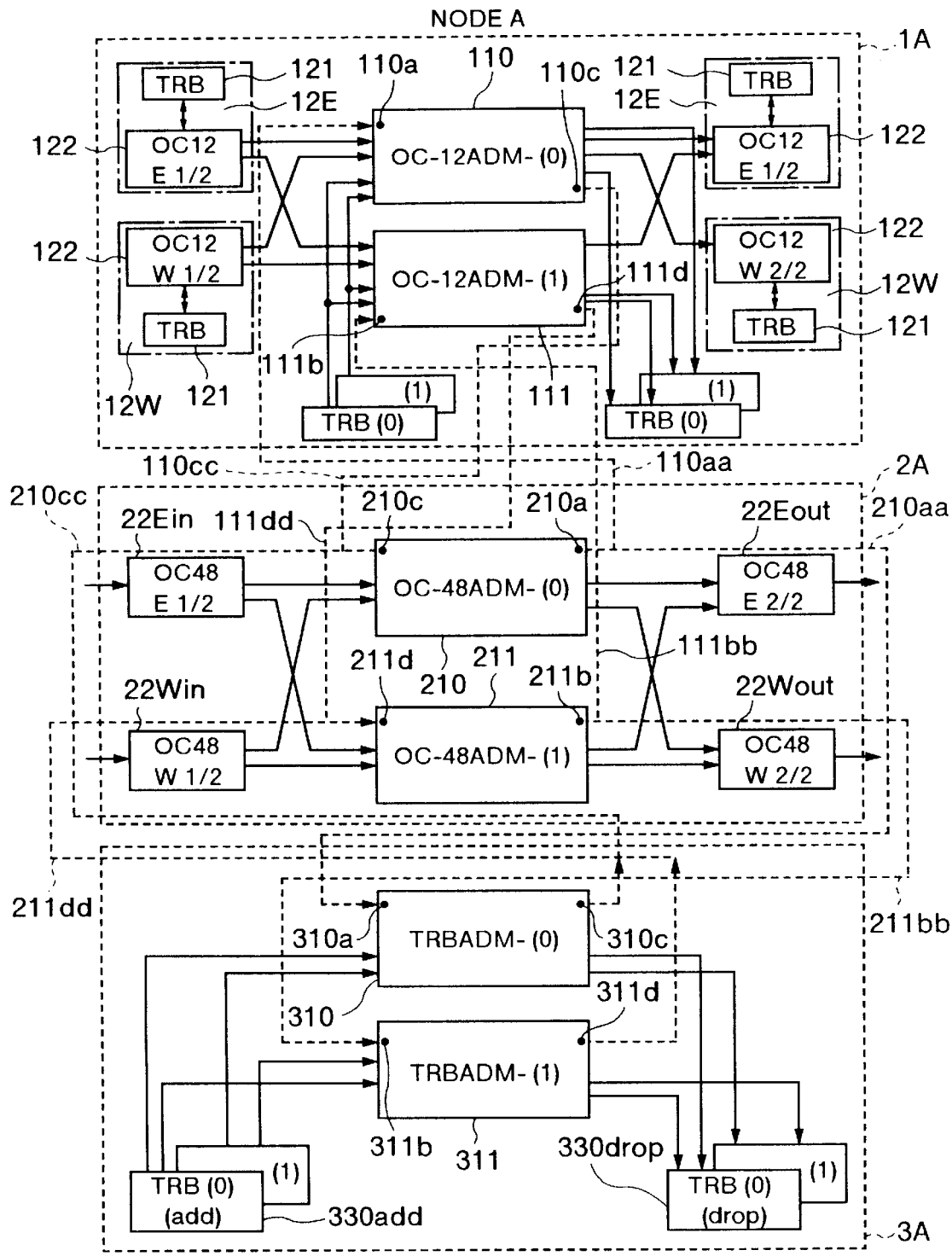
FIG. 6 is a diagram for explaining the connection of an OC-12 ADM device and an OC-48 ADM device at the node A.

First, an OC-48ADM device 2A and a low-speed interface device 3A for OC-48 are installed at the node A, as shown in FIG. 6. The OC-48ADM device 2A has two ADM's including a current system ADM 210 and a spare system ADM 211, an E-side input/output (22Ein, 22Eout) for the node B, and a W-side input/output (22Win, 22Wout) for the node D. The low-speed interface device 3A has two TRB's (330add, 330drop) including a current system ADM 310 and a spare system ADM 311.

Next, an input portion 110a of the current system ADM 110 in the OC-12ADM device 1A is connected to an output portion 210a of the current system ADM 210 in the OC-48ADM device 2A (by a line 110aa), and an input portion 111b of the spare system ADM 111 in the OC-12ADM device 1A is connected to an output portion 211b of the spare system ADM 211 in the OC-48ADM device 2A (by a line 111bb). Similarly, an output portion 110c of the current system ADM 110 in the OC-12ADM device 1A is connected to an input portion 210c of the current system ADM 210 in the OC-48ADM device 2A (by a line 110cc), and an output portion 111d of the spare system ADM 111 in the OC-12ADM device 1A is connected to an input portion 211d of the spare system ADM 211 in the OC-48ADM device 2A (by a line 111dd). The low-speed interface device 3A connected or installed at the node A corresponds to a version of the OC-12ADM device 1A from which four components 122 are removed.

Next, the output portion 210a of the current system ADM 210 in the OC-48ADM device 2A, the output portion 211b of the spare system ADM 211 in the OC-48ADM device 2A and the high-speed side interfaces of the OC-12 shelf are removed. Thereinstead, an input portion 310a of the current system ADM 310 and an input portion 311b of the spare system ADM 311 in the low-speed interface device 3A having the low-speed interfaces 330 for OC-48 placed thereon are connected to the removed portions (by lines 210aa).

Further, the input portion 210c of the current system ADM 210 in the OC-48ADM device 2A is connected to an output portion 310c of the current system ADM 310 in the low-speed interface device 3A (by a line 210cc), and the input portion 211d of the spare system ADM 211 in the ADM device 2A is connected to an output portion 311d of the spare system ADM 311 in the low-speed interface device 3A (by a line 211dd).

A device timing for the newly connected OC-48ADM device 2A and OC-38 low-speed interface device 3A uses a construction to receive a reference clock signal used by the existing OC-12ADM device 1A, thereby eliminating a timing error between devices.

Thereafter, the connection of optical fibers connected to the optical interface W and E sides (12W, 12E) of the OC-12ADM device 1A is changed to the optical interface W and E sides (22W, 22E) of the OC-48ADM device 2A, respectively. Also, low-speed interfaces (TRB) 121 for OC-48 are placed at positions where the optical interfaces 12 for OC-12 were placed until now. Thereby, an input/output is made on the OC-48ADM device 2A side.

Figure 7:
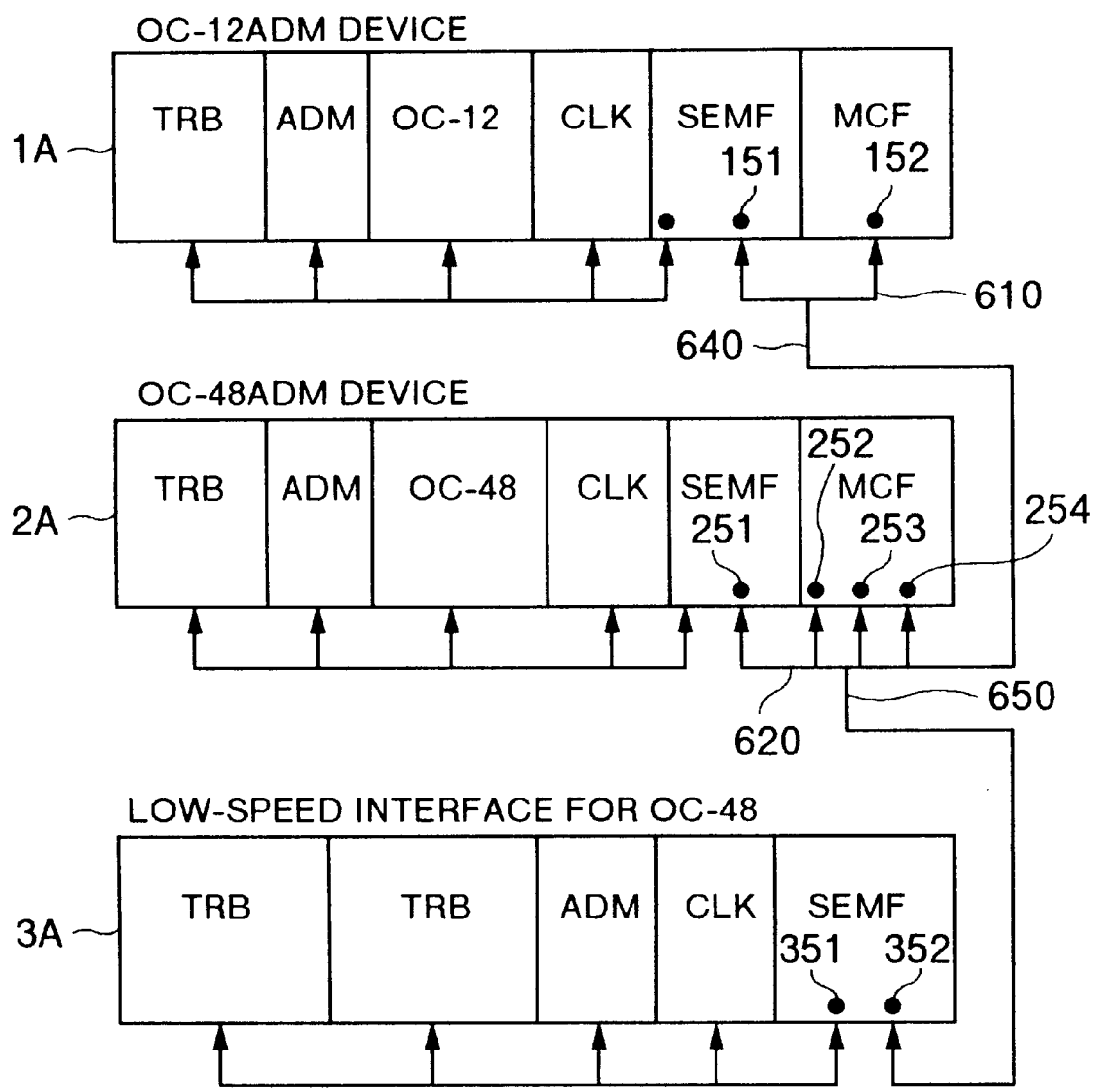
FIG. 7 is a diagram for explaining an up-graded construction of a control system.

The establishment of cross connection will now be mentioned. First, a method for change-over of a control system will be explained using FIG. 7. FIG. 7 shows the concept of the construction of the existing OC-12ADM device 1A, the additionally installed OC-48ADM device 2A and the additionally installed low-speed interface device 3A for OC-48. The OC-12ADM device 1A is composed of TRB, ADM, OC-12, CLK, SEMF (Synchronous Equipment Management Function) and MCF (Message Communication Function). The OC-48ADM device 2A is composed of TRB, ADM, OC-48, CLK, SEMF and MCF. The low-speed interface device 3A for OC-48 is composed of two TRB's, ADM, OC-12, CLK and SEMF.

Before up-grading, since the OC-12ADM device 1A is being operated, the communication between SEMF and MCF is performed with a bus connection 610 made between input/output portions 151 and 152 to collect control information. With the up-grading according to the present embodiment, a circuit and communication control of the OC-12ADM device IA is made from SEMF in the OC-48ADM device 2A.

The input/output portion 151 of SEMF of the OC-12ADM device 1A is connected to an input/output portion 254 of MCF of the OC-48ADM device 2A so that the communication between MCF and SEMF is performed by a bus connection 640. Accordingly, the bus 610 for communication between MCF and SEMF in the OC-12ADM device 1A becomes disconnectable. The bus 610 is cut off.

Also, a device control in the OC-48ADM device 2A and a device control in the OC-12ADM device 1A are performed by the communication 620 between MCF and SEMF in the OC-48ADM device 2A.

After up-grading, a device control in the additionally installed low-speed interface device 3A is also performed by SEMF in the OC-48ADM device 2A. An input/output portion 251 of SEMF in the OC-48ADM device 2A is connected to an input/output portion 352 of SEMF in the low-speed interface device 3A for OC-48 by a bus 650, thereby making it possible to perform the device control in the low-speed interface device 3A for OC-48.

Figure 8:
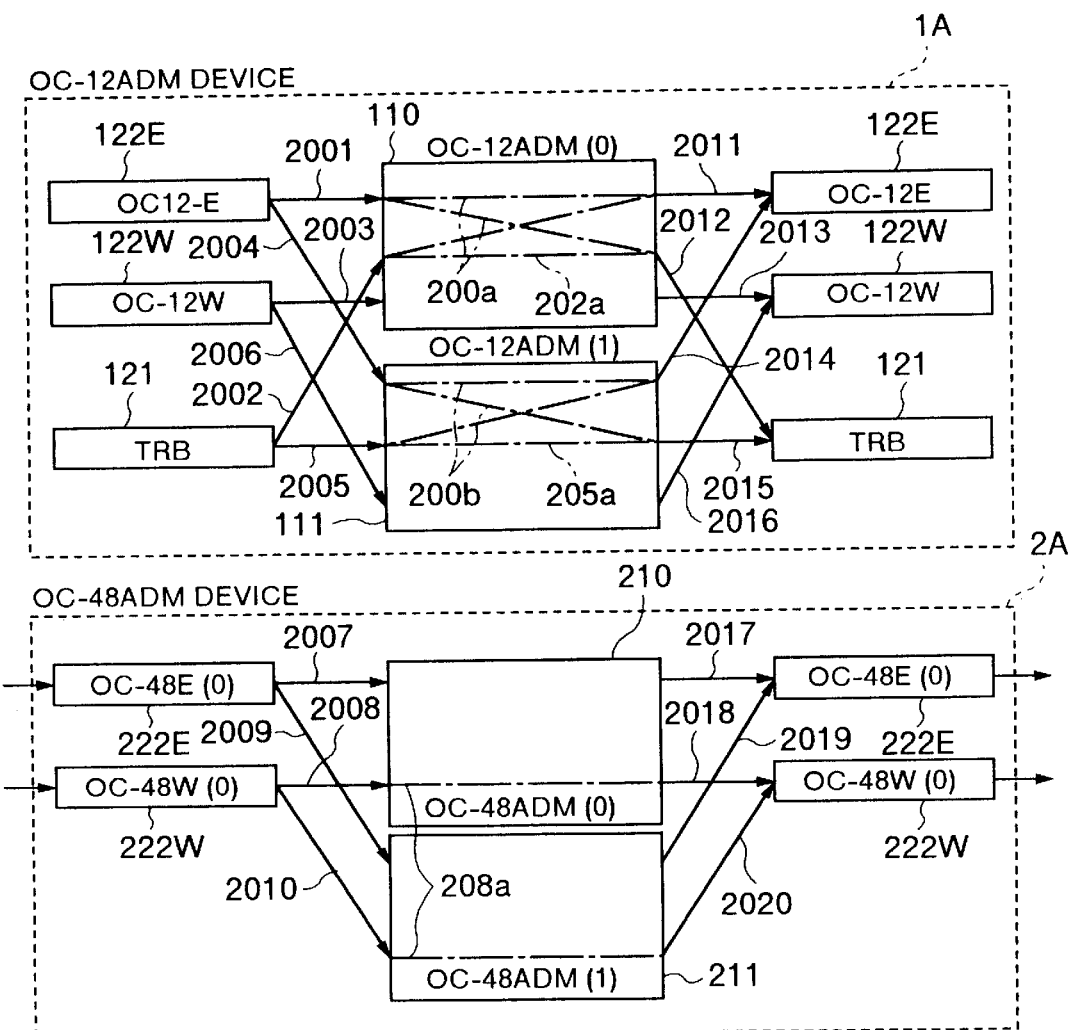
FIG. 8 is a diagram (I) for explaining the establishment of cross connection for up-grading from two-fiber to two-fiber.
Figure 9:
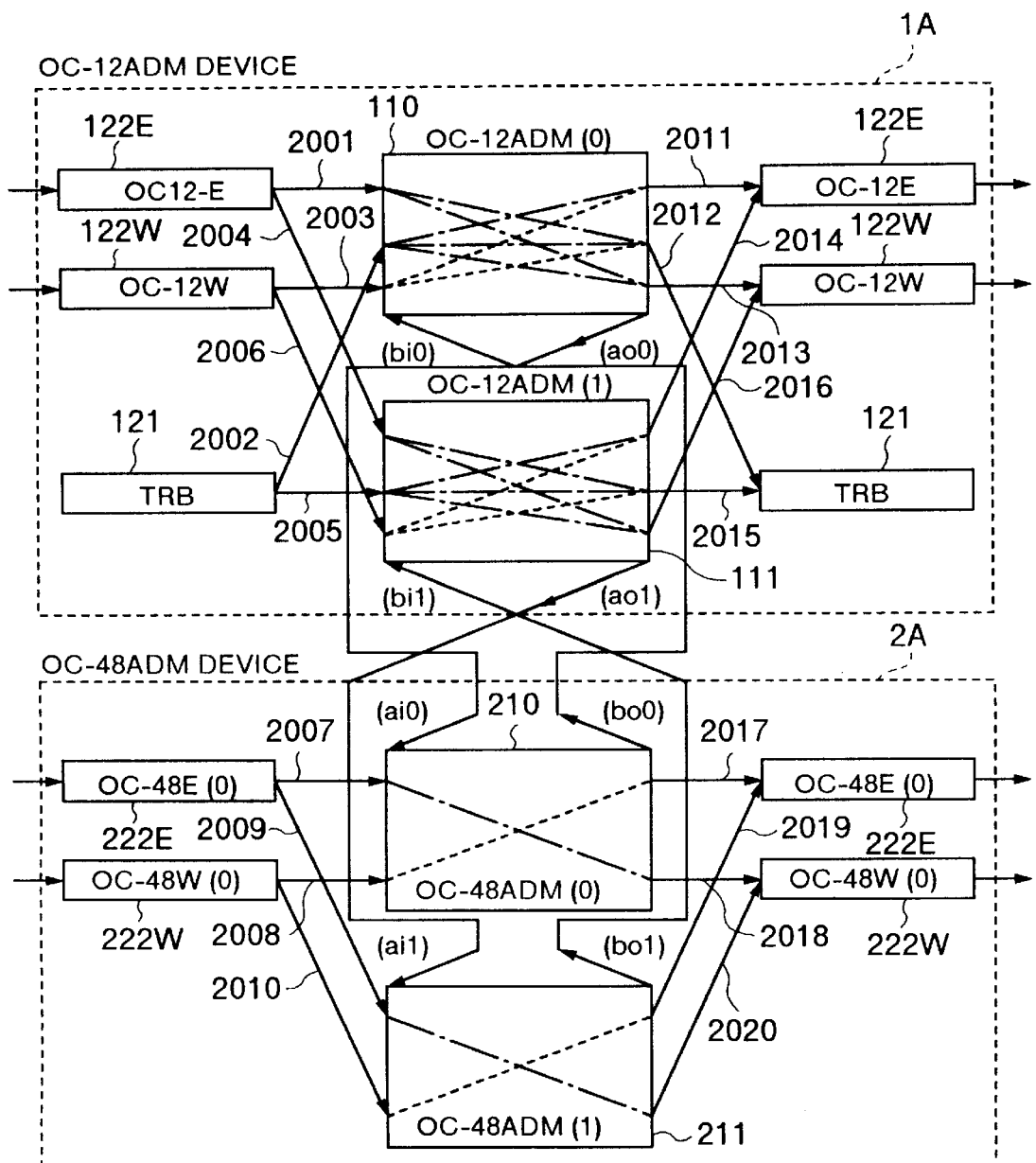
FIG. 9 is a diagram (II) for explaining the establishment of cross connection for up-grading from two-fiber to two-fiber.

1.1.1 Procedure For Loop-Back Of E Side And Up-Grading Of W Side Of OC-12ADM Device FIGS. 8 and 9 shows an example of a procedure for establishment of paths for cross connection at the node A shown in FIG. 6. First, the E side of the node A shown in FIG. 6 will be loop-backed. Thereafter, the W side will be up-graded.

In order to make LOOP BACK connection (200a, 200b) of the E side of the OC-12ADM device 1A and DROP connection thereof to output paths 2012 and 2015 to the TRB (see FIG. 8), E-side input paths 2001 and 2004 of the ADM device 1A are subjected to BROADCAST path establishment through the current system ADM 110 and the spare system ADM 111 so that they are connected to E-side output paths 2011 and 2014 of the ADM device 1A and are also connected to the output paths 2012 and 2015 to the TRB.

Next, in order to make ADD connection and HAIR PIN connection from the TRB, input paths 2002 and 2005 from the TRB are subjected to BROADCAST path establishment through the current system ADM 110 and the spare system ADM 111 so that they are connected to the E-side output paths 2011 and 2014 of the OC-12ADM device 1A as ADD connection on the E side of the ADM device 1A and are also connected to the output paths 2012 and 2015 to the TRB to provide HAIR PIN connection (202a, 205a) of the TRB's.

Also, the W side of the OC-48ADM device 2A is subjected to LOOP BACK connection for up-grading. Paths 208a are established so that W-side input paths 2008 and 2010 of the ADM device 2A are connected to W-side output paths 2018 and 2020 of the ADM device 2A through the current system ADM 210 and the spare system ADM 211, respectively.

1.1.2 Operation On E Side Of OC-12ADM Device And Operation On W Side Of OC-48

Next, explanation will be made of a path connection method of cross connection for performing an operation on the E side of the OC-12ADM device 1A and on the W side of the OC-48ADM device 2A after the E side of the OC-12 ADM device 1A is loop-backed in accordance with the above-mentioned procedure. FIG. 9 shows a connecting state on the E side of the OC-12ADM device 1A and on the W side of the OC-48ADM device 2A.

In order to make a path connection from the E-side input paths 2001 and 2004 of the OC-12ADM device 1A to the W-side output paths 2018 and 2020 of the OC-48ADM device 2A, paths are established in the current system ADM 110 and the spare system ADM 111 of the OC-12ADM device 1A. Also, in order to make a path connection from the W-side input paths 2008 and 2010 of the OC-48ADM device 2A to the E-side output paths 2011 and 2014 of the OC-12ADM device 1A, paths are established for the input/output paths of the current system ADM 210 and the spare system ADM 211 of the OC-48ADM device 2A.

There are established paths which connect the existing TRB input paths 2002 and 2005 to the W-side output paths 2018 and 2020 of the OC-48ADM device 2A for ADD to the high-speed interface for OC-48. Similarly, there are established paths from the W-side input portions 2008 and 2010 of the OC-48ADM device 2A to the existing TRB output portions 2012 and 2015 for DROP connection to TRB.

Next, in order to make ADD path connection and DROP path connection in the OC-12ADM device 1A from the existing TRB, there are established ADD paths to the output paths 2011 and 2014. Also, the E-side input paths 2001 and 2004 of the existing OC-12ADM device 1A are connected to the existing TRB output paths 2012 and 2015 to establish paths for DROP to TRB.

After the above processing, the hair pin (6AE) provided at each ADM (110, 111) in the OC-12ADM device 1A is removed.

1.1.3 Procedure For Up-Grading Of E Side Of OC-12ADM Device

Figure 10:
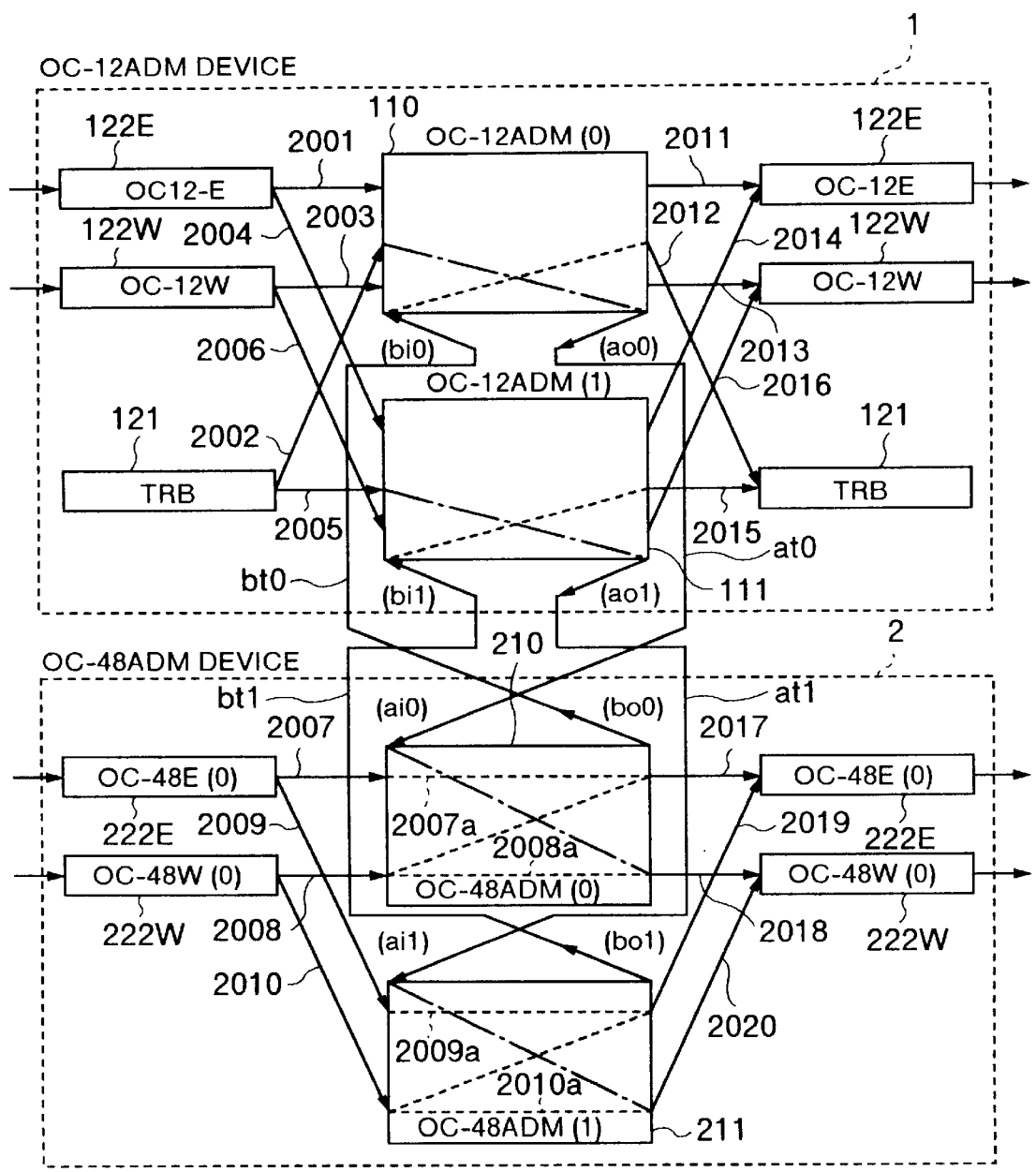
FIG. 10 is a diagram (III) for explaining the establishment of cross connection for up-grading from two-fiber to two-fiber.

Next, connection at the E side of the OC-12ADM device 1A and the W side of the OC-48ADM device 2A will be shown using FIG. 10.

In order to up-grade the E side of the OC-12ADM device 1A, the W side of the OC-48ADM device 2A will first be loop-backed. A method of path establishment at this time will now be mentioned.

In order to make LOOP BACK connection of the W side of the OC-48ADM device 2A, there are established paths (2008a, 2010a) which connect the W-side input paths 2008 and 2010 of the ADM device 2A to the W-side output paths 2018 and 2020 of the ADM device 2A, respectively.

Next, for ADD path connection and DROP path connection of the existing TRB, there are established paths (bt0, bt1) which connect the W-side input paths 2008 and 2010 of the OC-48ADM device 2A to the TRB output paths 2012 and 2015 of the exisitng OC-12ADM device 1A as DROP to TRB through the input paths bi0 and bi1 of the current system ADM 110 and the spare system ADM 111 of the existing OC-12ADM device 1A from the output paths bo0 and bo1 of the current system ADM 210 and the spare system ADM 211 of the OC-48ADM device 2A.

Also, for ADD connection and DROP connection from the existing TRB, there are established paths (at0, at1) which connect the TRB input paths 2002 and 2005 to the W-side output portions 2018 and 2020 of the OC-48ADM device 2A, respectively, through the input paths bi0 and bi1 of the current system ADM 210 and the spare system ADM 211 of the OC-48ADM device 2A from the output portions ao0 and ao1 of the current system ADM 110 and the spare system ADM 111 of the existing OC-12ADM device 1A.

Further, the E side of the OC-48ADM device 2A is subjected to LOOP BACK connection for up-grading so that there are established paths (2007a, 2009a) which connect E-side input paths 2007 and 2009 of the ADM device 2A to E-side output paths 2017 and 2019 of the ADM device 2A, respectively.

1.1.4 Procedure Of Connection For Operation Of OC-48ADM Device

Figure 11:
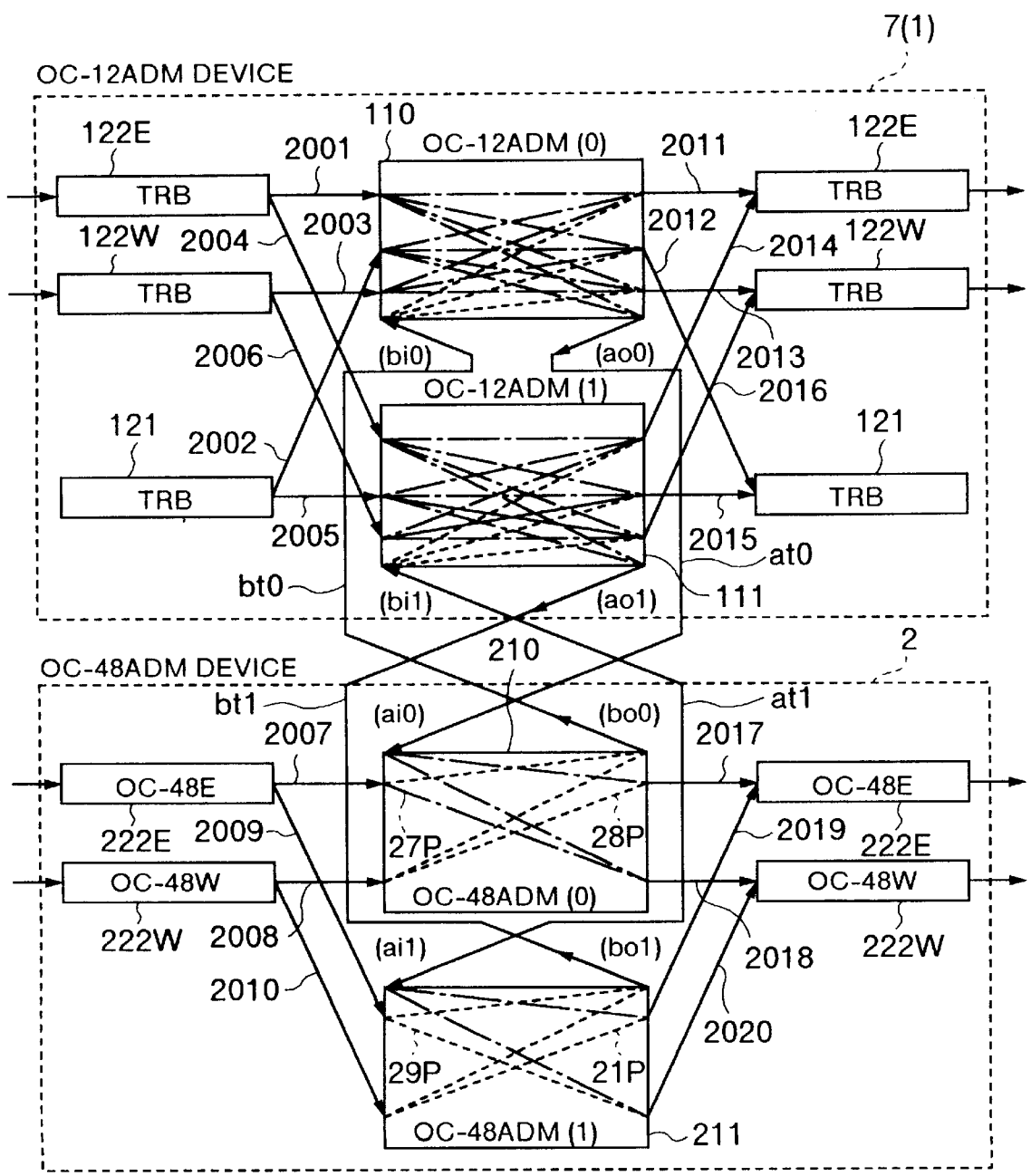
FIG. 11 is a diagram (IV) for explaining the establishment of cross connection for up-grading from two-fiber to two-fiber.

After the up-grading from the OC-12ADM device 1A to the OC-48ADM device 2A is completed in accordance with the above procedure, paths are established aiming at the operation of the OC-48ADM device 2A. In the following, a path connection procedure for this cross connection will be explained using FIG. 11.

After the up-grading to the OC-48ADM device 2A, the exisitng OC-12ADM device 1A is operated as a low-speed interface device 7 for OC-48. There are established paths (27P, 29P) which connect the E-side input paths 2007 and 2009 of the OC-48ADM device 2A to the W-side output paths 2018 and 2020 of the OC-48ADM device 2A. Similarly, there are established paths (28P, 21P) which connect the W-side input paths 2008 and 2010 of the OC-48ADM device 2A to the E-side output paths 2017 and 2019 of the OC-48ADM device 2A.

Also, a BROADCAST path establishment is made for HAIR PIN connection from the input paths (2001, 2002, 2003, 2004, 2005, 2006) of TRB's (122E, 122W, 121) in the low-speed interface device 7 to the output paths (2011, 2012, 2013, 2014, 2015, 2016) of TRB's in the same device 7. Further, ADD paths from the input paths (2001, 2002, 2003, 2004, 2005, 2006) of TRB's in the low-speed interface device 7 to the E-side and W-side output paths (2017, 2018, 2019, 2020) of the OC-48ADM device 2A are established through the connection of the input/output paths (ao0, ao1, bi0, bi1) of the current system ADM 110 and the spare-system ADM 111 in the low-speed interface device 7 and the input/output paths (ai0, ai1, bo0, bo1) of the current system ADM 210 and the spare system ADM 211 in the OC-48ADM device 2A.

Also, for DROP to TRB's in the low-speed interface device 7, paths are established from the E-side and W-side input paths (2007, 2008, 2009, 2010) of the OC-48ADM device 2A to the TRB output paths (2011, 2012, 2013, 2014, 2015, 2016) in the low-speed interface device 7 through the input/output portions of the current system ADM 210 and the spare system ADM 211 in the OC-48ADM device 2A.

In the foregoing, the procedure has been mentioned in conjunction with the establishment of cross connection paths at the node A. Cross connection paths are also established at each of the other nodes in accordance with a similar procedure.

1.2 PROCEDURE FOR UP-GRADING OF NODE D

Figure 12:
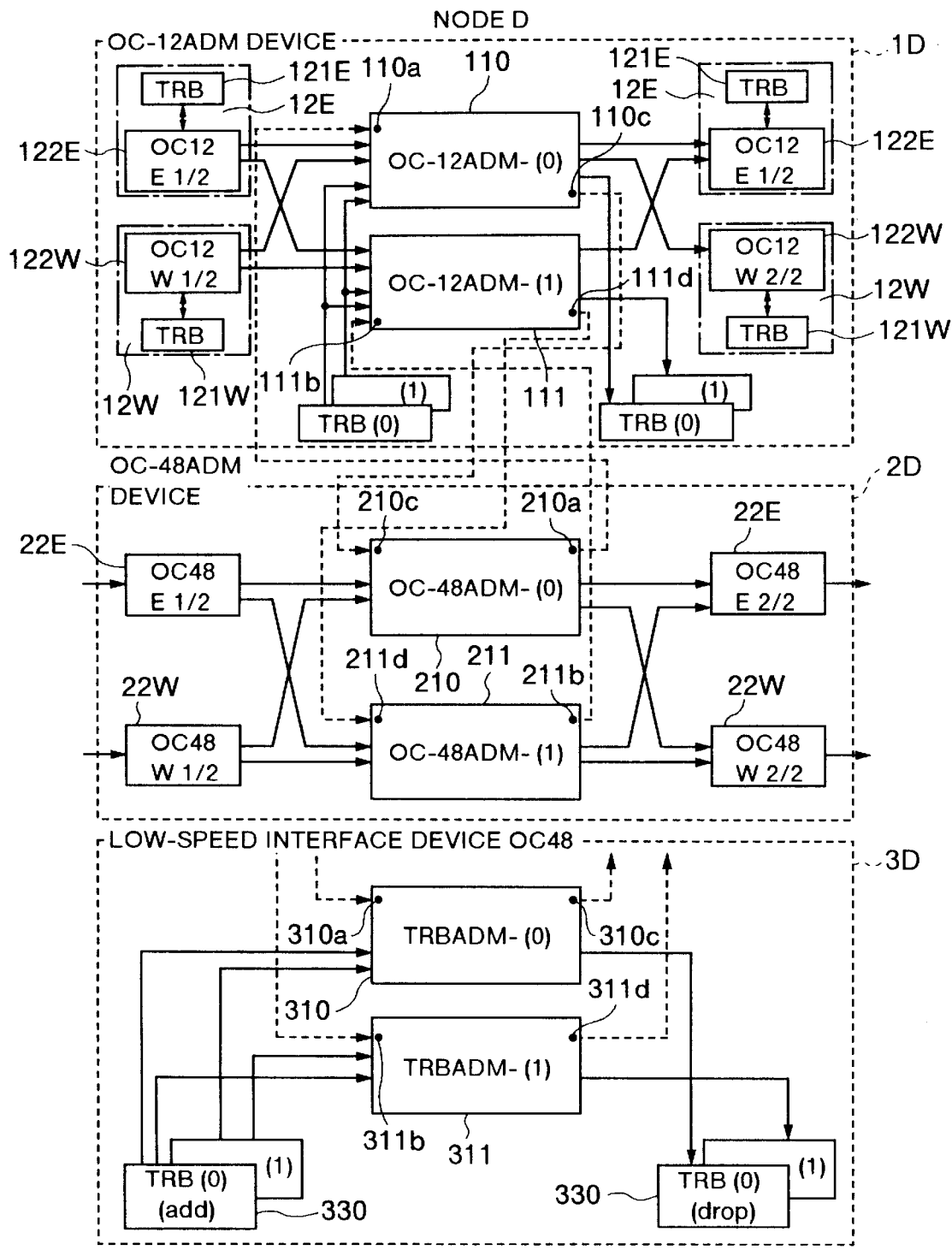
FIG. 12 is a diagram for explaining the connection of an OC-12 ADM device and an OC-48 ADM device at a node D.

Next, the connection of an OC-12ADM device 1D and an OC-48ADM device 2D at the node D will be explained using FIG. 12. So long as no particular explanation is given, the following explanation will be made omitting D subsequent to reference numerals indicating the devices or functions of the node D.

An input portion 110a of a current system ADM 110 and an input portion 111b of a spare system ADM 111 in the OC-12ADM device 1 are connected to an output portion 210a of a current system ADM 210 and an output portion 211b of a spare system ADM 211 in the OC-48ADM device 2, respectively. Also, an output portion 110c of the current system ADM 110 and an output portion 111d of the spare system ADM 111 in the OC-12ADM device 1 are connected to an input portion 210c of the current system ADM 210 and an input portion 211d of the spare system ADM 211 in the-OC-48ADM device 2, respectively.

Also, the output portion 210a of the current system ADM 210 in the OC-48ADM device 2, the output portion 211b of the spare system ADM 211 in the OC-48ADM device 2 and the high-speed side interfaces of the OC-12ADM device 2 shelf are removed. Thereinstead, an input portion 310a of a current system ADM 310 and an input portion 311b of a spare system ADM 311 in a low-speed interface device 3 having low-speed interfaces 330 for OC-48 placed thereon are connected to the removed portions Further, the input portion 210c of the current system ADM 210 and the input portion 211d of the spare system ADM 211 in the OC-48ADM device 2 are connected to an output portion 310c of the current system ADM 310 and an output portion 311d of the spare system ADM 311 in the low-speed interface device 3.

A device timing for the newly connected OC-48ADM device 2 and OC-48 low-speed interface device 3 uses a construction to receive a reference clock signal used by the existing OC-12ADM device 1, thereby eliminating a timing error between devices.

Thereafter, the connection of optical fibers 4 connected to the optical interface E side (122E) of the OC-12ADM device 1 is changed to the optical interface E side (22E) of the OC-48ADM device 2. Also, low-speed interfaces (TRB) 330 for OC-48 are placed at positions where optical interfaces 12 for OC-12 were placed until now. The establishment of cross connection in this case is made in accordance with a procedure similar to the above-mentioned procedure at the node A.

The above-mentioned series of works are similarly performed between other nodes to advance the up-grading work. In the course of the up-grading work, there is formed a ring in which an OC-12 system and an OC-48 system coexist. As shown in FIG. 10, information of pay load in a OC-12 frame is byte-multiplexed to pay load in a OC-48 frame. However, in the cross connection function portion, only a capacity corresponding to OC-12 (622.08 Mbps) is path-connected to its output portion, thereby forming a ring in which an OC-12 system and an OC-48 system coexist physically.

The similar work is performed between the other nodes to complete the up-grading work. Thereby, in the case where the existing OC-12 system two-fiber ring network is up-graded to the OC-48 system two-fiber ring network, the utilization and reuse of interface devices of the existing apparatus and the space saving of the whole system can be realized by handling the existing high-speed side interfaces as low-speed side interfaces, adding a device having thereon high-speed interfaces for handling high-speed signals, and using the existing apparatus as an apparatus for accommodating low-speed interfaces.

2. PROCEDURE FOR IN-SERVICE UP-GRADING FROM STATE IN WHICH OC-12ADM DEVICE IS BEING USED IN TWO-FIBER APPLICATION TO STATE IN WHICH OC-48ADM DEVICE IS USED IN FOUR-FIBER APPLICATION

Figure 13:
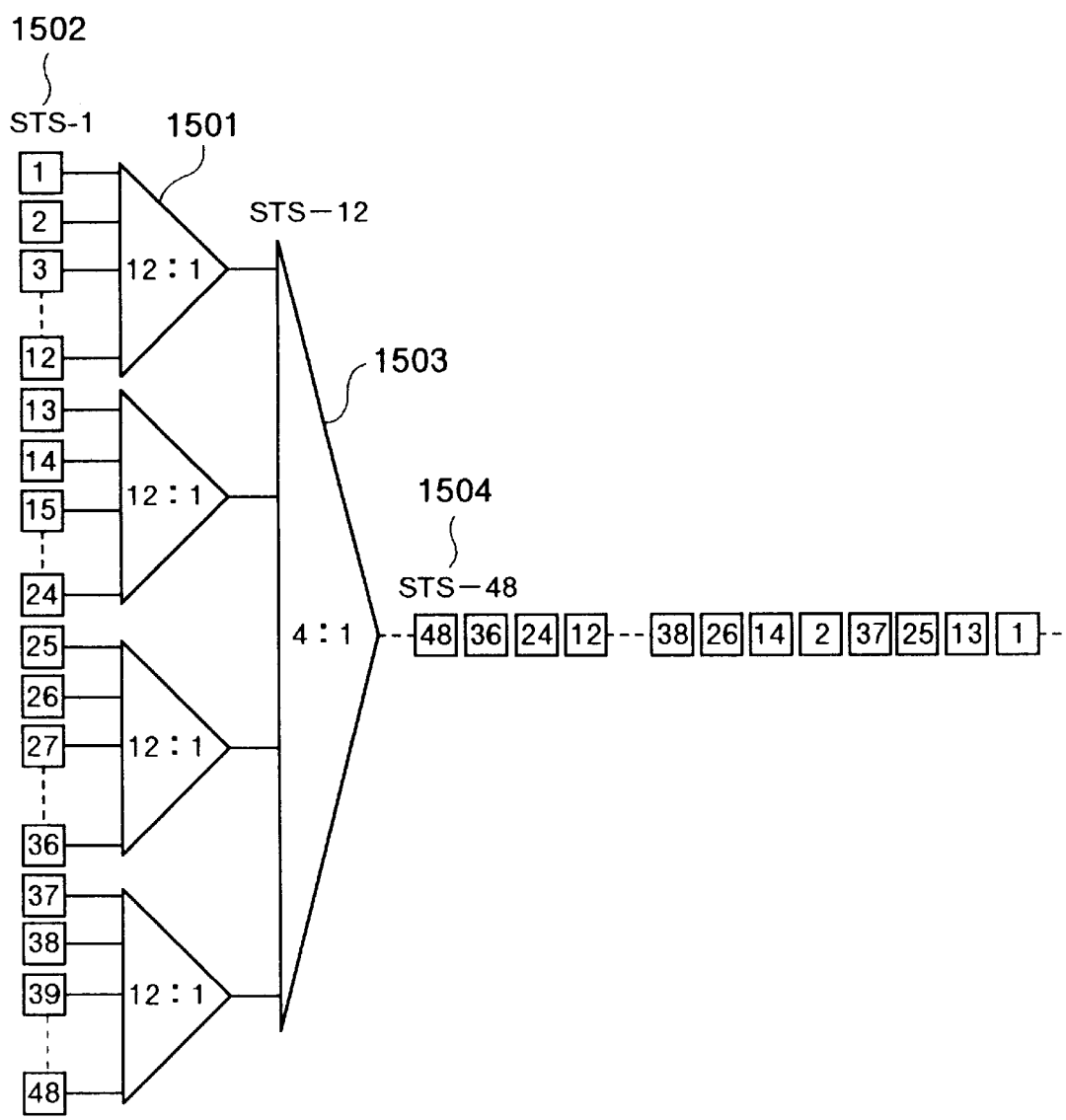
FIG. 13 is a diagram for explaining a byte-multiplexing method for the mapping of STS frame data.

Explanation will be made by use of FIG. 13 in conjunction with an example in which an in-service up-grading from OC-12 system to OC-48 system is made in a system in which a two-fiber ring is formed by four OC-12ADM devices 1 of nodes A, B, C and D. In the up-grading technique used herein, the OC-12ADM device 1 having been operated with low-speed side interfaces (hereinafter referred to as TRB's) mounted thereon is additionally provided with low-speed side interfaces and is further added with the OC-48ADM device 2. In the following explanation, a procedure for up-grading at the node A will be shown. Subsequently, a procedure for up-grading at the node D will be shown. Further, the establishment of device-to-device connection and cross connection for up-grading of a ring network between the nodes A and D will be mentioned. Since the establishment of paths in the following embodiment uses a method similar to that shown in the figures up to FIG. 11, detailed explanation thereof will be omitted.

2.1 PROCEDURE FOR UP-GRADING OF NODE A

Figure 15:
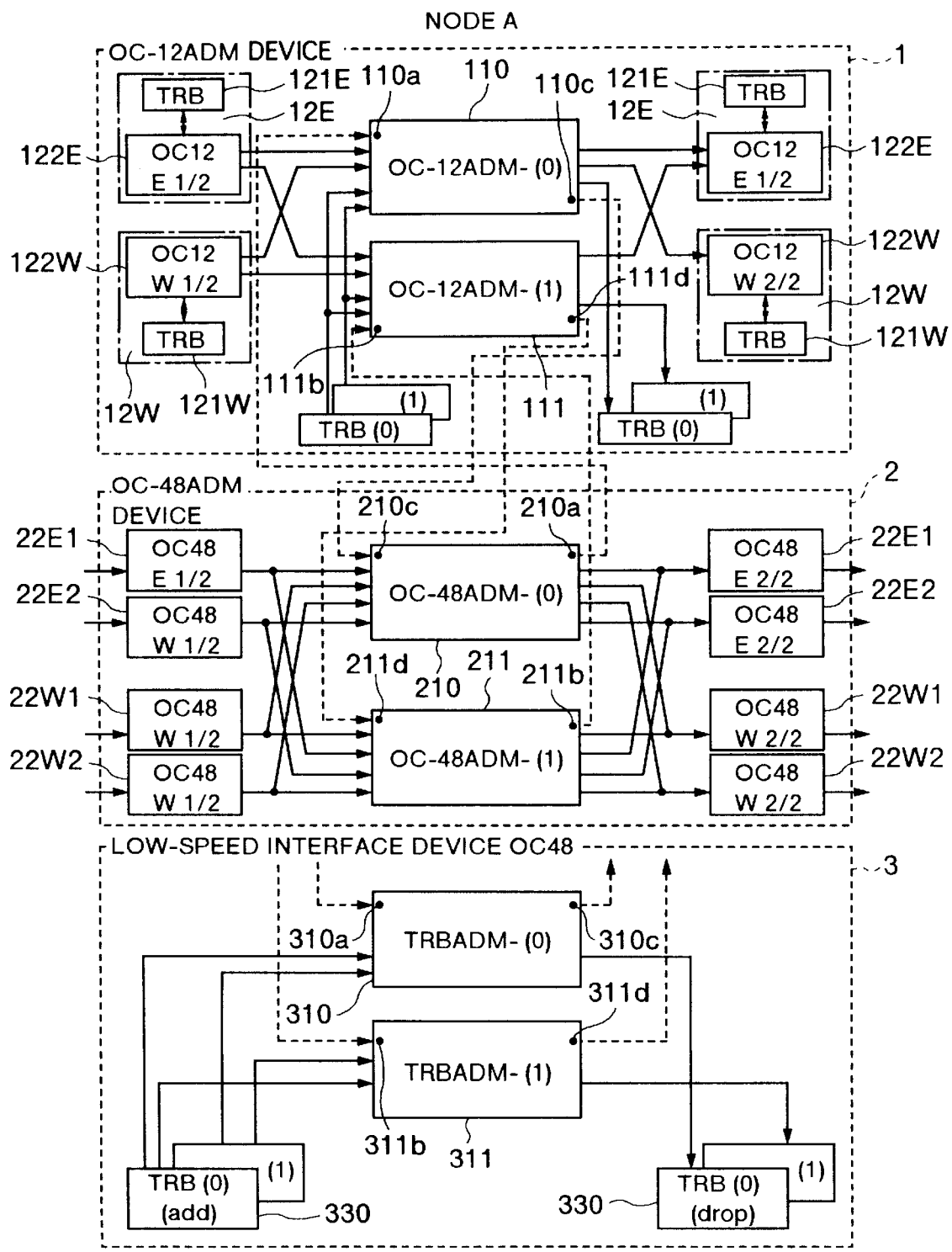
FIG. 15 is a diagram for explaining the connection of an OC-12 ADM device and an OC-48 ADM device at a node A.

FIG. 15 shows the configuration of connection of the OC-12ADM device 1 and the OC-48ADM device 2. An input portion 110a of a current system cross connection function portion (hereinafter referred to as ADM) 110 and an input portion 111b of a spare system ADM 111 in the OC-12ADM device 1 are connected to an output portion 210a of a current system ADM 210 and an output portion 211b of a spare system ADM 211 in the OC-48ADM device 2, respectively. Similarly, an output portion 110c of the current system ADM 110 and an output portion 111d of the spare system ADM 111 in the OC-12ADM device 1 are connected to an input portion 210c of the current an input port0 and an input portion 211d of the spare system ADM 211 in the OC-48ADM device 2, respectively.

Further, the output portion 210a of the current system ADM 210 in the OC-48ADM device 2, the output portion 211b of the spare system ADM 211 in the OC-48ADM device 2 and the high-speed side interfaces of the OC-12 shelf are removed. Thereinstead, an input portion 310a of a current system ADM 310 and an input portion 311b of a spare system ADM 311 in a low-speed interface device 3 having low-speed interfaces 330 for OC-48 placed thereon are connected to the removed portions. The input portion 210c of the current system ADM 210 and the input portion 211d of the spare system ADM 211 in the OC-48ADM device 2 are connected to an output portion 310c of the current system ADM 310 and an output portion 311d of the spare system ADM 311 in the low-speed interface device 3.

A device timing for the newly connected OC-48ADM device 2A and OC-48 low-speed interface device 3 uses a construction to receive a reference clock signal used by the existing OC-12ADM device 1, thereby eliminating a timing error between devices.

Two-fiber rings 5AD and 5DA are additionally provided for two (22E2, 22W2) of four systems of optical interfaces 22E1 to 22W2 of the newly added OC-48ADM device 2. Thereby, OC-12 system two-fiber rings 4AD and 4DA and OC-48 system two-fiber rings 5AD and 5DA are structured. The presently used paths of OC-12 rings are transferred to the OC-48 system two-fiber rings. Thereafter, the connection of that one (4DA) of two optical fibers 4AD and 4DA connected to the OC-12 optical interface 12AW which is connected to the W side (12AW) at the node A, is changed to the OC-48 optical interface 22W1 on the W side (12AW) of the node A. Also, a low-speed interface 121W for OC-48 is placed at a position where the OC-12 optical interface 122W was placed until now.

2.1.1 Procedure For Up-Grading Of West Slide of OC-12

Figure 14:
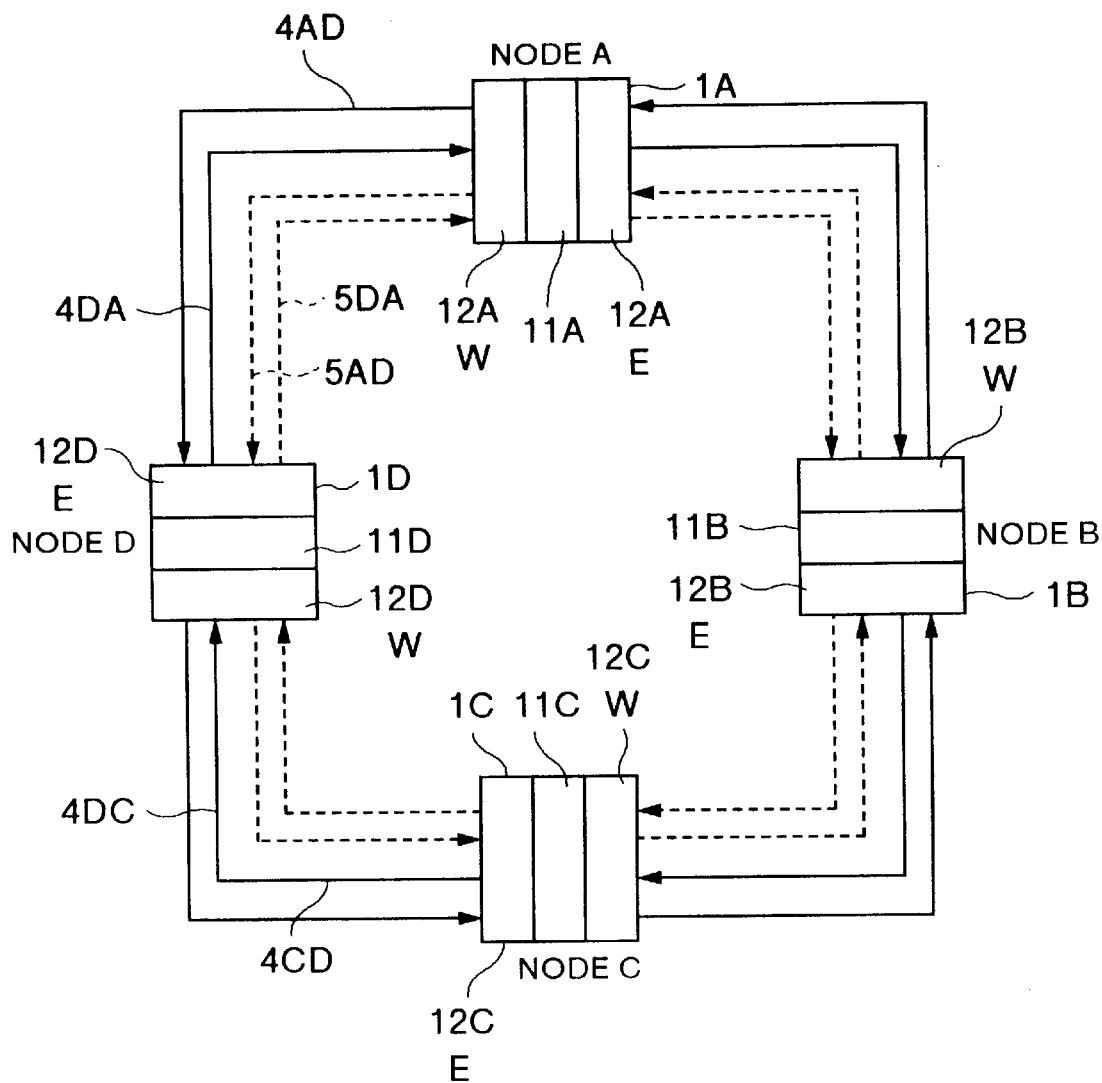
FIG. 14 is a diagram for explaining a ring construction from a two-fiber OC-12 system to a four-fiber OC-48 system.
Figure 16:
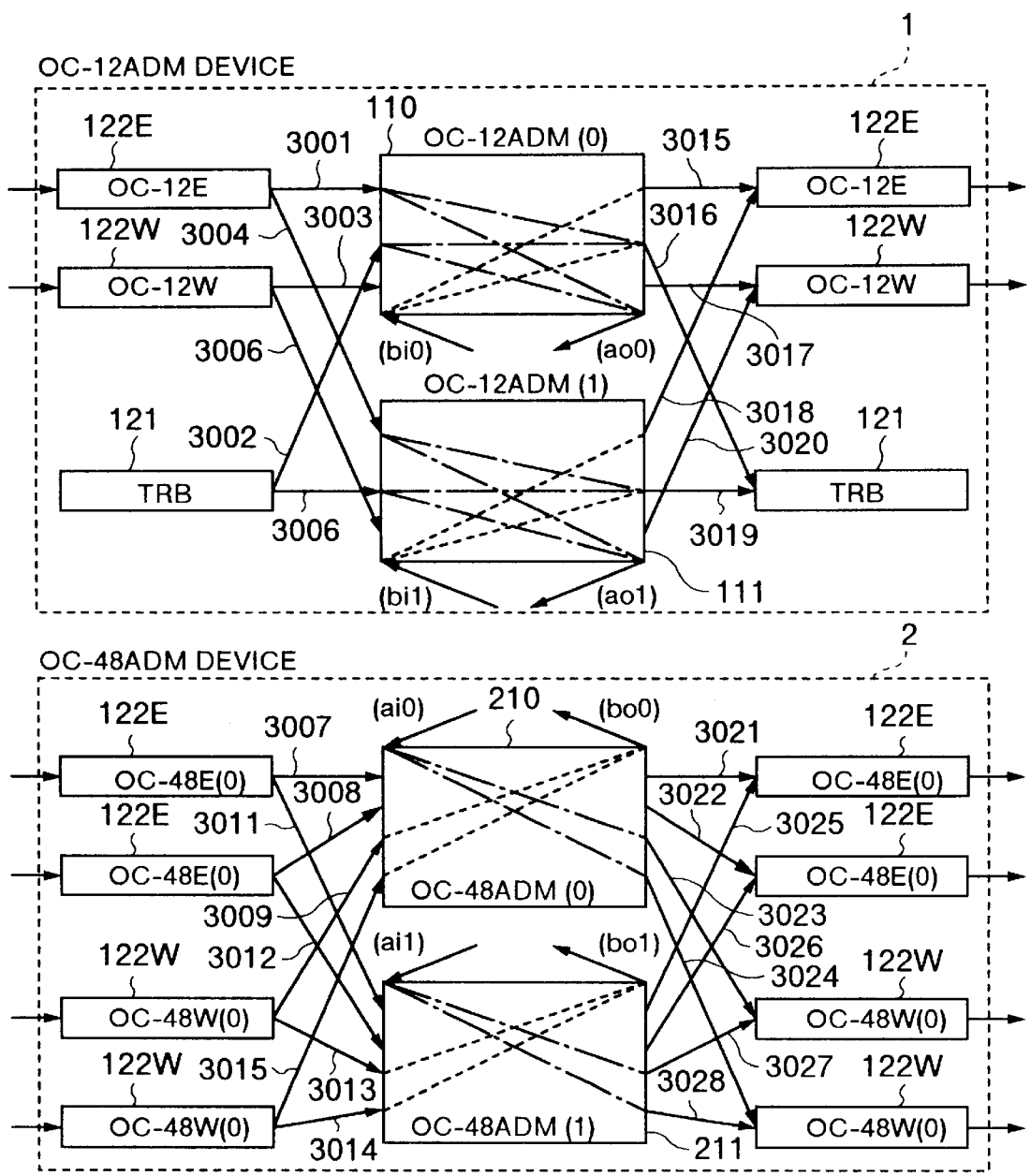
FIG. 16 is a diagram (I) for explaining the establishment of cross connection for up-grading from two-fiber to four-fiber.

A procedure for establishment of paths for cross connection at the node A shown in FIG. 14 will now be explained using FIGS. 16 and 17.

When the W side (12DW) of the OC-12ADM device 1D of the node D is up-graded while operating the E side (12DE) thereof, output portions 3001 and 3004 are subjected to BROADCAST path establishment so that the E-side input portion 3001 of the OC-12ADM device 1 is connected to W-side output portions 3023 and 3024 of the current system ADM 210 of the OC-48ADM device 2 and is also connected to the existing TRB output portion 3016 in a DROP connection manner and so that the E-side input portion 3004 of the OC-12ADM device 1 is connected to W-side output portions 3027 and 3028 of the spare system ADM 211 of the OC-48ADM device 2 and is also connected to the existing TRB output portion 3019 in a DROP connection manner.

There is also performed a BROADCAST path establishment so that W-side input portions 3009 and 3010 of the current system ADM 210 of the OC-48ADM device 2 are connected to an E-side output portion 3015 of the OC-12ADM device 1 and are also connected to the existing TRB output portion 3016 in a DROP connection manner and so that input portions 3013 and 3014 of the spare system ADM 211 are connected to an E-side output portion 3018 of the OC-12ADM device 1 and are also connected to the existing TRB output portion 3019 in a DROP connection manner.

The existing TRB input portion 3002 of the OC-12ADM device 1 is subjected to BROADCAST path establishment so that it is connected to the existing TRB output portion 3016 in a HAIR PIN connection manner and is also connected to the W-side output portions 3023 and 3024 of the current system ADM 210 of the OC-48ADM device 2 in an ADD connection manner. Similarly, the TRB input portion 3006 is subjected to BROADCAST path establishment so that it is connected to the TRB output portion 3019 in a HAIR PIN connection manner and is also connected to the W-side output portions 3027 and 3028 of the spare system ADM 211 of the OC-48ADM device 2 in an ADD connection manner.

2.1.2 Procedure Of Connection For Operation Of OC-48ADM Device

Figure 17:
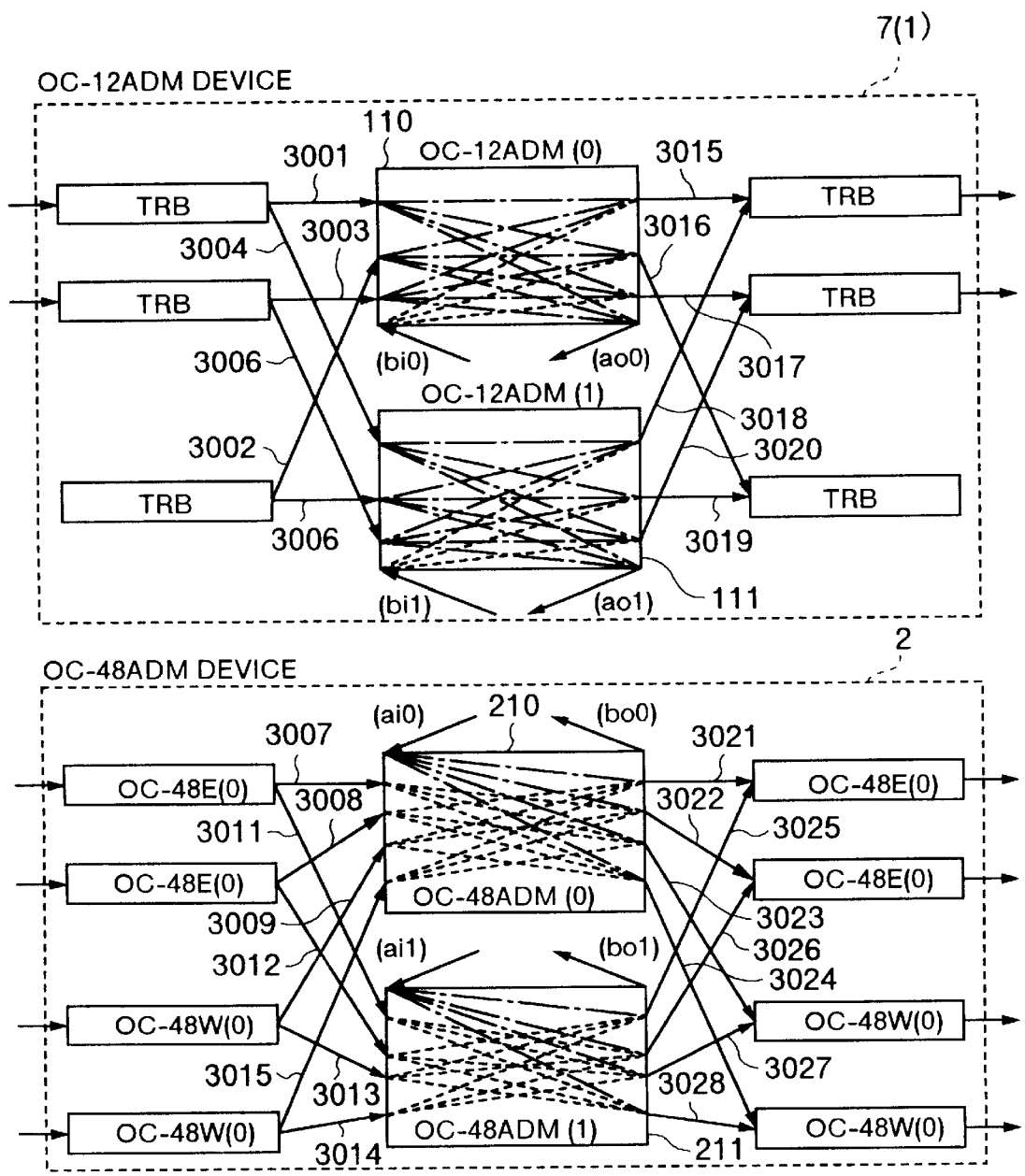
FIG. 17 is a diagram (II) for explaining the establishment of cross connection for up-grading from two-fiber to four-fiber.

A procedure for cross connection aiming at the operation of the OC-48ADM device at the node D will be shown using FIG. 17.

First, E-side input portions 3007 and 3008 of the current system ADM 210 of the OC-48ADM device 2 are subjected to BROADCAST path establishment so that they are connected to the W-side output portions 3023 and 3024 of the current system ADM 210 of the OC-48ADM device 2 and are also connected to the TRB output portions 3015 to 3020 in the low-speed interface device 7 (or the OC-12ADM device 1) in a DROP connection manner.

There is similarly performed a BROADCAST path establishment so that the W-side input portion 3013 of the spare system ADM 211 of the OC-48ADM device 2 is connected to the E-side output portions 3025, 3026 and 3028 of the spare system ADM 211 of the ADM device 2 and is also connected to the TRB output portions 3015 to 3020 in the low-speed interface device 7 in a DROP connection manner and so that the input portion 3014 is connected to the E-side output portions 3025, 3026 and 3027 of the spare system ADM 211 of the ADM device 2 and is also connected to the TRB output portions 3015 to 3020 in the low-speed interface device 7 in a DROP connection manner.

There is also performed a BROADCAST path establishment so that the TRB input portions 3001 to 3006 in the low-speed interface device 7 are respectively connected to the corresponding TRB output portions of the low-speed interface device 7 in a HAIR PIN connection manner and are also connected to the E-side and W-side output portions 3021 to 3024 of the current system 210 of the OC-48ADM device 2 and the output portions 3025 to 3028 of the spare system 211 in an ADD connection manner.

In the foregoing, the procedure has been mentioned in conjunction with the establishment of cross connection paths at the node D. Cross connection paths are also established at each of the other nodes in accordance with a similar procedure.

2.2 PROCEDURE FOR UP-GRADING OF NODE D

Figure 18:
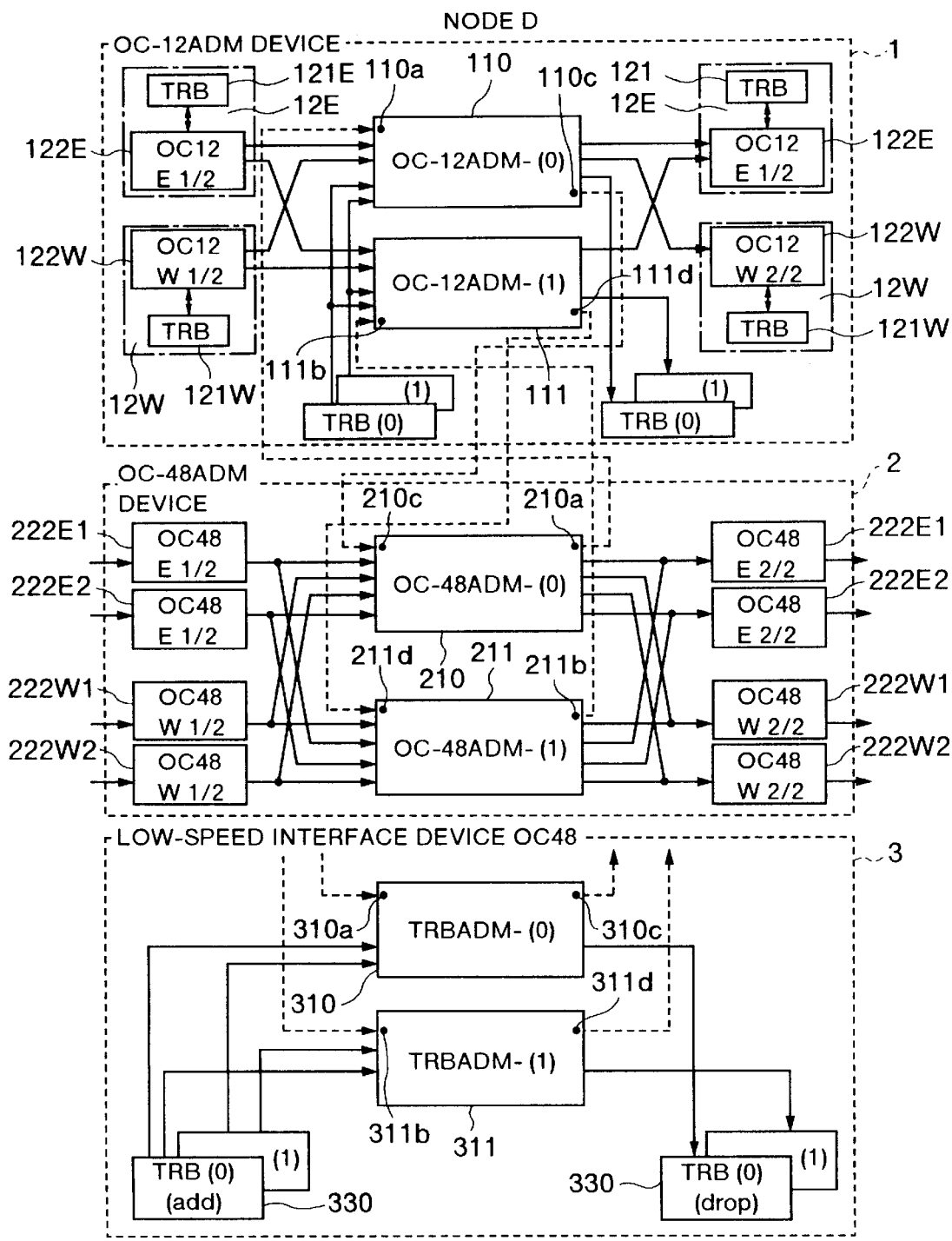
FIG. 18 is a diagram for explaining the connection of an OC-12 ADM device and an OC-48 ADM device at a node D.

FIG. 18 shows the connection of an OC-12ADM device 1 and an OC-48ADM device 2. An input portion 110a of a current system ADM 110 and an input portion 111b of a spare system ADM 111 in the OC-12ADM device 1 are connected to an output portion 210a of a current system ADM 210 and an output portion 211b of a spare system ADM 211 in the OC-48ADM device 2, respectively.

Also, an output portion 110c of the current system ADM 110 and an output portion 111d of the spare system ADM 111 in the OC-12ADM device 1 are connected to an input portion 210c of the current system ADM 210 and an input portion 211d of the spare system 211 in the OC-48ADM device 2, respectively.

Further, the output portion 210a of the current system ADM 210 in the OC-48ADM device 2, the output portion 211b of the spare system ADM 211 in the OC-48ADM device 2 and the high-speed side interfaces of the OC-12 shelf are removed.

Thereinstead, an input portion 310a of a current system ADM 310 and an input portion 311b of a spare system ADM 311 in a low-speed interface device 3 having low-speed interfaces 330 placed thereon are connected to the removed portions. The input portion 210c of the current system ADM 210 and the input portion 211d of the spare system ADM 211 in the OC-48ADM device 2 are connected to an output portion 310c of the current system ADM 310 and an output portion 311d of the spare system ADM 311 in the low-speed interface device 3.

A device timing for the newly connected OC-48ADM device 2 and OC-48 low-speed interface device 3 uses a construction to receive a reference clock signal used by the existing OC-12ADM device 1, thereby eliminating a timing error between devices.

Two-fiber rings 5DA and 5AD are additionally provided for four systems of optical interfaces 222E1, 222E2, 222W1 and 222W2 of the newly added OC-48ADM device 2. Thereby, OC-12 system two-fiber rings 4AD and 4DA and OC-48 system two-fiber rings 5DA and 5AD are structured. The presently used paths of OC-12 rings are transferred to the OC-48 system two-fiber rings. Thereafter, the connection of that one (122E) of two optical fibers connected to the OC-12 optical interface which is connected to the E side (12DE) at the node D, is changed to the OC-48 optical interface 222E1 on the E side (12DE) of the node D. Also, a low-speed interface 121E for OC-48 is placed at a position where the. OC-12 optical interface 122E was placed until now. The establishment of cross connection in this case is made in accordance with the procedure mentioned in conjunction with the node A.

The above-mentioned series of works are similarly performed between other nodes to advance the up-grading work. In the course of the up-grading work, there is formed a ring in which an OC-12 system and an OC-48 system coexist. As shown in FIG. 10, information of pay load in a OC-12 frame is byte-multiplexed to pay load in a OC-48 frame. However, in the ADM 210 or 211, only a capacity corresponding to OC-12 (622.08 Mbps) is path-connected to an output portion, thereby forming a ring in which an OC-12 system and an OC-48 system coexist physically.

The similar work is performed between the other nodes to complete the up-grading work. Thereby, in the case where the existing OC-12 system two-fiber ring network is up-graded to the OC-48 system four-fiber ring network, the utilization and reuse of interface devices of the existing apparatus and the space saving of the whole system can be realized by handling the existing high-speed side interfaces as low-speed side interfaces, adding a device having thereon high-speed interfaces for handling high-speed signals, and using the existing apparatus as an apparatus for accommodating low-speed interfaces.

3. PROCEDURE FOR IN-SERVICE UP-GRADING FROM STATE IN WHICH OC-12ADM DEVICE IS BEING USED IN FOUR-FIBER APPLICATION TO STATE IN WHICH OC-48ADM DEVICE IS USED IN TWO-FIBER APPLICATION

Figure 19:
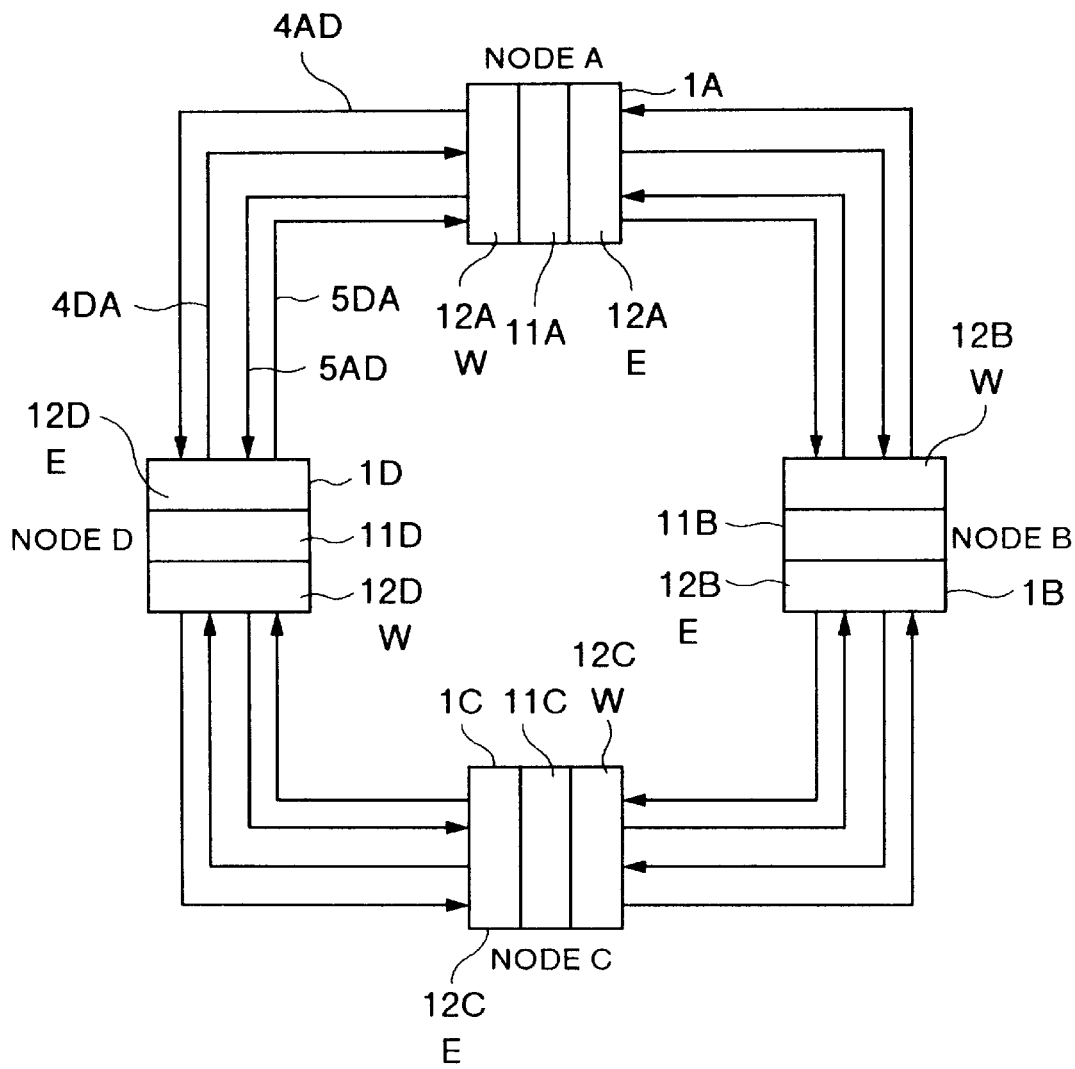
FIG. 19 is a diagram for explaining a ring construction from a four-fiber OC-12 system to a two-fiber OC-48 system.

FIG. 19 shows the state of a four-fiber ring network formed by four OC-12ADM devices 1A to 1D of nodes A, B, C and D in which transmission paths 4AD and 4DA are being used as a current system while transmission paths 5AD and 5DA are being used as a spare system. In the following, explanation will be made of the case where an in-service up-grading from OC-12 system 1 to OC-48 system 2 is made in such a network.

In a procedure explained herein, the OC-12ADM device 1 having been operated with low-speed side interfaces (hereinafter referred to as TRB's) mounted thereon is additionally provided with low-speed side interfaces and is further added with an OC-48ADM device 2. First, a procedure for up-grading at the node A will be shown. Subsequently, a procedure for up-grading at the node D will be shown. Further, the establishment of device-to-device connection and cross connection for up-grading of a ring network between the nodes A and D will be mentioned.

3.1 PROCEDURE FOR UP-GRADING OF NODE A

Figure 20:
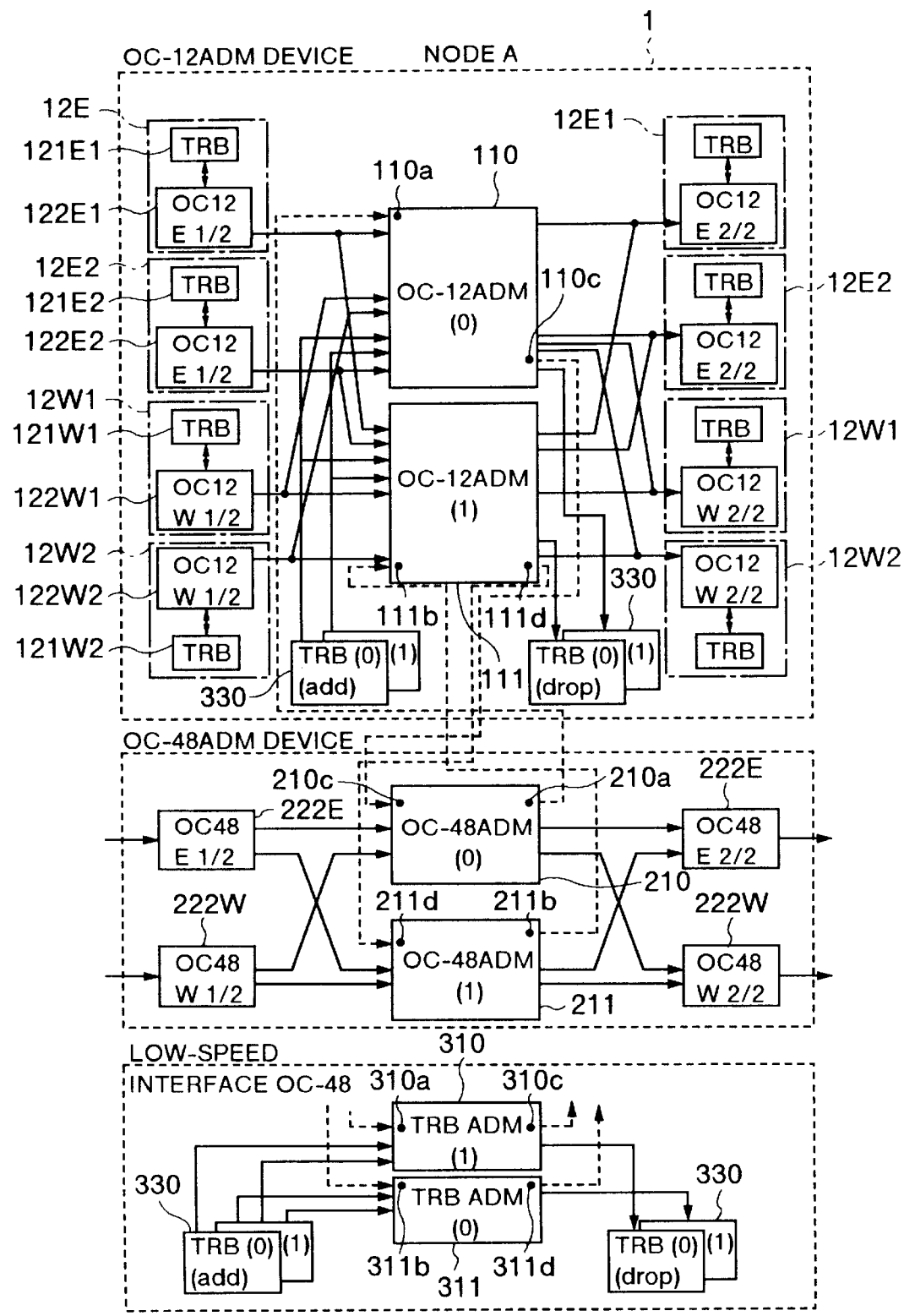
FIG. 20 is a diagram for explaining the connection of an OC-12 ADM device and an OC-48 ADM device at a node A.

FIG. 20 shows a procedure for up-grading of the node A by the connection of the OC-12ADM device 1 and the OC-48ADM device 2. First, an input portion 110a of a current system cross connection function portion (hereinafter referred to as ADM) 110 in the OC-12ADM device 1 is connected to an output portion 210a of a current system ADM 210 in the OC-48ADM device 2, and an input portion 111b of a spare system ADM 111 in the OC-12ADM device 1 is connected to an output portion 211b of a spare system ADM 211 in the OC-48ADM device 2.

Similarly, an output portion 110c of the current system ADM 110 in the OC-12ADM device 1 is connected to an input portion 210c of the current system ADM 210 in the OC-48ADM device 2, and an output portion 111d of the spare system ADM 111 in the OC-12ADM device 1 is connected to an input portion 211d of the spare system ADM 211 in the OC-48ADM device 2.

Also, the output portion 210a of the current system ADM 210 in the OC-48ADM device 2, the output portion 211b of the spare system ADM 211 in the OC-48ADM device 2 and the high-speed side interfaces of the OC-12 shelf are removed. Thereinstead, an input portion 310a of a current system ADM 310 and an input portion 311b of a spare system ADM 311 in a low-speed interface device 3 having low-speed interfaces 330 for OC-48 placed thereon are connected to the removed portions. Similarly, the input portion 210c of the current system ADM 210 and the input portion 211d of the spare system ADM 211 in the OC-48ADM device 2 are connected to an output portion 310c of the current system ADM 310 and an output portion 311d of the spare system ADM 311 in the low-speed interface device 3.

A device timing for the newly connected OC-48ADM device 2 and OC-48 low-speed interface device 3 uses a construction to receive a reference clock signal used by the existing OC-12ADM device 1, thereby eliminating a timing error between devices.

Then, the connection of that one (122W2) of the optical fibers 5AD and 5DA being used as the spare system which is connected to the W side (12AW) at the node A, is changed to the OC-48 optical interface 222W on the W side (12AW) of the node A. Also, a low-speed interface 112W for OC-48 is placed at a position where the optical interface 122W2 for OC-12 was placed until now.

3.1.1 Procedure For Up-Grading Of E And W Sides Of OC-12 System

Figure 21:
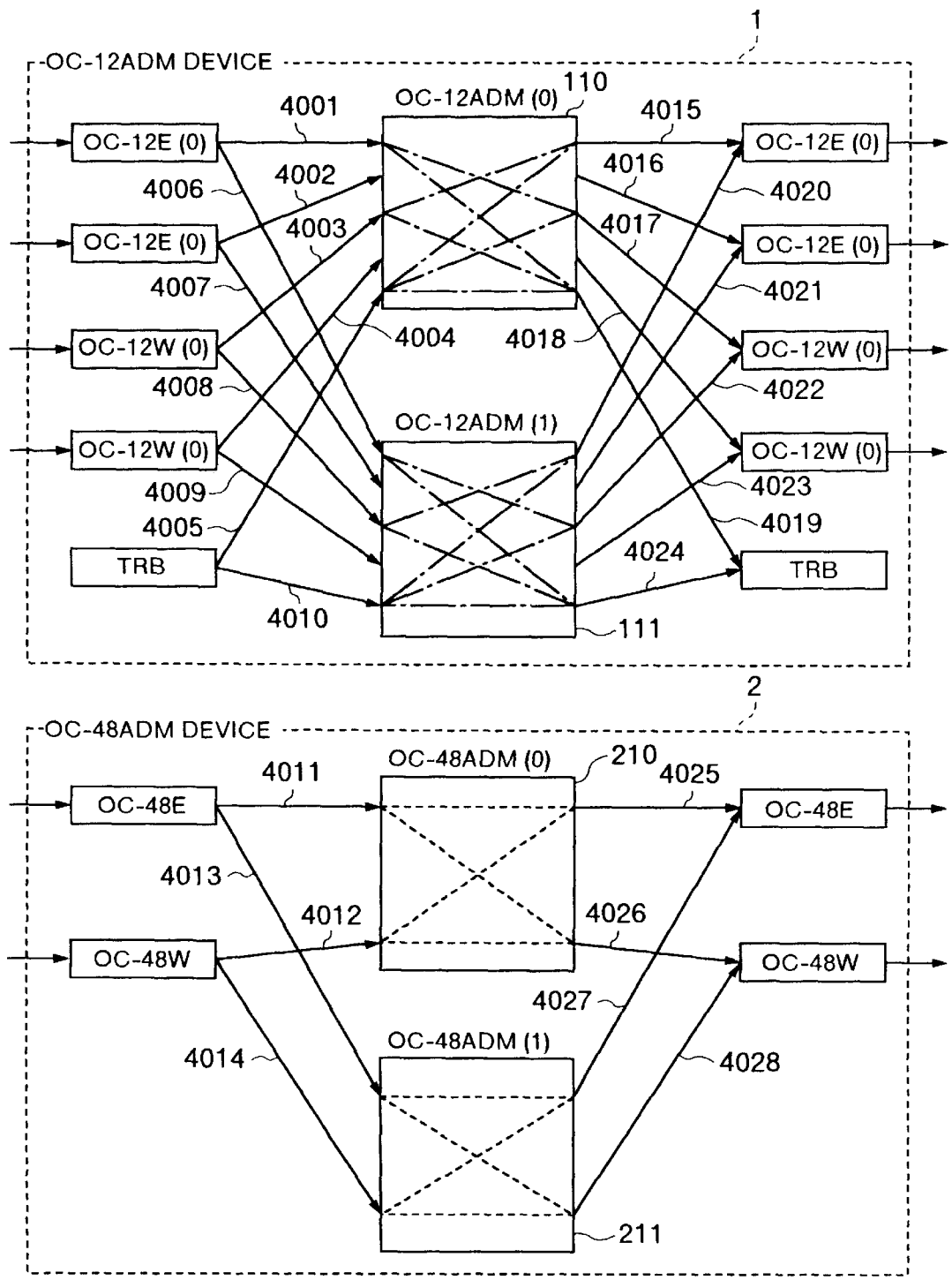
FIG. 21 is a diagram (I) for explaining the establishment of cross connection for up-grading from four-fiber to two-fiber.

The establishment of cross connection in this case will now be explained using FIGS. 19, 20 and 21. FIG. 21 shows the establishment of paths for up-grading of the spare system on the E and W sides of the OC-12ADM device 1.

A path for connecting an E-side input portion 4011 of the OC-48ADM device 2 to an E-side output portion 4025 thereof in a LOOP BACK connection manner and a path for connecting the same to a W-side output portion 4026 are BROADCAST-established in the current system ADM 210, and a path for connecting an E-side input portion 4013 to an E-side output portion 4027 in a LOOP BACK connection manner and a path for connecting the same to a W-side output portion 4028 are BROADCAST-established in the spare system ADM 211. Similarly, a path for connecting a W-side input portion 4012 of the OC-48ADM device 2 to the W-side output portion 4026 thereof in a LOOP BACK connection manner and a path for connecting the same to the E-side output portion 4025 are BROADCAST-established in the spare system ADM 211, and a path for connecting a W-side input portion 4014 to the W-side output portion 4028 in a LOOP BACK connection manner and a path for connecting the same to the E-side output portion 4027 are BROADCAST-established in the spare system ADM 211.

Next, paths for connecting an E-side current system input portion 4001 of the OC-12ADM device 1 to a W-side current system output portion 4017 in an ADD connection manner and connecting the same to the existing TRB output portion 4019 in a DROP connection manner are BROADCAST-established in the current system ADM 110. Similarly, paths for connecting an E-side spare system input portion 4006 to a W-side spare system output portion 4022 in an ADD connection manner and connecting the same to the existing TRB output portion 4024 in a DROP connection manner are BROADCAST-established in the spare system ADM 111.

Thereafter, paths for connecting a W-side current system input portion 4003 of the OC-12ADM device 1 to a W-side current system output portion 4015 in an ADD connection manner and connecting the same to the existing TRB output portion 4019 in a DROP connection manner are BROADCAST-established in the current system ADM 110. Similarly, paths for connecting a W-side spare system input portion 4008 to an E-side spare system output portion 4021 in an ADD connection manner and connecting the same to the existing TRB output portion 4024 in a DROP connection manner are BROADCAST-established in the spare system ADM 111.

Also, paths for connecting the existing TRB input portion 4005 to the E-side current system output portion 4015 and the W-side current system output portion 4017 of the OC-12ADM device 1 respectively in an ADD connection manner and a path for connecting the same to the existing TRB output portion 4019 in a HAIR PIN connection manner are BROADCAST-established in the current system ADM 110. Similarly, paths for connecting the existing TRB input portion 4010 to an E-side current system output portion 4020 and the W-side current system output portion 4022 of the OC-12ADM device 1 in an ADD connection manner and a path for connecting the same to the existing TRB output portion 4024 in a HAIR PIN connection manner are BROADCAST-established in the spare system ADM 111.

3.1.2 Procedure Of Connection For Operation Of OC-12ADM Device 1 And Operation Of OC-48ADM Device 2

Figure 22:
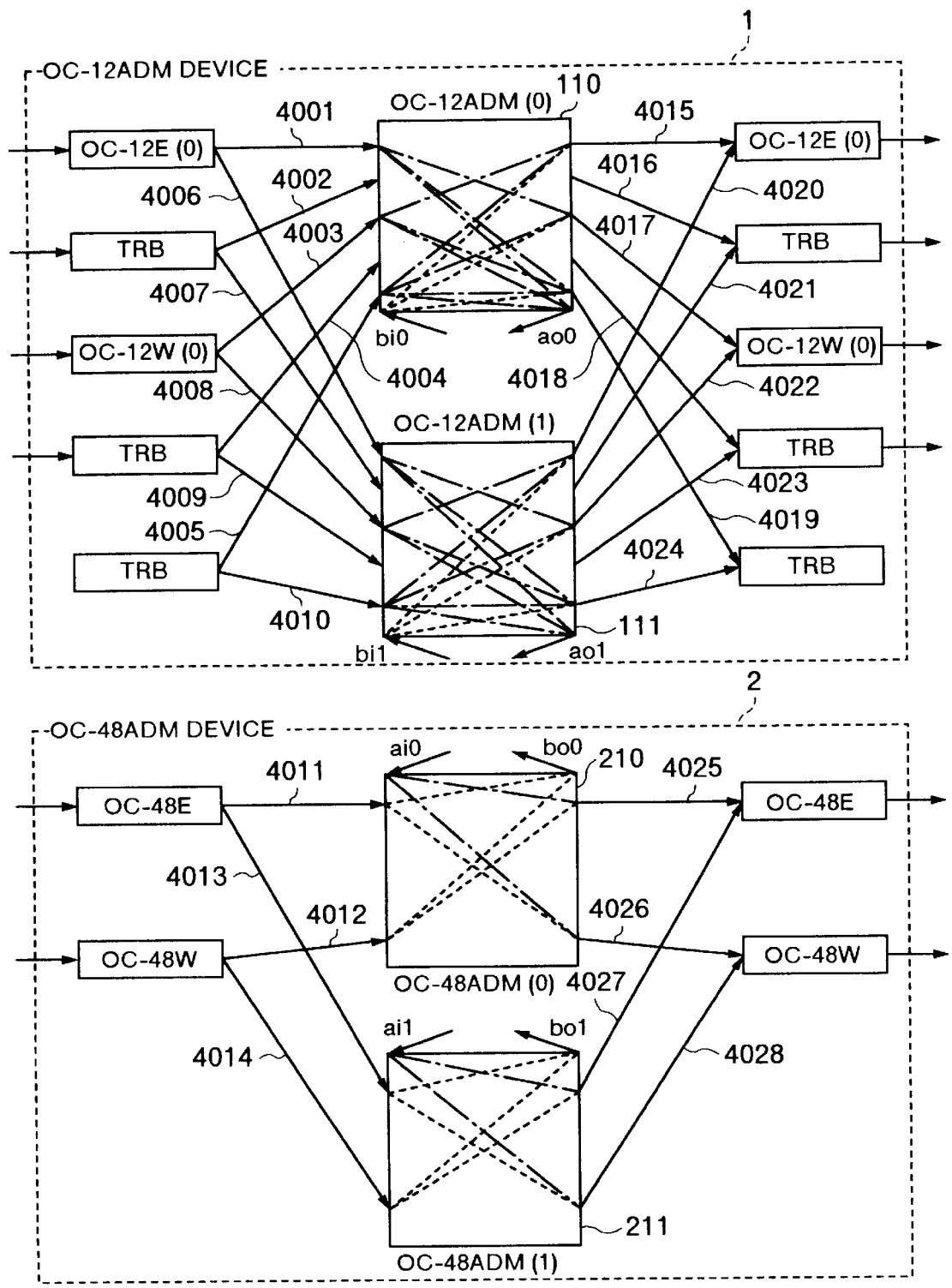
FIG. 22 is a diagram (II) for explaining the establishment of cross connection for up-grading from four-fiber to two-fiber.

Next, the establishment of paths for up-grading of the E and W sides of the OC-12ADM device 1 will be explained using FIG. 22.

After the above-mentioned paths have been established, the E-side current system input portion 4001 of the OC-12ADM device 1 is connected to the E-side output portion 4025 and the W-side output portion 4026 of the OC-48ADM device 2. For this purpose, paths for connecting the E-side current system input portion 4001 to the E-side output portion 4025 and the W-side output portion 4026 of the OC-48ADM device 2 through an input portion ai0 of the OC-48ADM device 2 from an output portion ao0 of the current system ADM 110 of the OC-12ADM 1 are established in the ADM's 110 and 210, respectively. Similarly, in order to connect the E-side spare system input portion 4006 of the OC-12ADM device 1 to the E-side output portion 4027 and the W-side output portion 4028 of the OC-48ADM device 2, paths for connecting the E-side spare system input portion 4006 to the E-side output portion 4027 and the W-side output portion 4028 of the OC-48ADM device 2 through an input portion ai1 of the OC-48ADM device 2 from an output portion ao1 of the spare system ADM 111 of the OC-12ADM 1 are established in the ADM's 111 and 211, respectively.

Further, in order to connect the W-side current system input portion 4003 of the OC-12ADM device 1 to the E-side output portion 4025 and the W-side output portion 4026 of the OC-48ADM device 2, a path for connecting the input portion 4003 to the output portion ao0 of the current system ADM 110 of the OC-12ADM device 1 is established in the ADM 110. Similarly, in order to connect the E-side spare system input portion 4008 of the OC-12ADM device 1 to the E-side output portion 4027 and the W-side output portion 4028 of the OC-48ADM device 2, a path for connecting the input portion 4006 to the output portion ao1 of the spare system ADM 111 of the OC-12ADM device 1 is established in the spare system ADM 111.

Next, in order to connect the existing TRB input portion 4005 to the E-side output portion 4025 and the W-side output portion 4026 of the OC-48ADM device 2, a path for connecting the TRB input portion 4005 to the output portion ao0 of the current system ADM 110 of the OC-12ADM device 1 is established in the current system ADM 110. Similarly, in order to connect the existing TRB input portion 4010 to the E-side output portion 4027 and the W-side output portion 4028 of the OC-48ADM device 2, a path for connecting the TRB input portion 4010 to the output portion ao1 of the spare system ADM 111 of the OC-12ADM device 1 is established in the current system ADM 111.

Also, in order to connect the E-side input portion 4011 of the OC-48ADM device 2 to the E-side current system output portion 4015 and the W-side current system output portion 4017 of the OC-12ADM device 1 in a THROUGH connection manner and to the existing TRB output portion 4019 in a DROP connection manner through the input portion bi0 of the OC-12ADM device 1 from the output portion bo0 of the OC-48ADM device 2, a path for connecting the input portion 4011 to the output portion bo0 is BROADCAST-established in the current system ADM 210 of the OC-48ADM device 2 and paths for connecting the input portion bi0 of the OC-12ADM device 1 to the E-side and W-side output portions 4015 and 4017 and the TRB output portion 4019 are BROADCAST-established in the current system ADM 110 of the OC-12ADM device 1.

In order to connect the E-side input portion 4013 of the OC-48ADM device 2 to the E-side spare system output portion 4020 and the W-side spare system output portion 4022 of the OC-12ADM device 1 in a THROUGH connection manner and to the existing TRB output portion 4024 in a DROP connection manner through the input portion bi1 of the OC-12ADM device 1 from the output portion bo1 of the OC-48ADM device 2, a path for connecting the input portion 4013 to the output portion bo1 is BROADCAST-established in the spare system ADM 211 of the OC-48ADM device 2 and paths for connecting the input portion bi1 of the OC-12ADM device 1 to the E-side and W-side output portions 4020 and 4022 and the TRB output portion 4024 are BROADCAST-established in the spare system ADM 111 of the OC-12ADM device 1.

3.1.3 Procedure of Connection For Up-Grading Of E And W Sides Of OC-12ADM Device 1

Figure 23:
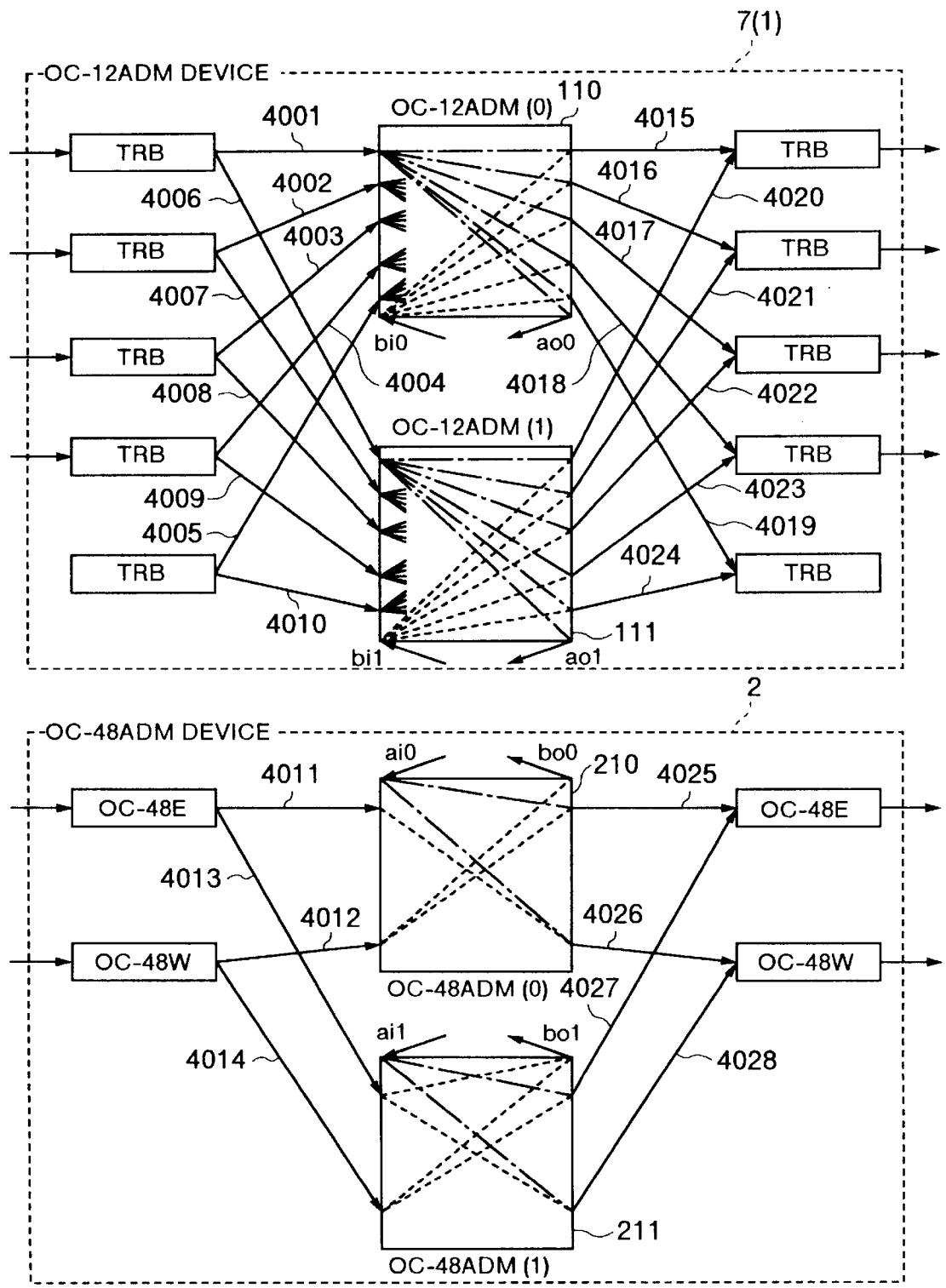
FIG. 23 is a diagram (III) for explaining the establishment of cross connection for up-grading from four-fiber to two-fiber.

The establishment of paths for up-grading of the current system of the OC-12ADM device 1 on the E and W sides thereof will be shown using FIG. 23.

After the up-grading is completed at the node D, the connection of paths for the operation of the OC-48ADM device 2 is performed in accordance with the following procedure. A path for connecting the E-side input portion 4011 of the OC-48ADM device 2 to the W-side output portion 4026 of the OC-48ADM device 2 in a THROUGH connection manner is established in the current system ADM 210. Similarly, a path for connecting the E-side input portion 4013 of the OC-48ADM device 2 to the W-side output portion 4028 of the OC-48ADM device 2 in a THROUGH connection manner and a path for connecting the same to the output portion bo1 are BROADCAST-established in the spare system ADM 211. In order to connect the input portion 4013 to the TRB output portions 4015 to 4024 in the low-speed interface device 7 in a DROP connection manner, paths are BROADCAST-established in the spare system ADM 111 of the OC-12ADM device 1 (or 7) through the output portion bo1 of the spare system ADM 211 of the OC-48ADM device 2 and the input portion bi1 of the spare system ADM 111 of the OC-12ADM device 1.

Further, a path for connecting the W-side input portion 4012 of the OC-48ADM device 2 to the W-side output portion 4025 of the OC-48ADM device 2 in a THROUGH connection manner and a path for connecting the same to the output portion bo1 are BROADCAST-established in the current system ADM 210. In order to connect the input portion 4012 to the TRB output portions 4015 to 4024 in the low-speed interface device 7 in a DROP connection manner, paths are BROADCAST-established in the current system ADM 110 of the OC-12ADM device 1 (or 7) through the output portion bo0 of the current system ADM 210 of the OC-48ADM device 2 and the input portion bi0 of the current system ADM 110 of the OC-12ADM device 1. Similarly, a path for connecting the W-side input portion 4014 of the OC-48ADM device 2 to the W-side output portion 4028 of the OC-48ADM device 2 in a THROUGH connection manner and a path for connecting the same to the output portion bo1 are BROADCAST-established in the spare system ADM 211. In order to connect the input portion 4014 to the TRB output portions 4015 to 4024 in the low-speed interface device 7 in a DROP connection manner, paths are BROADCAST-established in the spare system ADM 111 of the OC-12ADM device 1 (or 7) through the output portion bo1 of the spare system ADM 211 of the OC-48ADM device 2 and the input portion bi1 of the spare system ADM 111 of the OC-12ADM device 1.

Also, in order to connect the TRB input portion 4001 in the low-speed interface device 7 to the TRB output portions 4015 to 4019 in a HAIR PIN connection manner and to connect the same to the output portion ao0, paths are BROADCAST-established in the current system ADM 110 of the OC-12ADM device 1. In order to connect the input portion 4001 to the E-side and W-side output portions 4025 and 4026 of the OC-48ADM device 2 in a DROP connection manner, paths are BROADCAST-established in the current system ADM 210 of the OC-48ADM 2 through the output portion ao0 of the current system ADM 110 of the OC-12ADM device 1 and the input portion ai0 of the current system ADM 210 of the OC-48ADM device 2. Similarly, in order to connect the TRB input portion 4006 in the low-speed interface device 7 to the TRB output portions 4020 to 4024 in a HAIR PIN connection manner and to connect the same to the output portion bo0, paths are BROADCAST-established in the spare system ADM 111 of the OC-12ADM device 1. In order to connect the input portion 4006 to the E-side and W-side output portions 4027 and 4028 of the OC-48ADM device 2 in a DROP connection manner, paths are BROADCAST-established in the spare system ADM 211 of the OC-48ADM 2 through the output portion ao1 of the current system ADM 111 of the OC-12ADM device 1 and the input portion ai1 of the spare system ADM 211 of the OC-48ADM device 2.

The above-mentioned establishment of paths is similarly performed for each TRB input portion (4002, 4007, 4003, 4008, 4004, 4009, 4005, 4010). Further, cross connection paths are also connected at each node in accordance with a similar procedure.

3.2 PROCEDURE FOR UP-GRADING OF NODE D

Figure 24:
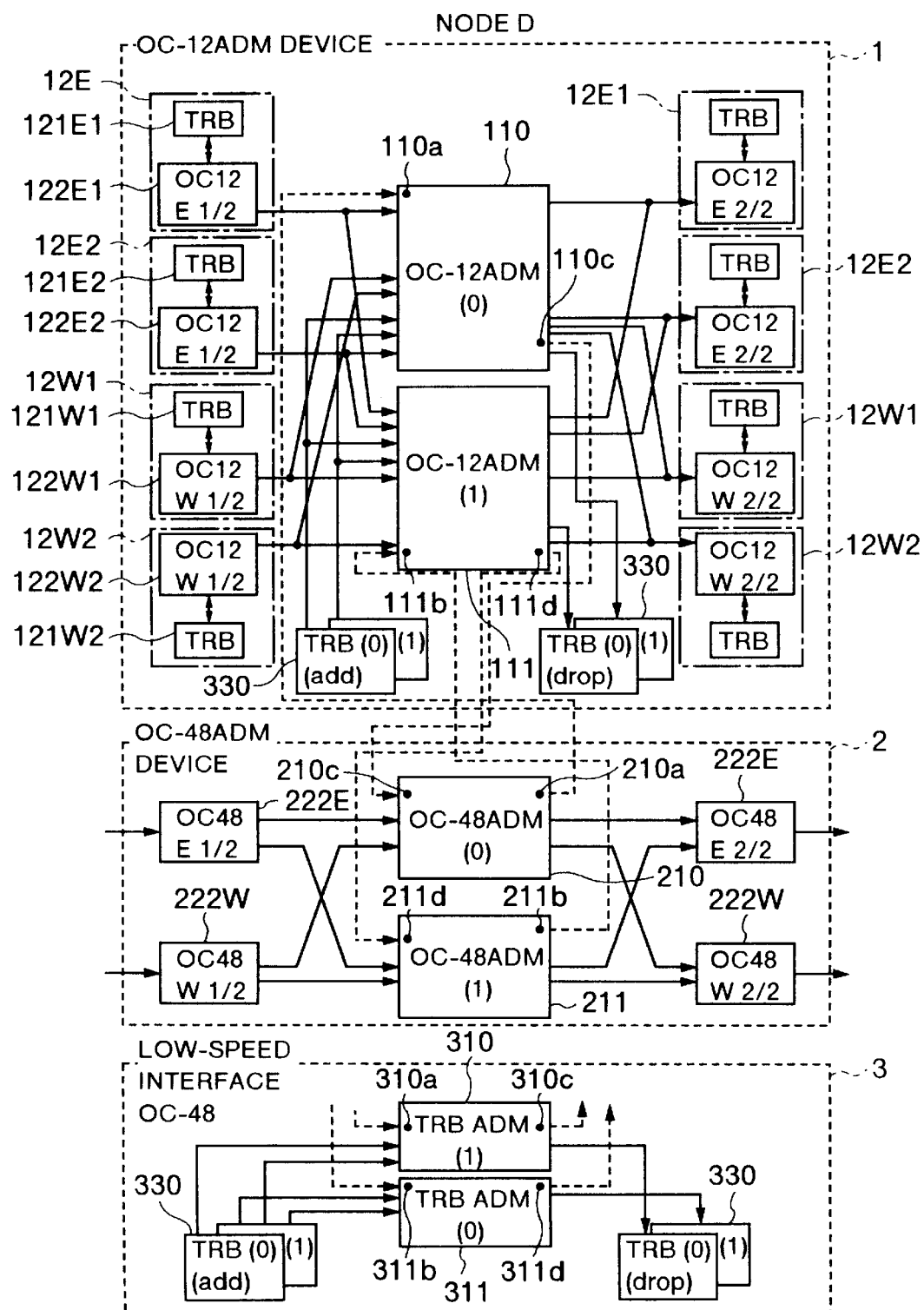
FIG. 24 is a diagram for explaining the connection of an OC-12ADM device and an OC-48ADM device at a node D.

A procedure for up-grating of the node D will be explained using FIG. 24 which shows the connection of an OC-12ADM device 1 and an OC-48ADM device 2. An input portion 110a of a current system ADM 110 in the OC-12ADM device 1 is connected to an output portion 210a of a current system ADM 210 in the OC-48ADM device 2. Similarly, an input portion 111b of a spare system ADM 111 in the OC-12ADM device 1 is connected to an output portion 211b of a spare system ADM 211 in the OC-48ADM device 2.

Also, an output portion 110c of the current system ADM 110 in the OC-12ADM device 1 is connected to an input portion 210c of the current system ADM 210. Similarly, an output portion 111d of the spare system ADM 111 in the OC-12ADM device 1 is connected to an input portion 211d of the spare system ADM 211 in the OC-48ADM device 2.

The output portion 210a of the current system ADM 210 in the OC-48ADM device 2, the output portion 211b of the spare system ADM 211 in the OC-48ADM device 2 and the high-speed side interfaces of the OC-12 shelf are removed. Thereinstead, an input portion 310a of a current system ADM 310 and an input portion 311b of a spare system ADM 311 in a low-speed interface device 3 having thereon low-speed interfaces 330 for OC-48 placed thereon are connected to the removed portions. Further, the input portion 210c of the current system ADM 210 and the input portion 211d of the spare system ADM 211 in the OC-48ADM device 2 are connected to an output portion 310c of the current system ADM 310 and an output portion 311d of the spare system ADM 311 in the low-speed interface device 3. A device timing for the newly connected OC-48ADM device 2 and OC-48 low-speed interface device 3 uses a construction to receive a reference clock signal used by the existing OC-12ADM device 1, thereby eliminating a timing error between devices.

Then, the connection of that one (122E2) in the optical fibers 5AD and 5DA being used as the spare system, which is connected to the E side (12DE) at the node D, is changed to the OC-48 optical interface 222E on the E side (12DE) of the node D. Also, a low-speed interface 121E2 for OC-48 is placed at a position where the optical interface 122E2 for OC-12 was placed until now. In this case, the establishment of cross connection in this case is similarly made in accordance with the procedure mentioned in conjunction with the node A.

Thereafter, paths in the OC-12 rings (4AD, 4DA) being used as the current system are transferred to the newly structured OC-48 rings (5AD, 5DA). At the node A (see FIG. 20), a low-speed interface 121W1 for OC-48 is placed at a position where the optical interface 122W1 was placed until now. Similarly, at the node D, (see FIG. 24) a low-speed interface 121E1 for OC-48 is placed at a position where the optical interface 122E1 was placed until now.

The above-mentioned series of works are similarly performed between other nodes to advance the up-grading work. In the course of the up-grading work, there is formed a ring in which an OC-12 system and an OC-48 system coexist. As shown in FIG. 10, information of pay load in a OC-12 frame is byte-multiplexed to pay load in a OC-48 frame. However, in the ADM (210A, 211A) of the node A and the ADM (210D, 211D) of the node D, only a capacity corresponding to OC-12 (622.08 Mbps) is path-connected to its output portion, thereby forming a ring in which an OC-12 system and an OC-48 system coexist physically.

The similar work is performed between the other nodes to complete the up-grading work. Thereby, in the case where the existing OC-12 system four-fiber ring network is up-graded to the OC-48 system two-fiber ring network, the utilization and reuse of interface devices of the existing apparatus and the space saving of the whole system can be realized by handling the existing high-speed side interfaces as low-speed side interfaces, adding a device having thereon high-speed interfaces for handling high-speed signals, and using the existing apparatus as an apparatus for accommodating low-speed interfaces.

Namely, according to the present invention, the use of the existing transmission apparatus as an apparatus capable of mounting or placing only a low-speed side interface device thereon becomes possible by providing each of the existing transmission apparatus and a newly added high-speed transmission apparatus with an ADM device having a cross connection function and making the arrangement of signal lines compatible with a low-speed side interface device of the existing transmission apparatus so that the low-speed side interface device of the existing transmission apparatus can be placed at a position where a high-speed side interface device of the existing transmission apparatus is placed.

Further, a higher-speed transmission apparatus using the existing apparatus can be constructed in such a manner that an apparatus having a high-speed side interface device mounted thereon is newly added to the above-mentioned apparatus having only the low-speed side interface device mounted thereon.

By providing the ADM device of the existing apparatus with a cross connection function which enables the establishment of a signal path(s) from any input port to any one or plural free output ports, a path established in the existing apparatus can also be established to a port connected to an added high-speed transmission apparatus side of the existing apparatus, so that an input signal is distributed to both the existing apparatus and the added high-speed transmission apparatus.

In the existing apparatus the change-over to a high-speed transmission path in the state of in-service can be made by using a path switch ring or line switch ring prescribed by the protocol of SONET so that the connection of a transmission path connected to a high-speed interface on the non-operating system side is changed to a high-speed apparatus by use of either a clockwise path or counterclockwise path and the operating system is changed over.

4. PROCEDURE FOR IN-SERVICE UP-GRADING FROM STATE IN WHICH OC-12ADM DEVICE IS BEING USED IN FOUR-FIBER APPLICATION TO STATE IN WHICH OC-48ADM DEVICE IS USED IN FOUR-FIBER APPLICATION

Figure 25:
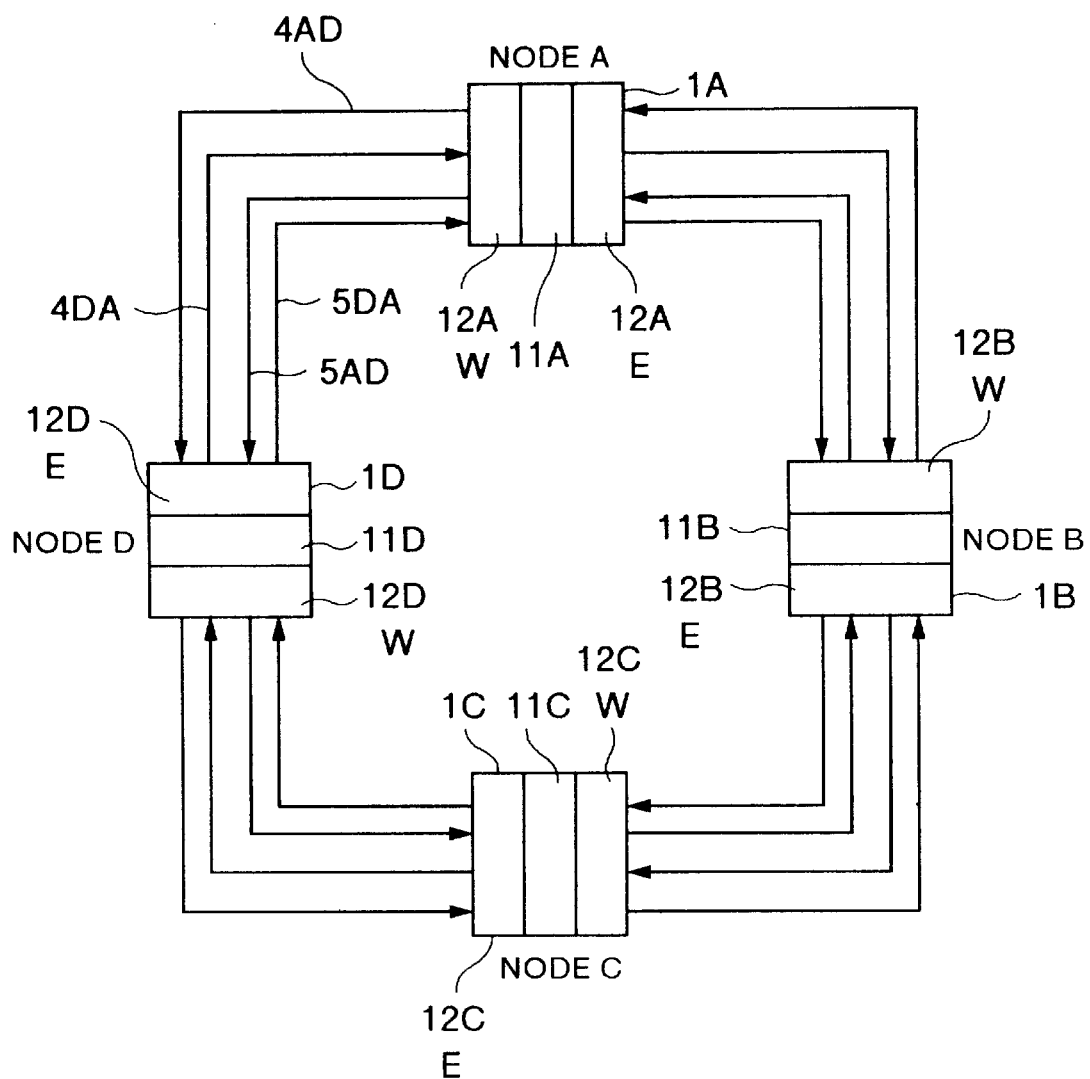
FIG. 25 is a diagram for explaining a ring construction from a four-fiber OC-12 system to a four-fiber OC-48 system.

FIG. 25 shows the state of a four-fiber ring network formed by four OC-12ADM devices 1 at nodes A, B, C and D in which transmission paths 4AD and 4DA are being used as a current system while transmission paths 5AD and 5DA are being used as a spare system. The present embodiment will be made in conjunction with the case where an in-service up-grading from OC-12 system 1 to OC-48 system 2 is made. In a procedure explained herein, the OC-12ADM device 1 having been operated with low-speed side interfaces (hereinafter referred to as TRB's) mounted thereon is additionally provided with low-speed side interfaces and is further added with an OC-48ADM device 2. First, a procedure for up-grading at the node A will be shown. Subsequently, a procedure for up-grading at the node D will be shown. Further, the establishment of device-to-device connection and cross connection for up-grading of a ring network between the nodes A and D will be mentioned.

4.1 PROCEDURE FOR UP-GRADING OF NODE A

Figure 26:
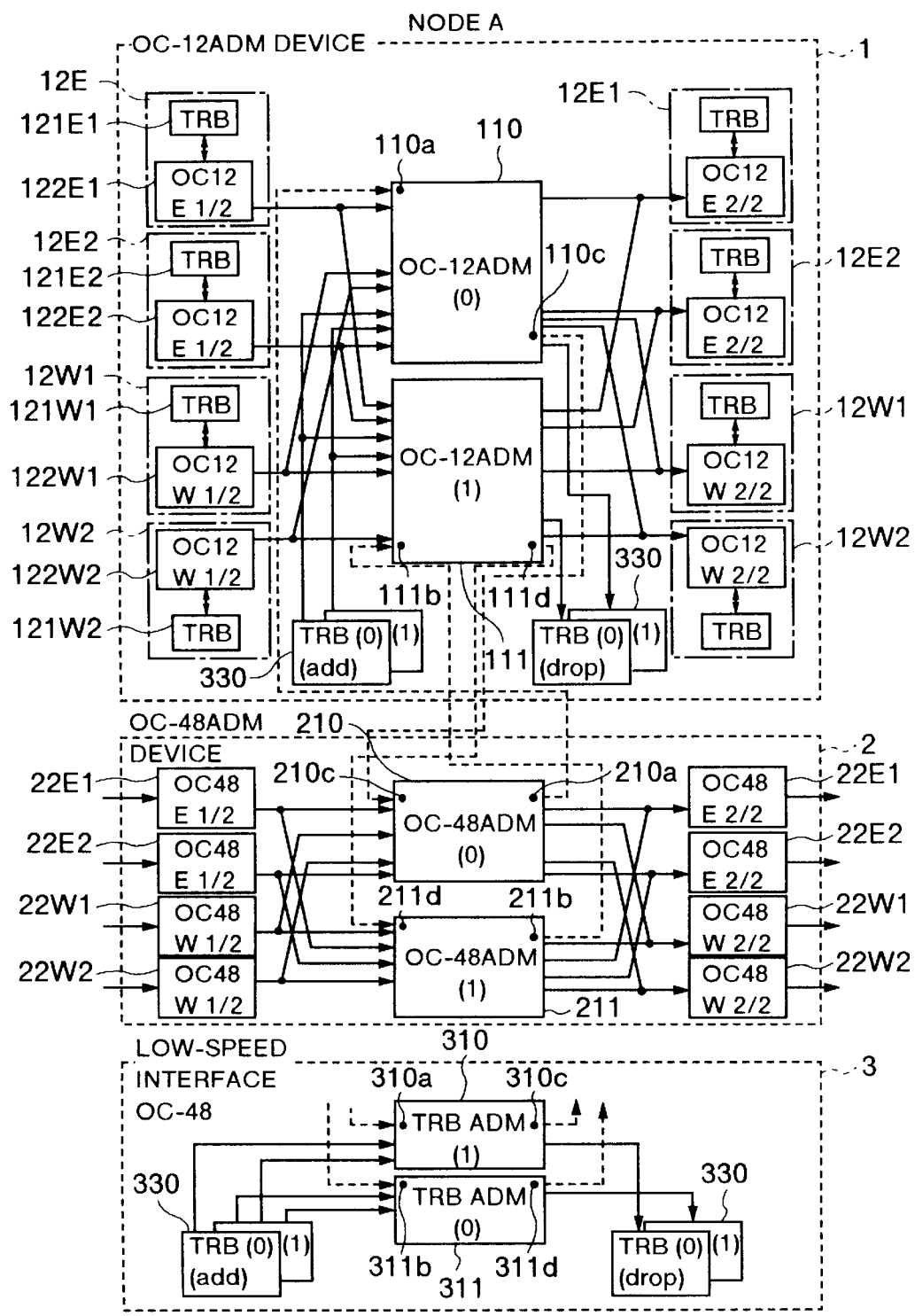
FIG. 26 is a diagram for explaining the connection of an OC-12ADM device and an OC-48ADM device at a node A.

FIG. 26 is a block diagram showing the connection of the OC-12ADM device 1 and the OC-48ADM device 2. An input portion 110a of a current system cross connection function portion (hereinafter referred to as ADM) 110 in the OC-12ADM device 1 is connected to an output portion 210a of a current system ADM 210 in the OC-48ADM device 2, and an input portion 111b of a spare system ADM 111 in the OC-12ADM device 1 is connected to an output portion 211b of a spare system ADM 211 in the OC-48ADM device 2. Similarly, an output portion 110c of the current system ADM 110 in the OC-12ADM device 1 is connected to an input portion 210c of the current system ADM 210 in the OC-48ADM device 2, and an output portion 111d of the spare system ADM 111 in the OC-12ADM device 1 is connected to an input portion 211d of the spare system ADM 211 in the OC-48ADM device 2.

Also, the output portion 210a of the current system ADM 210 in the OC-48ADM device 2, the output portion 211b of the spare system ADM 211 in the OC-48ADM device 2 and the high-speed interfaces of the OC-12ADM device shelf are removed. Thereinstead, an input portion 310a of a current system ADM 310 and an input portion 311b of a spare system ADM 311 in a low-speed interface device 3 having low-speed interfaces 330 for OC-48 placed thereon are connected to the removed portions. Further, the input portion 210c of the current system ADM 210 in the OC-48ADM device 2 is connected to an output portion 310c of the current system ADM 310 in the low-speed interface device 3, and the input portion 211d of the spare system ADM 211 in the OC-48ADM device 2 is connected to an output portion 311d of the spare system ADM 311 in the low-speed interface device 3. A device timing for the newly connected OC-48ADM device 2 and OC-48 low-speed interface device 3 uses a construction to receive a reference clock signal used by the existing OC-12ADM device 1, thereby eliminating a timing error between devices.

Then, the connection of that one (122W2) of the optical fibers 5AD and 5DA being used as the spare system, which is connected to the W side (12AW) of the OC-12ADM device 1 at the node A, is changed to an optical interface 22W2 of the OC-48ADM device 2 on the W side (12AW) of the node A. Also, a low-speed interface 121W2 for the OC-48ADM device 2 is placed at a position where the optical interface 122W2 of the OC-12ADM device 1 was placed until now. The establishment of cross connection in this case will now be explained using FIGS. 27 to 29.

Figure 27:
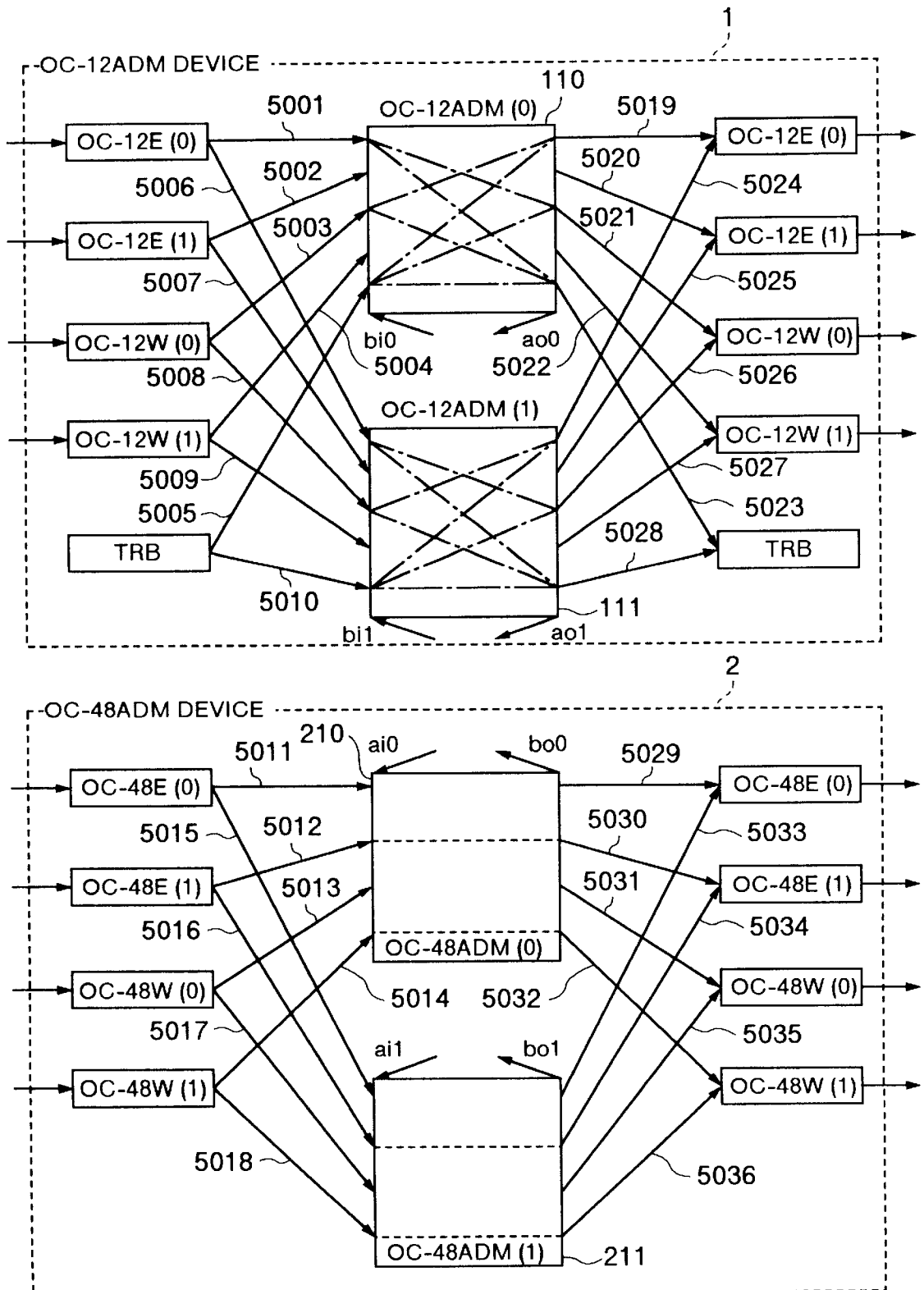
FIG. 27 is a diagram (I) for explaining the establishment of cross connection for up-grading from four-fiber to four-fiber.

4.1.1 Procedure Of Connection For Up-Grading Of Spare System Of OC-12ADM Device On E And W Sides Thereof FIG. 27 shows the procedure of establishment of connection for up-grading of the spare system of the OC-12ADM device on the E and W sides thereof.

In order to bring E-side spare system input portions 5012 and 5016 of the OC-48ADM device 2 to LOOP BACK connection, the input portion 5012 is path-connected to an E-side spare system output portion 5030 of the OC-48ADM device 2 and the input portion 5016 is path-connected to a spare system output portion 5034. Similarly, in order to bring W-side spare system input portions 5014 and 5018 of the OC-48ADM device 2 to LOOP BACK connection, the spare system input portion 5014 is path-connected to a W-side spare system output portion 5032 of the OC-48ADM device 2 and the spare system input portion 5018 is path-connected to a W-side spare system output portion 5036.

BROADCAST paths for connecting an E-side current system input portion 5001 of the existing OC-12ADM device 1 to a W-side current system output portion 5021 in a THROUGH path connection manner and to the existing TRB output portion 5023 in a DROP connection manner are established in the current system ADM 110 of the OC-12ADM device 1. BROADCAST paths for connecting an E-side current system input portion 5006 to a W-side current system output portion 5026 in a THROUGH path connection manner and to the existing TRB output portion 5028 in a DROP connection manner are established in the spare system ADM 111 of the OC-12ADM device 1.

Similarly, BROADCAST paths for connecting a W-side current system input portion 5003 of the OC-12ADM device 1 to an E-side current system output portion 5019 in a THROUGH path connection manner and to the existing TRB output portion 5023 in a DROP connection manner are established in the current system ADM 110 of the OC-12ADM device 1. BROADCAST paths for connecting a W-side current system input portion 5008 to a W-side current system output portion 5024 in a THROUGH path connection manner and to the existing TRB output portion 5028 in a DROP connection manner are established in the spare system ADM 111 of the OC-12ADM device 1.

Paths for connecting the existing TRB input portion 5005 to the E-side current system output portion 5019 and the W-side current system output portion 5021 of the OC-12ADM device 1 in an ADD connection manner and to the existing TRB output portion 5023 in a DROP connection manner are BROADCAST-established in the current system ADM 110 of the OC-12ADM device 1. Similarly, paths for connecting the existing TRB input portion 5010 to an E-side current system output portion 5024 and the W-side current system output portion 5026 of the OC-12ADM device 1 in an ADD connection manner and to the TRB output portion 5028 in a DROP connection manner are BROADCAST-established in the spare system ADM 111 of the OC-12ADM device 1.

Figure 28:
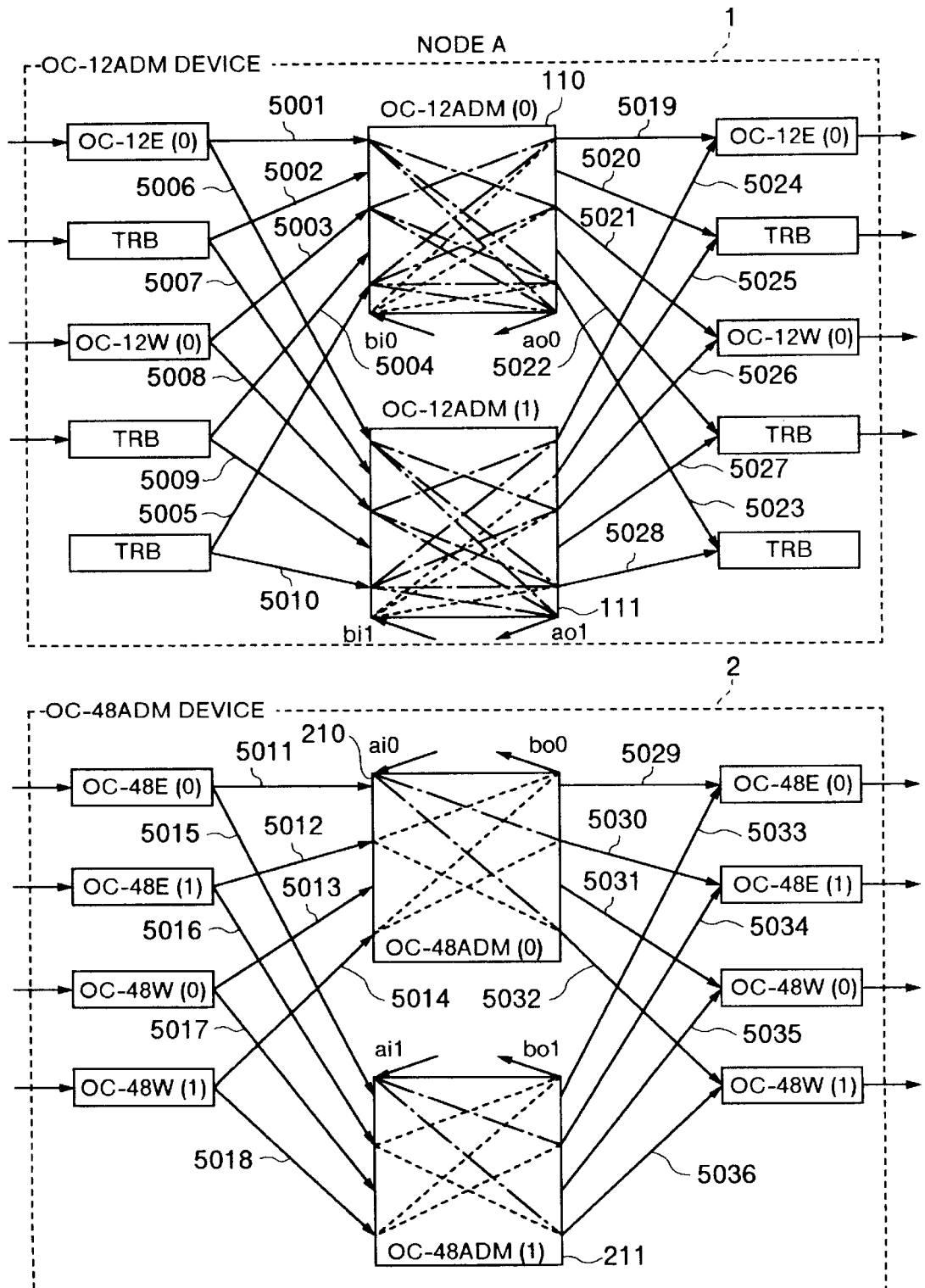
FIG. 28 is a diagram (II) for explaining the establishment of cross connection for up-grading from four-fiber to four-fiber.

4.1.2 Procedure For Connection Of Current System Of OC-12ADM Device 1 On E And W sides Thereof And Spare System Of OC-48ADM Device 2 On E And W sides Thereof In the following, the path connection of the current system of the OC-12ADM 1 on the E and W sides thereof and the spare system of the OC-48ADM device 2 on the E and W sides thereof following the above-mentioned procedure will be explained using FIG. 28. Subsequent to the above procedure, an output portion ao1 of the current system ADM 110 of the OC-12ADM device 1 is connected to an input portion ai0 of the current system ADM 210 of the OC-48ADM device 2. Similarly, an output portion ao1, an output portion bo0 and an output portion bo1 are connected to an input portion ai1, an input portion bi0 and an input portion bi1, respectively. Thereafter, in order to connect an-E-side current system input portion 5001 of the OC-12ADM device 1 to an E-side spare system output portion 5030 and a W-side current system output portion 5032 of the OC-48ADM device 2 in a THROUGH path connection manner, a path for connecting the input portion 5001 to the output portion ao1 is established in the current system ADM 110 of the OC-12ADM device 1 and paths for connecting the input portion ai0 of the ADM 210 of the OC-48ADM device 2 to the E-side spare system output portion 5030 and the W-side current system output portion 5032 are established in the current system ADM 210 of the OC-48ADM device 2.

Next, in order to connect an E-side current system input portion 5006 of the OC-12ADM device 1 to the E-side spare system output portion 5030 and the W-side current system output portion 5032 of the OC-48ADM device 2 in a THROUGH path connection manner, a path for connecting the input portion 5001 to the output portion ao1 is established in the spare system ADM 111 of the OC-12ADM device 1 and paths for connecting the input portion ai1 of the ADM 210 of the OC-48ADM device 2 to an E-side spare system output portion 5034 and a W-side current system output portion 5036 are established in the spare system ADM 211 of the OC-48ADM device 2.

Similarly, in order to connect a W-side current system input portion 5003 of the OC-12ADM device 1 to the E-side spare system output portion 5030 and the W-side current system output portion 5032 of the OC-48ADM device 2 in a THROUGH path connection manner, a path for connecting the input portion 5003 to the output portion ao0 is established in the current system ADM 110 of the OC-12ADM device 1. In order to connect a W-side current system input portion 5008 of the OC-12ADM device 1 to the E-side spare system output portion 5034 and the W-side current system output portion 5036 of the OC-48ADM device 2 in a THROUGH path connection manner, a path for connecting the input portion 5008 to the output portion ao1 is established in the spare system ADM 111 of the OC-12ADM device 1.

Also, in order to connect a TRB input portion 5005 in the low-speed interface to the E-side spare system output portion 5030 and the W-side current system output portion 5032 of the OC-48ADM device 2, a path for connecting the input portion 5005 to the output portion ao0 is established in the current system ADM 110 of the OC-12ADM device 1 in a BROADCAST manner with the above-mentioned path. Similarly, in order to connect a TRB input portion 5010 to the E-side spare system output portion 5034 and the W-side current system output portion 5036 of the OC-48ADM device 2, a path for connecting the input portion 5010 to the output portion ao1 is established in the spare system ADM 111 of the OC-12ADM device 1 in a BROADCAST manner with the above-mentioned path.

Figure 29:
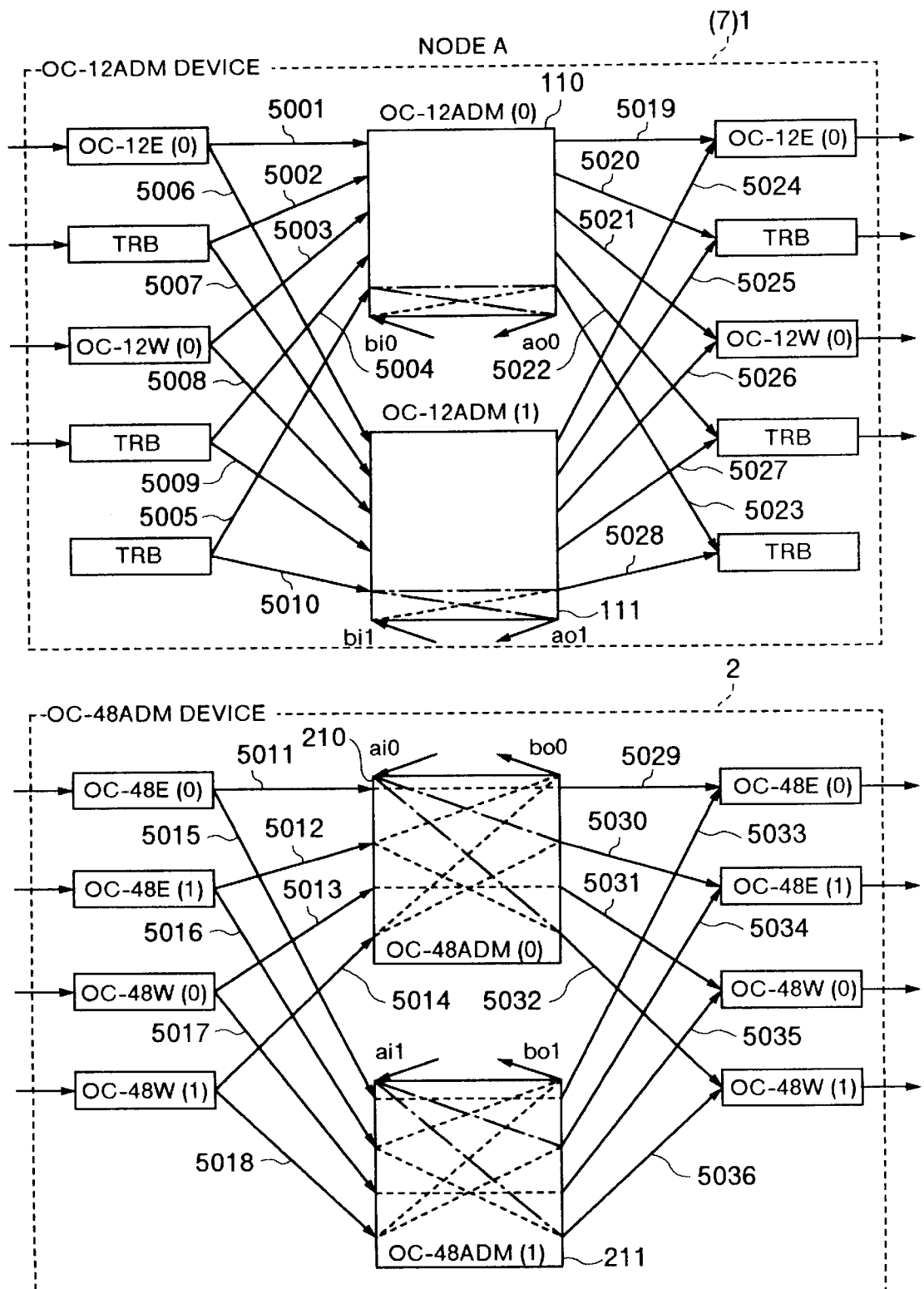
FIG. 29 is a diagram (III) for explaining the establishment of cross connection for up-grading from four-fiber to four-fiber.

4.1.3 Procedure For Connection Of Current System Of OC-12ADM Device On E And W Sides Thereof The connection of the current system of the OC-12ADM device on the E and W sides thereof will be explained using FIG. 29. The OC-12ADM device 1 is used as a low-interface device 7 for the OC-48ADM device. In order to connect the current systems on the E and W sides of the OC-48ADM device 2 in a LOOP BACK connection manner, LOOP BACK paths are established in the current system ADM 210 so that an E-side current system input portion 5011 of the OC-48ADM device 2 is connected to an E-side current system output portion 5029 of the OC-48ADM device 2 and a W-side current system input portion 5013 of the OC-48ADM device 2 is connected to a W-side current system output portion 5031 of the OC-48ADM device 2. Similarly, LOOP BACK paths are established in the spare system ADM 211 so that an E-side current system input portion 5015 of the OC-48ADM device 2 is connected to an E-side current system output portion 5033 of the OC-48ADM device 2 and a W-side current system input portion 5017 of the OC-48ADM device 2 is connected to a W-side current system output portion 5035 of the OC-48ADM device 2.

Next, in order to connect an E-side spare system input portion 5012 of the OC-48ADM device 2 to the W-side spare output portion 5032 of the OC-48ADM device 2 in a THROUGH connection manner and to a TRB output portion 5023 of the low-speed interface device 7 for OC-48ADM device (or OC-12ADM device 1) in a DROP connection manner, paths to the output portions 5032 and bo0 are BROADCAST-established in the current system ADM 210 of the OC-48ADM device 2 and a path for connecting the output portion bo0 to the output portion 5023 is established in the ADM 110 in the low-speed interface device 7.

Similarly, in order to connect an E-side spare system input portion 5016 of the OC-48ADM device 2 to the W-side spare output portion 5036 of the OC-48ADM device 2 in a THROUGH connection manner and to a TRB output portion 5028 of the low-speed interface device 7 for OC-48ADM device in a DROP connection manner, paths to the output portions 5036 and bo1 are BROADCAST-established in the current system ADM 211 of the OC-48ADM device 2 and a path for connecting the output portion bo1 to the output portion 5028 is established in the ADM 111 in the low-speed interface device 7.

Similarly, in order to connect a W-side spare system input portion 5014 of the OC-48ADM device 2 to the E-side spare output portion 5030 of the OC-48ADM device 2 in a THROUGH connection manner and to a TRB output portion 5023 of the low-speed interface device 7 in a DROP connection manner, paths to the output portions 5030 and bo0 are BROADCAST-established in the current system ADM 211 of the OC-48ADM device 2. In order to connect a W-side spare system input portion 5018 of the OC-48ADM device 2 to the E-side spare output portion 5034 of the OC-48ADM device 2 in a THROUGH connection manner and to the TRB output portion 5028 of the low-speed interface device 7 in a DROP connection manner, paths to the output portions 5034 and bo1 are BROADCAST-established in the spare system ADM 211 of the OC-48ADM device 2.

Further, paths from the TRB input portion 5005 in the low-speed interface device 7 for OC-48 to the output portions 5023 and ao0 of the current system ADM device 110 in the low-speed interface device 7 are BROADCAST-established, and ADD paths to the E-side spare system output portion 5030 and the W-side spare system output portion 5032 of the OC-48ADM device 2 through the input portion ai0 of the current system ADM 210 of the OC-48ADM device 2 are BROADCAST-established in the current system ADM 210. Similarly, paths from the TRB input portion 5010 to the output portions 5028 and ao1 of the spare system ADM device 111 in the low-speed interface device 7 are BROADCAST-established, and ADD paths to the E-side spare system output portion 5034 and the W-side spare system output portion 5036 of the OC-48ADM device 2 through the input portion ai0 of the spare system ADM 211 of the OC-48ADM device 2 are BROADCAST-established in the spare system ADM 211.

Figure 30:
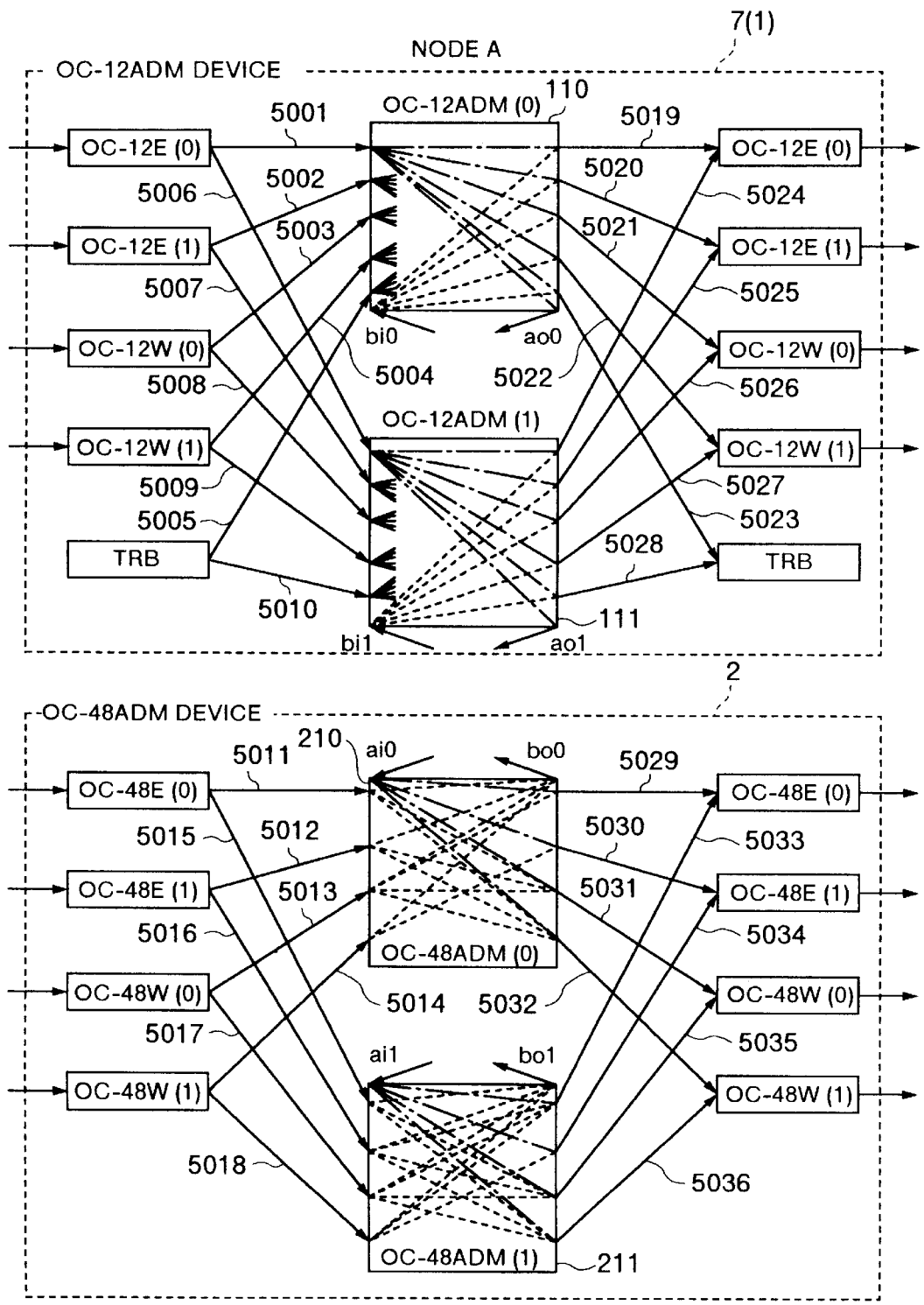
FIG. 30 is a diagram (IV) for explaining the establishment of cross connection for up-grading from four-fiber to four-fiber.

4.1.4 Procedure For Establishment Of Cross Connection In Operation Of OC-48ADM Device A procedure for establishment of cross connection in the operation of the OC-48ADM device will be explained using FIG. 30. Paths from the E-side current system input portion 5011 of the OC-48ADM device 2 to the W-side current system output portion 5031 and the E-side spare system output portion 5032 of the OC-48ADM device 2 and to the output portion bo0 are BROADCAST-established in the ADM 210, and BROADCAST paths including THROUGH and DROP paths to the TRB output portions 5019 to 5023 in the low-speed interface device 7 are established in the ADM 110 through the input portion bi0 in the low-speed interface device 7. Similarly, paths from the E-side current system input portion 5015 of the OC-48ADM device 2 to the W-side current system output portion 5035 and the W-side spare system output portion 5036 of the OC-48ADM device 2 and to the output portion bo1 are BROADCAST-established in the ADM 211, and BROADCAST paths including THROUGH and DROP paths to the TRB output portions 5024 to 5028 in the low-speed interface device 7 are established in the ADM 111 of the low-speed interface device 7 through the input portion ai1.

Similarly, paths from the E-side spare system input portion 5012 and the W-side current system input portion 5013 of the OC-48ADM device 2 to the E-side current system output portion 5029 and the W-side current and spare system output portions 5031 and 5032 and to the output portion bo0 and paths from the W-side spare system input portion 5014 to the E-side spare system output portion 5030 and the output portion bo0 are BROADCAST-established in the current system ADM 210. Also, paths from the E-side spare system input portion 5016 and the W-side current system input portion 5017 of the OC-48ADM device 2 to the E-side current system output portion 5033 and the W-side current and spare system output portions55035 and 5036 and to the output portion bo1 and paths from the W-side spare system input portion 5018 to the E-side current and spare system output portions 5033 and 5034 and the output portion bo1 are BROADCAST-established in the spare system ADM 211.

Also, paths from the TRB input portion 5001 to the TRB output portions 5019 to 5023 and the output portion ao0 are BROADCAST-established in the current system ADM 110 in the low-speed interface device 7. Similarly, paths from the TRB input portion 5006 to the TRB output portions 5024 to 5028 and the output portion ao1 are BROADCAST-established in the spare system ADM 111. A similar BROADCAST path establishment is performed for each of the TRB input portions 5002, 5003, 5004, 5005, 5007, 5008, 5009 and 5010.

The connection of cross connection paths is also made at each of the other nodes in accordance with a procedure similar to that mentioned above.

4.2 PROCEDURE FOR UP-GRADING OF NODE D

Figure 31:
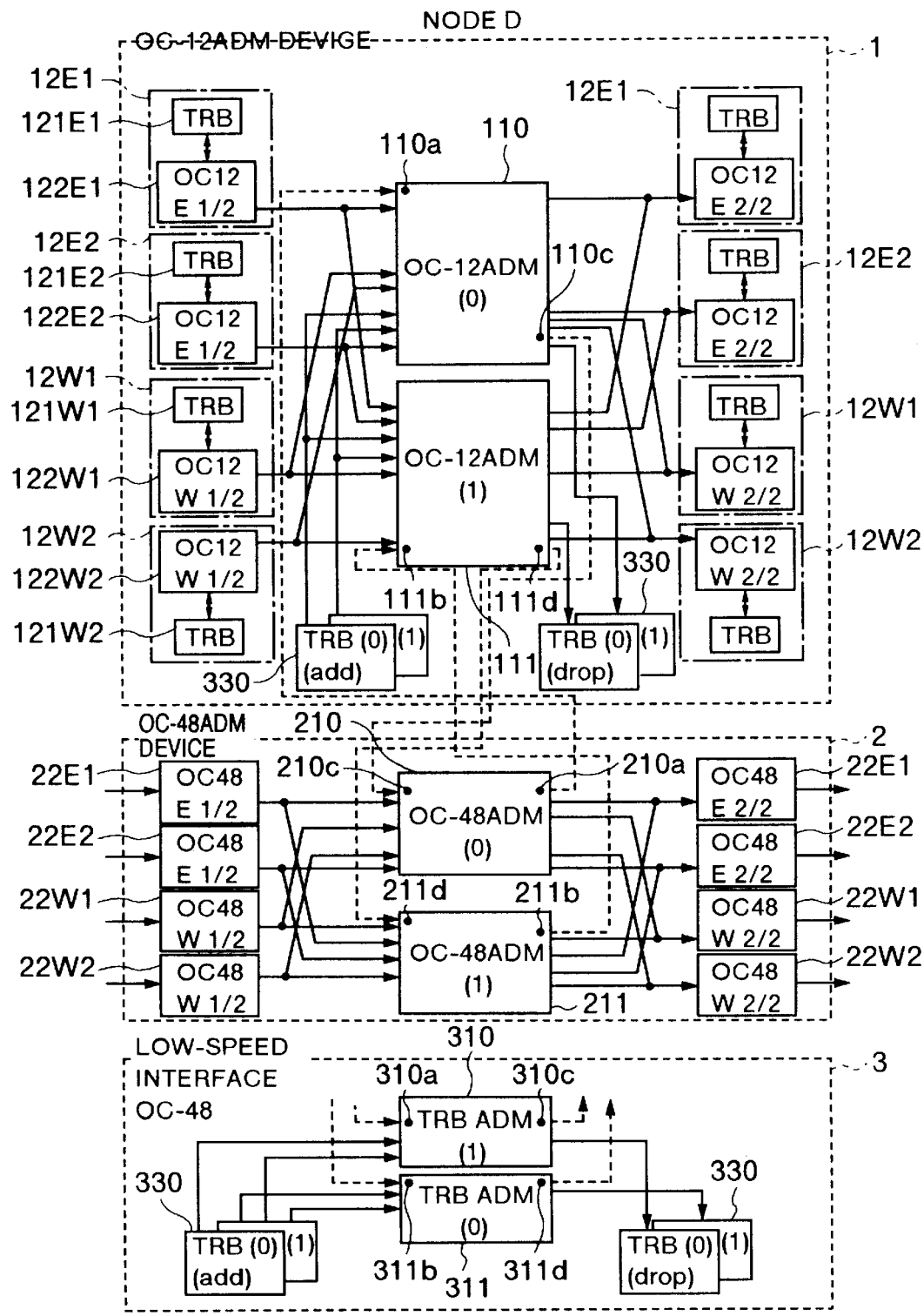
FIG. 31 is a diagram for explaining the connection of an OC-12ADM device and an OC-48ADM device at a node D.

Next, the connection of an OC-12ADM device 1 and an OC-48 ADM device 2 at the node D will be explained using FIG. 31. An input portion 110a of a current system ADM 110 and an input portion 111b of a spare system ADM 111 in the OC-12ADM device 1 are connected to an output portion 210a of a current system ADM 210 and an output portion 211b of a spare system ADM 211 in the OC-48ADM device 2, respectively. Also, an output portion 110c of the current system ADM 110 and an output portion 111d of the spare system ADM 111 in the OC-12ADM device 1 are connected to an input portion 210c of the current system ADM 210 and an input portion 211d of the spare system ADM 211 in the OC-48ADM device 2, respectively.

Also, the output portion 210a of the current system ADM 210 in the OC-48ADM device 2, the output portion 211b of the spare system ADM 211 in the OC-48ADM device 2 and the high-speed side interfaces of the OC-12 shelf are removed. Thereinstead, an input portion 310a of a current system ADM 310 and an input portion 311b of a spare system ADM 311 in a low-speed interface device 3 having low-speed interfaces 330 for OC-48 placed thereon are connected to the removed portions.

An input portion 210c of the current system ADM 210 and an input portion 211d of the spare system ADM 211 in the OC-48ADM device 2 are connected to an output portion 310c of the current system ADM 310 and an output portion 311d of the spare system ADM 311 in the low-speed interface device 3.

A device timing for the newly connected OC-48ADM device 2 and OC-48 low-speed interface device 3 uses a construction to receive a reference clock signal used by the existing OC-12ADM device 1, thereby eliminating a timing error between devices.

Then, the connection of that one (122E2) of the optical fibers 5AD and 5DA being as the spare system which is connected to the E side (12DA) at the node D, is changed to the OC-48 optical interface 22E2 on the E side (12DA) of the node D. Also, a low-speed interface 121E2 for OC-48 is placed at a position where the OC-12 optical interface 122E2 was placed until now. In this case, the establishment of cross connection in this case is similarly made in accordance with the procedure mentioned in conjunction with the node A.

Paths in the OC-12 ADM device rings (4AD, 4DA) being used as the current system are transferred to the newly structured OC-48ADM device rings (5AD, 5DA). Thereafter, at the node A, the connection of that one (122W1) in the optical fibers 4AD and 4DA used as the spare system which is connected to the W side (12AW), is changed to the OC-48 optical interface 22W1 on the W side (12AW) of the node A. At the node D, the connection of the optical fiber 122E1 connected to the E side (12DE) is changed to the OC-48 optical interface 22E1 on the E side (12DA) of the node D. Also, low-speed interfaces 121W1 and 121E1 for OC-48 are placed at positions where the OC-12 optical interfaces 122W1 and 122E1 were placed until now.

The above-mentioned series of works are similarly performed between other nodes to advance the up-grading work. In the course of the up-grading work, there is formed a ring in which an OC-12 system and an OC-48 system coexist. Information of pay load in the OC-12 frame is byte-multiplexed to pay load in the OC-48 frame. However, in the ADM (210A, 211A) of the node A and the ADM (210D, 211D) of the node D, only a capacity corresponding to OC-12 system (622.08 Mbps) is path-connected to its output portion, thereby forming a ring in which an OC-12 system and an OC-48 system coexist physically.

The similar work is performed between the other nodes in accordance with the above procedure to complete the up-grading. Thereby, in the case where the four-fiber ring network of the existing OC-12ADM device is up-graded to the four-fiber ring network of the OC-48ADM device, the utilization and reuse of interface devices of the existing apparatus and the space saving of the whole system can be realized by handling the existing high-speed side interfaces as low-speed side interfaces, adding a device having thereon high-speed interfaces for handling high-speed signals, and using the existing apparatus as an apparatus for accommodating low-speed interfaces.

5. FRAME CROSS-OVER FROM OC-12 SYSTEM TO OC-48 SYSTEM

Figure 32:
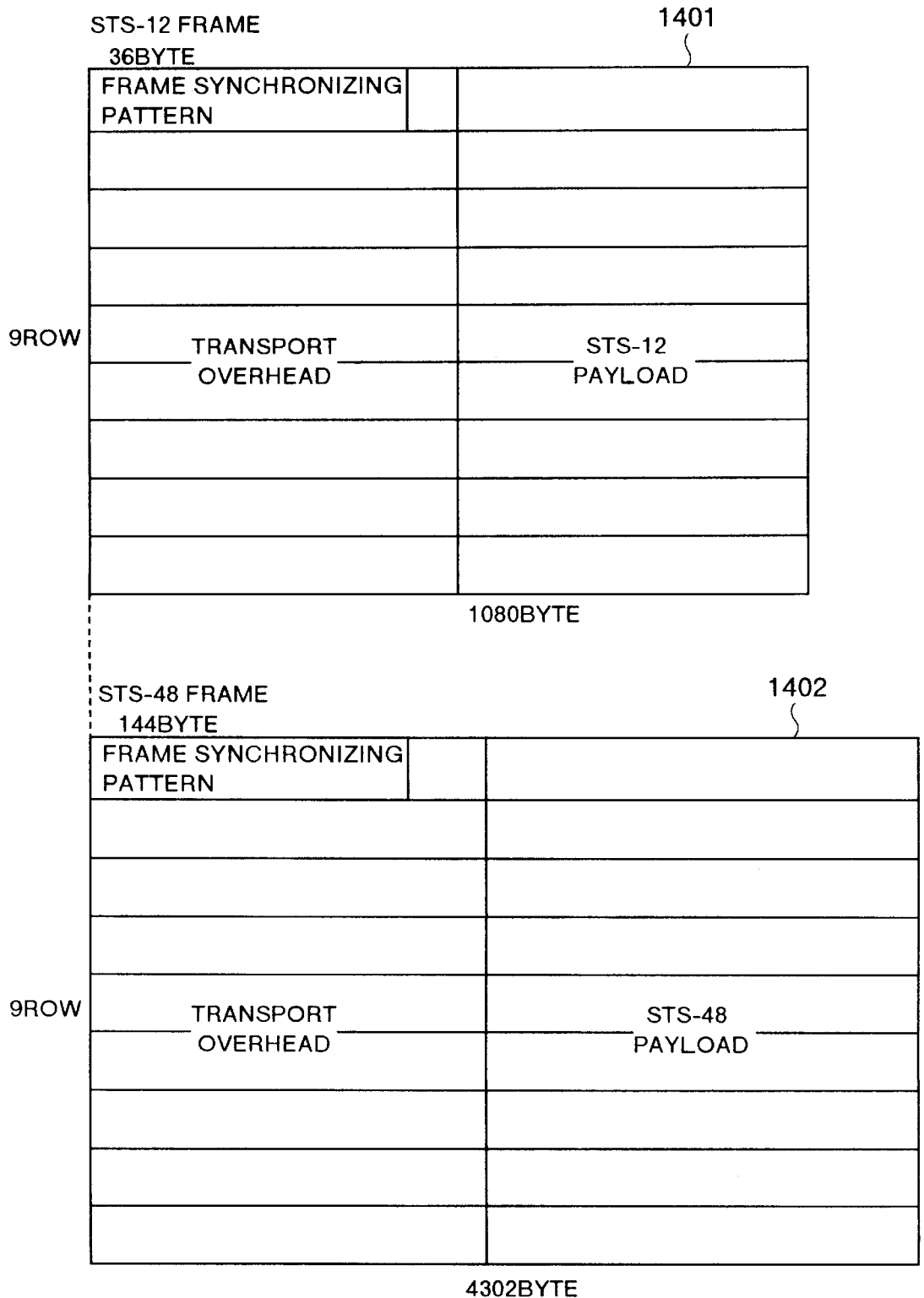
FIG. 32 is a diagram for explaining the construction of STS-12 and STS-48 frames.

FIG. 32 is a diagram showing the construction of an OC-12 frame and an OC-48 frame. In the course of in-service up-grading from the OC-12 ring network to the OC-48 ring network, there is formed a ring in which an OC-12 system and an OC-48 system coexist. Therefore, there is a need to make the cross-over accommodation of information inserted in the OC-12 frame 1401 into the OC-48 frame 1402.

The STS-12 frame 1401 of the OC-12 system includes twelve STS-1's which are to be accommodated into the STS-48 frame 1402 of the OC-48 system. The mapping of data from the OC-12 frame 1401 to the OC-48 frame 1402 is performed in a byte-multiplexing manner, as shown in FIG. 13. STS-1, 2, 3, - - - and 12 (1502) in the OC-12 frame are respectively byte-multiplexed to STS-1, 5, 9, - - - and 45 (1504) in the OC-48 frame to perform the mapping, thereby making it possible to accommodate data even in the ring in which the OC-12 system and the OC-48 system coexist.

Figure 33:
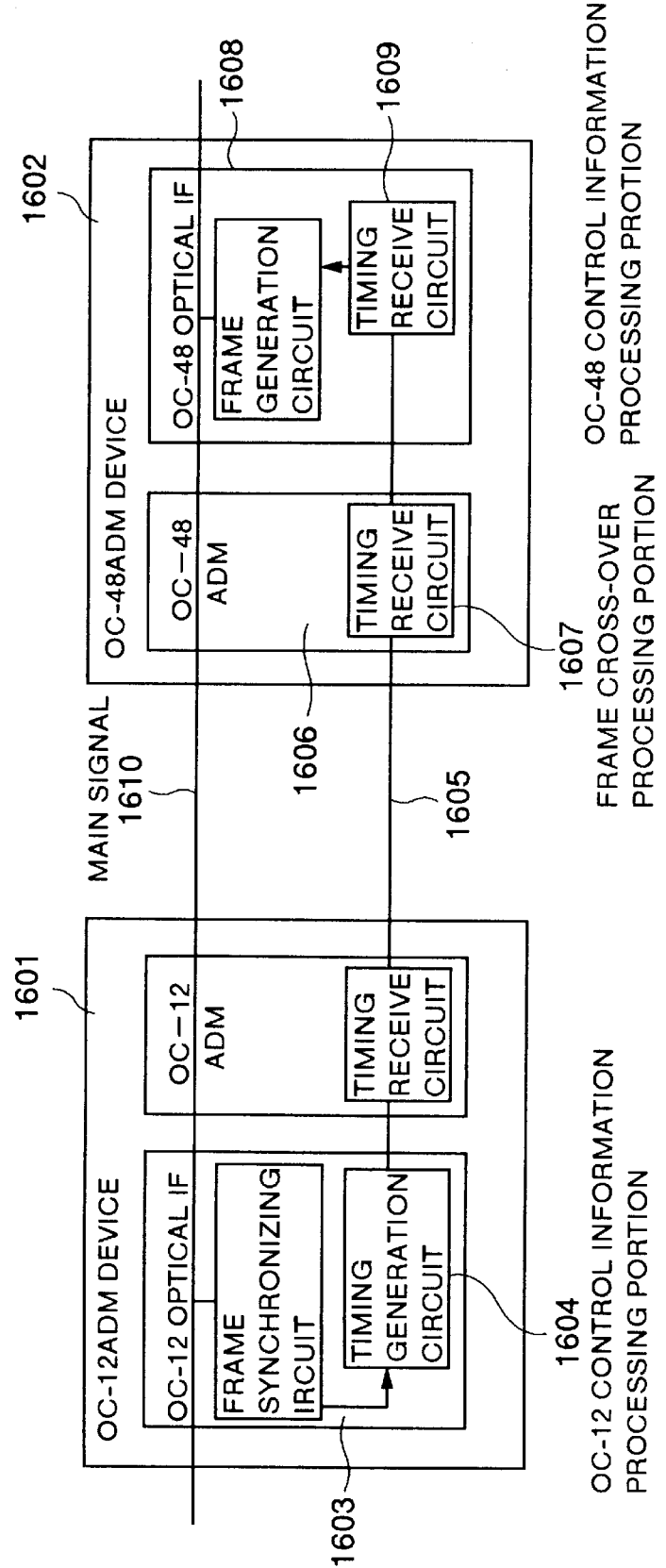
FIG. 33 is a diagram for explaining the construction of a frame mapping function portion.

FIG. 33 shows the construction of a function section for realizing the cross-over mapping of information in the OC-12 frame into the OC-48 frame. An OC-12 control information processing portion 1604 in an OC-12 optical interface 1603, arranged in an OC-12ADM device 1601, issues a frame write signal to a frame cross-over control portion 1607 in an OC-48ADM device 1602. Information for the above-mentioned byte-multiplexing is issued from the frame cross-over control portion 1607 to an OC-48 control information processing portion 1609 in an OC-48 optical interface 1608. In the OC-48 control information processing portion 1609 in the OC-48 optical interface 1608, a main signal 1610, received from the OC-12ADM device, is accommodated into the frame of the OC-48ADM device in the byte-multiplexing manner. In the course of up-grading, the OC-48ADM device processes only the capacity (622.08 Mbps) of the OC-12ADM device. After the up-grading is completed, the OC-48ADM device turns to a state in which it processes the capacity (2488.32 Mbps) of the OC-48ADM device.

6. METHOD OF TIMING SYNCHRONIZATION BETWEEN DEVICES

Figure 34:
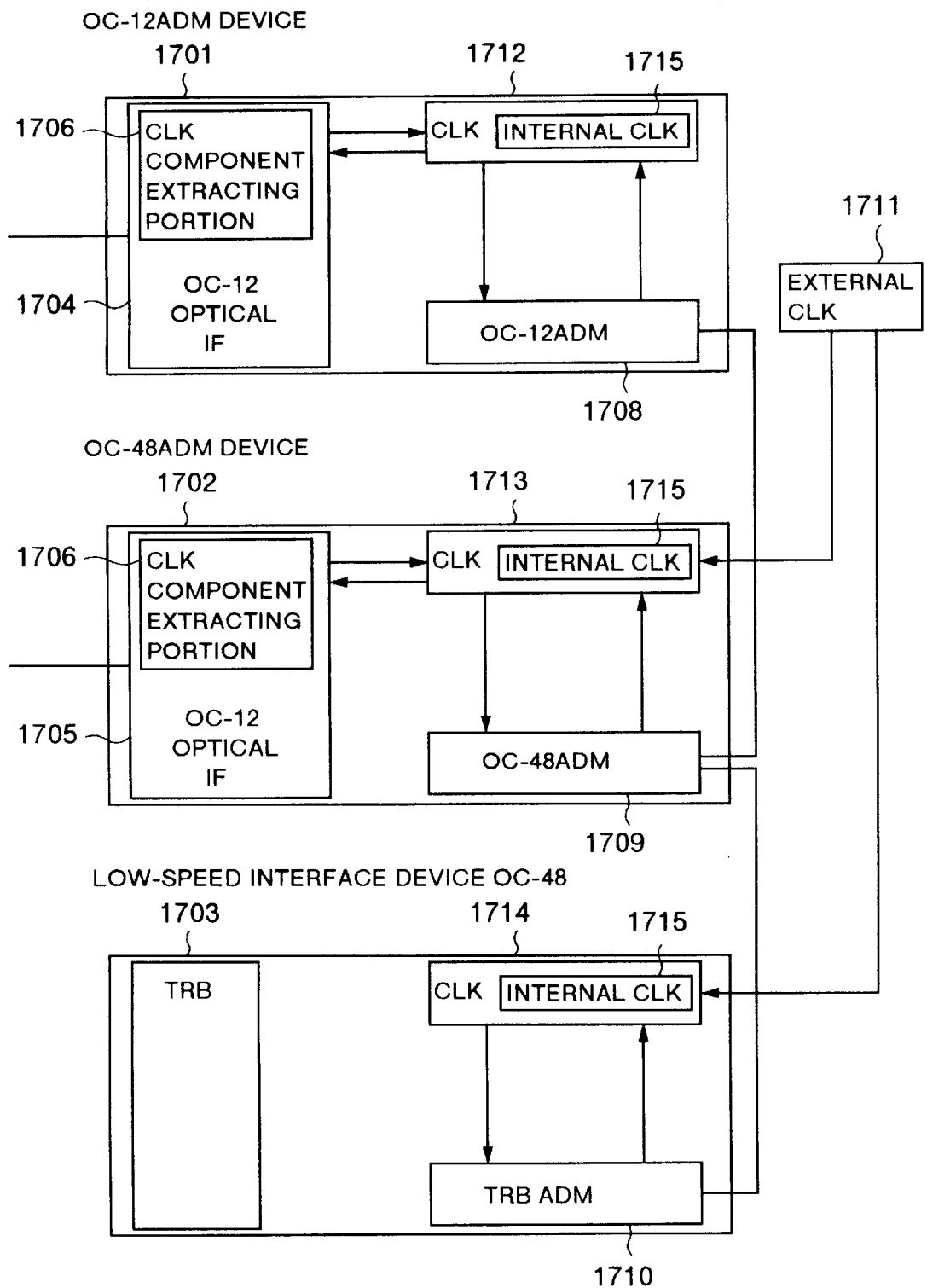
FIG. 34 is a diagram for explaining the construction of a path for timing synchronization between devices.

A path diagram for timing synchronization between devices is shown in FIG. 34. When an OC-12ADM device 1701 and an OC-48ADM device 1702 are connected and when the OC-12ADM device 1701 and a low-speed interface device 1703 for OC-48 are connected, it is necessary to match the timings of these devices. The devices 1701 and 1703, newly added to the OC-12ADM device 1701, require the same clock signal as a reference clock signal used by the exiting device.

In order to realize this, the following construction is provided. On the basis of a frame synchronizing pattern 1403 in a main signal 1610 received from another device, the synchronization of the OC-12ADM device 1601 is matched with the timing of the main signal. A frame synchronizing circuit extracts clock components and a timing generation circuit 1604 distributes the extracted clock components into the device.

The OC-12ADM device 1701 and the OC-48ADM device 1702 have their optical interfaces 1704 and 1705 which include CLK component extracting portions 1705 and 1706 for extracting clock components from received optical signals. Also, the OC-12ADM device 1701, the OC-48ADM device 1702 and the OC-48 low-speed interface device 1703 include their clock devices 1712, 1713 and 1714 which receive clock components from an external clock 1711 and are provided with self-running internal clocks 1715. When the OC-12ADM device 1701 is taking its timing on the basis of the extracted clock and the internal clock 1715, the newly added devices 1702 and 1703 receive the supply of a clock timing from the OC-12ADM device. At the time of completion of the up-grading, a clock timing based on the extracted clock of the OC-48ADM device is distributed to each device.

When the OC-12ADM device 1701 operation is synchronized to the operation of the external clock 1711, the newly added devices 1702 and 1703 are similarly synchronized to the clocking speed of the external clock thereby effecting a matching of the timings of these devices.

According to the foregoing embodiments, in each of the case where the up-grading from the existing OC-12 system two-fiber ring network to an OC-48 system two-fiber ring network is made, the case where the up-grading from the existing OC-12 system two-fiber ring network to an OC-48 system four-fiber ring network is made, the case where the up-grading from the existing OC-12 system four-fiber ring network to an OC-48 system two-fiber ring network is made and the case where the up-grading from the existing OC-12 system four-fiber ring network to an OC-48 system four-fiber ring network is made, the utilization and reuse of interface devices of the existing apparatus and the space saving of the whole system can be realized by handling the existing high-speed side interfaces as low-speed side interfaces, adding a device having thereon high-speed interfaces for handling high-speed signals, and using the existing apparatus as an apparatus for accommodating low-speed interfaces.

What is claimed is:

1. An up-grading method for a transmission apparatus including at least one low-speed side interface device, at least one high-speed side interface device, and a device including a cross connecting function realized by an add/drop multiplex (MUX) function which has at least one of a function of multiplexing a signal from the low-speed side interface device to connect the multiplexed signal to the high-speed side interface device, a function of distributing a signal from the high-speed side interface device to the low-speed side interface device, and a function of establishing physical and logical signal paths between any low-speed side interface device and any high-speed side interface device, wherein in the case where the transmission speed of said high-speed side interface device is to be increased, a high-speed transmission apparatus is newly added having thereon an interface device having a higher interface speed, a device including a cross connecting function realized by an add/drop MUX function, a clock signal distributing device and a control device which is newly connected to the device including the cross connecting function realized by an add/drop MUX function of the existing transmission apparatus, the high-speed side interface device of said existing transmission apparatus is replaced by a low-speed side interface device, the device including the cross connecting function realized by an add/drop function of said existing transmission apparatus is interconnected to the newly added high-speed transmission apparatus, and said existing transmission apparatus is used as an exclusive apparatus operating as low-speed side interfaces.

2. An up-grading method according to claim 1, wherein the high-speed side interface of said existing transmission apparatus is used as a low-speed side interface of the newly added high-speed transmission apparatus.

3. An up-grading method according to claim 1, wherein said newly added high-speed transmission apparatus includes a man-machine interface device so that said devices of said existing transmission apparatus are controlled from said man-machine interface device.

4. An up-grading method for a transmission apparatus from a network of an existing transmission speed to a network of a higher transmission speed in a network construction in which each of transmission apparatuses therein includes two systems of high-speed side interface devices and the high-speed side interface devices of the adjacent transmission apparatuses are connected by a transmission path in the form of a ring, wherein in the case where a part of the ring-connected transmission apparatuses is changed to the transmission speed higher than the existing transmission speed, only signal paths from a low-speed interface device and a high-speed interface device corresponding to the transmission speed of the existing network are first connected, in a device including a cross connecting function realized by an add/drop multiplex (MUX) function in a transmission apparatus physically transposed to a higher-speed transmission path, to high-speed interfaces on the output side of the high-speed transmission apparatus in order to hold a transmission speed in the ring-like network at the same speed, and after the replacement of all the transmission apparatuses in the ring-like network by apparatuses having the transmission speed higher than the existing transmission speed, said high-speed interface device of the existing apparatus is operatively connected as a low-speed interface device of said high-speed transmission apparatus, thereby up-grading the transmission speed of the whole network.

5. An up-grading method for a transmission apparatus from a network of an existing transmission speed to a network of a higher transmission speed in a network construction in which each of transmission apparatuses therein includes two systems of high-speed side interface devices and the high-speed side interface devices of the adjacent transmission apparatuses are connected by a transmission path in the form of a ring, wherein in the case where the same path establishing condition as a condition for establishment of paths for passing a transmission signal in the existing transmission apparatus through a device including a cross connecting function realized by an add/drop multiplex (MUX) function of the existing transmission apparatus is to be newly established in a device including a cross connecting function realized by add/drop MUX function of a high-speed transmission apparatus, a device including a cross connecting function realized by an add/drop MUX function having a broadcast function is used so that paths established in the existing device including the cross connecting function realized by an add/drop MUX function can also be connected to ports connected to the high-speed transmission apparatus of the device including a cross connecting function realized by an add/drop MUX function.

6. An up-grading method for a transmission apparatus from a network of an existing transmission speed to a network of a higher transmission speed in a network construction in which each of transmission apparatuses therein includes two systems of high-speed side interface devices and the high-speed side interface devices of the adjacent transmission apparatuses are connected by a transmission path in the form of a chain, wherein in the case where a part of the chain-connected transmission apparatuses is changed to the transmission speed higher than the existing transmission speed, only signal paths from a low-speed interface device and a high-speed interface device corresponding to the existing transmission speed of the existing network are first connected, in a device including a cross connecting function realized by add/drop MUX function in a transmission apparatus physically transposed to a higher-speed transmission path, to high-speed side interfaces on the output side of the high-speed transmission apparatus, and after said high-speed side interface device of the existing transmission apparatus is replaced to a higher-speed side interface device by up-grading, accommodating a low-speed side interface device of which transmission speed is the same as in said higher-speed side interface device, an existing path is established by connecting an output side of said high-speed side interface device of the existing transmission apparatus to an input side of said replaced higher-speed interface device, and is connected to said high-speed side interface after said network is physically up-graded, thereby up-grading the transmission speed of the whole network.

7. An up-grading method according to claim 6, wherein an interface device of the same kind as the low-speed side interface of said existing transmission apparatus is placed at a mounting position of the high-speed side interface of said existing transmission apparatus.

8. An up-graded transmission apparatus having at least one low-speed side interface device, at least one high-speed side interface device, and a device including a cross connecting function realized by an add/drop multiplex (MUX) function which has at least one of a function of multiplexing a signal from the low-speed side interface device to connect the multiplexed signal to the high-speed side interface device, a function of distributing a signal from the high-speed side interface device to the low-speed side interface device, and a function of establishing physical and logical signal paths between any low-speed side interface device and any high-speed side interface device, said up-graded transmission apparatus comprising:

a high-speed transmission apparatus, newly added to that of an existing transmission apparatus, having thereon an interface device having a higher interface speed, a device including a cross connecting function realized by an add/drop MUX function, a clock signal distributing device and a control device connected to the device including the cross connecting function realized by an add/drop MUX function of said existing transmission apparatus, a low-speed side interface device as a replacement for the high-speed side interface device of said existing transmission apparatus, the device including the cross connecting function realized by an add/drop MUX function of said existing transmission apparatus being interconnected to the newly added high-speed transmission apparatus, and said existing transmission apparatus being used as an exclusive apparatus operating as a low-speed side interface.

9. An up-graded transmission apparatus according to claim 8, wherein the high-speed side interface of said existing transmission apparatus is used as a low-speed side interface of the newly added high-speed transmission apparatus.

10. An up-graded transmission apparatus according to claim 8, wherein said newly added high-speed interface apparatus includes a man-machine interface device so that said devices of said existing transmission apparatus are controlled from said man-machine interface device.

11. An up-graded transmission apparatus from a network of an existing transmission speed to a network of a higher transmission speed in a network construction in which each of transmission apparatuses therein includes two systems of high-speed side interface devices and the high-speed side interface devices of adjacent transmission apparatuses are connected by a transmission path in the form of a ring, wherein high-speed interface devices included in an existing apparatus are accommodated for connection as a low-speed interface device of said up-graded transmission apparatus, and wherein an increase in transmission capacity is effected through matching a connection of said high-speed interface devices, of the existing apparatus, for increased transmission capacity.

12. An up-graded transmission apparatus from a network of an existing transmission speed to a network of a higher transmission speed in a network construction in which each of transmission apparatuses therein includes two systems of high-speed side interface devices and the high-speed side interface devices of adjacent transmission apparatuses are connected by a transmission path in the form of a ring, wherein a device including a cross connecting function realized by an add/drop multiplex (MUX) function having a broadcast function is used so that paths established in an existing device including a cross connecting function realized by add/drop MUX function can also be connected to ports connected to said up-graded transmission apparatus of the device including a cross connecting function realized by an add/drop MUX function, and wherein an increase in transmission capacity is effected through matching a high-speed side interface device in the cross connecting function, of the existing apparatus, for increased transmission capacity.

13. An up-graded transmission apparatus from a network of an existing transmission speed to a network of a higher transmission speed in a network construction in which each of transmission apparatuses therein includes two systems of high-speed side interface devices and the high-speed side interface devices of adjacent transmission apparatuses are connected by a transmission path in the form of a chain, wherein a low-speed side interface device is provided which has a same transmission speed as that of said high-speed side interface device, an existing path is established by connecting an output side of said high-speed side interface device of an existing transmission apparatus to an input side of a replaced high-speed side interface device, and a path connected to an output interface is connected to said high-speed side interface device, and wherein an increase in transmission capacity is effected through matching the replacement high-speed side interference device of the existing apparatus, for increased transmission capacity.

* * * * *